US011823598B2

(12) United States Patent
Lussier et al.

(10) Patent No.: US 11,823,598 B2
(45) Date of Patent: Nov. 21, 2023

(54) LIGHT FIELD DEVICE, VARIABLE PERCEPTION PIXEL RENDERING METHOD THEREFOR, AND VARIABLE PERCEPTION SYSTEM AND METHOD USING SAME

(71) Applicant: EVOLUTION OPTIKS LIMITED, Christ Church (BB)

(72) Inventors: Guillaume Lussier, Montreal (CA); Raul Mihali, Westport, CT (US); Yaiza Garcia, Beaconsfield (CA); Matej Goc, Kingston (CA)

(73) Assignee: Evolution Optiks Limited, Christ Church (BB)

( * ) Notice: Subject to any disclaimer, the term of this patent is extended or adjusted under 35 U.S.C. 154(b) by 51 days.

(21) Appl. No.: 17/773,841

(22) PCT Filed: Oct. 30, 2020

(86) PCT No.: PCT/US2020/058383
§ 371 (c)(1),
(2) Date: May 2, 2022

(87) PCT Pub. No.: WO2021/087375
PCT Pub. Date: May 6, 2021

(65) Prior Publication Data
US 2022/0383782 A1 Dec. 1, 2022

Related U.S. Application Data

(63) Continuation-in-part of application No. 16/810,143, filed on Mar. 5, 2020, now Pat. No. 10,761,604, and
(Continued)

(51) Int. Cl.
*G09G 3/00* (2006.01)
*G06T 15/20* (2011.01)
*G06T 15/06* (2011.01)

(52) U.S. Cl.
CPC ............. *G09G 3/002* (2013.01); *G06T 15/06* (2013.01); *G06T 15/20* (2013.01)

(58) Field of Classification Search
CPC .... G02B 30/10; G02B 27/0075; G09G 3/002; G09G 3/00; G09G 2354/00;
(Continued)

(56) References Cited

U.S. PATENT DOCUMENTS

| 5,032,754 A | 7/1991 | Iwao et al. |
| 5,959,664 A | 9/1999 | Woodgate |

(Continued)

FOREIGN PATENT DOCUMENTS

| AU | 2015100739 | 7/2015 |
| DE | 9410161 U1 | 12/1994 |

(Continued)

OTHER PUBLICATIONS

U.S. Appl. No. 17/302,392, filed Apr. 30, 2021, Guillaume Lussier.
(Continued)

*Primary Examiner* — Jack Dinh
(74) *Attorney, Agent, or Firm* — Knobbe, Martens, Olson & Bear, LLP

(57) ABSTRACT

Described are various embodiments of process, system and device to automatically adjust user perception of an input, whereby and adjusted image perception value is variably defined for different input locations to create at least one of a multi-focal effect, a progressive perception adjustment, or the like.

8 Claims, 39 Drawing Sheets

Related U.S. Application Data a continuation-in-part of application No. 16/854,787, filed on Apr. 21, 2020, now Pat. No. 10,860,099.

(60) Provisional application No. 62/929,639, filed on Nov. 1, 2019.

(58) Field of Classification Search
CPC .. G09G 2380/08; H04N 13/117; G06T 15/06; G06T 15/20; G06F 3/013; G06V 40/19
See application file for complete search history.

(56) References Cited

U.S. PATENT DOCUMENTS

| | | | |
|---|---|---|---|
| 6,192,341 B1 | 2/2001 | Becker et al. | |
| 6,309,117 B1 | 10/2001 | Bunce et al. | |
| 6,386,707 B1 | 5/2002 | Pellicano | |
| 6,483,485 B1 | 11/2002 | Huang et al. | |
| 6,536,907 B1 | 3/2003 | Towner et al. | |
| 6,543,898 B1 | 4/2003 | Griffin et al. | |
| 6,784,905 B2 | 8/2004 | Brown et al. | |
| 6,809,704 B2 | 10/2004 | Kulas | |
| 6,820,979 B1 | 11/2004 | Stark et al. | |
| 6,876,758 B1 | 4/2005 | Polat et al. | |
| 6,953,249 B1 | 10/2005 | Maguire, Jr. | |
| 7,062,547 B2 | 6/2006 | Brown et al. | |
| 7,147,605 B2 | 12/2006 | Ragauskas | |
| 7,517,086 B1 | 4/2009 | Kürkure | |
| 7,819,818 B2 | 10/2010 | Ghajar | |
| 7,866,817 B2 | 1/2011 | Polat | |
| 7,891,813 B2 | 2/2011 | Ogilvie | |
| 7,973,850 B2 | 7/2011 | Ishiga | |
| 8,089,512 B2 | 1/2012 | Okabe et al. | |
| 8,098,440 B2 | 1/2012 | Jethmalani et al. | |
| 8,164,598 B2 | 4/2012 | Kimpe | |
| 8,231,220 B2 | 7/2012 | Baranton | |
| 8,322,857 B2 | 12/2012 | Barbur et al. | |
| 8,540,375 B2 | 9/2013 | Destain | |
| 8,717,254 B1 | 5/2014 | Nave et al. | |
| 8,783,871 B2 | 7/2014 | Pamplona et al. | |
| 8,798,317 B2 | 8/2014 | Wu | |
| 8,823,742 B2 | 9/2014 | Kweon | |
| 8,857,984 B2 | 10/2014 | Clarke et al. | |
| 8,967,809 B2 | 3/2015 | Kirschen et al. | |
| 9,010,929 B2 | 4/2015 | Lewis | |
| 9,041,833 B2 | 5/2015 | Hatakeyama | |
| 9,052,502 B2 | 6/2015 | Caldeira et al. | |
| 9,066,683 B2 | 6/2015 | Zhou | |
| 9,104,233 B2 | 8/2015 | Alberth | |
| 9,159,299 B2 | 10/2015 | Lee | |
| 9,177,355 B1 | 11/2015 | Buchheit | |
| 9,183,806 B2 | 11/2015 | Felt | |
| 9,198,571 B2 | 12/2015 | Kiderman et al. | |
| 9,301,680 B2 | 4/2016 | Fassi et al. | |
| 9,307,940 B2 | 4/2016 | MacLullich et al. | |
| 9,492,074 B1 | 11/2016 | Lee et al. | |
| 9,642,522 B2 | 5/2017 | Samadani et al. | |
| 9,844,323 B2 | 12/2017 | Pamplona et al. | |
| 9,895,057 B2 | 2/2018 | Tumlinson | |
| 10,058,241 B2 | 8/2018 | Patella et al. | |
| 10,085,631 B2 | 10/2018 | Shimizu et al. | |
| 10,182,717 B2 | 1/2019 | Lindig et al. | |
| 10,206,566 B2 | 2/2019 | Skolianos et al. | |
| 10,247,941 B2 | 4/2019 | Fürsich | |
| 10,335,027 B2 | 7/2019 | Pamplona et al. | |
| 10,345,590 B2 | 7/2019 | Samec et al. | |
| 10,394,322 B1 | 8/2019 | Gotsch | |
| 10,420,467 B2 | 9/2019 | Krall et al. | |
| 10,548,473 B2 | 2/2020 | Escalier et al. | |
| 10,761,604 B2 | 9/2020 | Gotsch et al. | |
| 2002/0024633 A1 | 2/2002 | Kim et al. | |
| 2002/0099305 A1 | 7/2002 | Fukushima et al. | |
| 2006/0119705 A1 | 6/2006 | Liao | |
| 2007/0247522 A1 | 10/2007 | Holliman | |
| 2008/0309764 A1 | 12/2008 | Kubota et al. | |
| 2009/0290132 A1 | 11/2009 | Shevlin | |
| 2010/0156214 A1 | 6/2010 | Yang | |
| 2010/0277693 A1 | 11/2010 | Martinez-Conde et al. | |
| 2010/0298735 A1 | 11/2010 | Suffin | |
| 2011/0019056 A1 | 1/2011 | Hirsch et al. | |
| 2011/0122144 A1 | 5/2011 | Gabay | |
| 2011/0157180 A1 | 6/2011 | Burger et al. | |
| 2011/0261173 A1 | 10/2011 | Lin et al. | |
| 2011/0268868 A1 | 11/2011 | Dowski, Jr. et al. | |
| 2012/0010474 A1 | 1/2012 | Olsen et al. | |
| 2012/0113389 A1 | 5/2012 | Mukai et al. | |
| 2012/0206445 A1 | 8/2012 | Chiba | |
| 2012/0249951 A1 | 10/2012 | Hirayama | |
| 2012/0254779 A1 | 10/2012 | Ollivierre et al. | |
| 2012/0262477 A1 | 10/2012 | Buchheit | |
| 2013/0027384 A1 | 1/2013 | Ferris | |
| 2013/0096820 A1 | 4/2013 | Agnew | |
| 2013/0120390 A1 | 5/2013 | Marchand et al. | |
| 2013/0222652 A1 | 8/2013 | Akeley et al. | |
| 2014/0028662 A1 | 1/2014 | Liao et al. | |
| 2014/0055692 A1 | 2/2014 | Kroll et al. | |
| 2014/0063332 A1 | 3/2014 | Miyawaki | |
| 2014/0118354 A1 | 5/2014 | Pais et al. | |
| 2014/0137054 A1 | 5/2014 | Gandhi et al. | |
| 2014/0200079 A1 | 7/2014 | Bathiche et al. | |
| 2014/0253876 A1 | 9/2014 | Klin et al. | |
| 2014/0267284 A1 | 9/2014 | Blanche et al. | |
| 2014/0268060 A1 | 9/2014 | Lee et al. | |
| 2014/0282285 A1 | 9/2014 | Sadhvani et al. | |
| 2014/0300711 A1 | 10/2014 | Kroon et al. | |
| 2014/0327750 A1 | 11/2014 | Malachowsky et al. | |
| 2014/0327771 A1 | 11/2014 | Malachowsky et al. | |
| 2014/0340390 A1 | 11/2014 | Lanman et al. | |
| 2015/0016777 A1 | 1/2015 | Abovitz et al. | |
| 2015/0049390 A1 | 2/2015 | Lanman et al. | |
| 2015/0177514 A1 | 6/2015 | Maimone et al. | |
| 2015/0185501 A1 | 7/2015 | Bakaraju et al. | |
| 2015/0234187 A1 | 8/2015 | Lee | |
| 2015/0234188 A1 | 8/2015 | Lee | |
| 2015/0245766 A1 | 9/2015 | Rennaker et al. | |
| 2015/0262424 A1 | 9/2015 | Tabaka et al. | |
| 2015/0336511 A1 | 11/2015 | Ukeda | |
| 2016/0042501 A1 | 2/2016 | Huang et al. | |
| 2016/0103419 A1 | 4/2016 | Callagy et al. | |
| 2016/0134815 A1 | 5/2016 | Ishiguro et al. | |
| 2016/0260258 A1 | 9/2016 | Lo et al. | |
| 2016/0270656 A1 | 9/2016 | Samec et al. | |
| 2016/0306390 A1 | 10/2016 | Vertegaal et al. | |
| 2016/0335749 A1 | 11/2016 | Kano | |
| 2017/0027435 A1 | 2/2017 | Boutinon et al. | |
| 2017/0060399 A1 | 3/2017 | Hough et al. | |
| 2017/0123209 A1 | 5/2017 | Spitzer et al. | |
| 2017/0212352 A1 | 7/2017 | Cobb et al. | |
| 2017/0227781 A1 | 8/2017 | Banerjee et al. | |
| 2017/0302913 A1 | 10/2017 | Tonar et al. | |
| 2017/0307898 A1 | 10/2017 | Vdovin et al. | |
| 2017/0353717 A1 | 12/2017 | Zhou et al. | |
| 2017/0365101 A1 | 12/2017 | Samec et al. | |
| 2017/0365189 A1 | 12/2017 | Halpin et al. | |
| 2018/0033209 A1 | 2/2018 | Akeley | |
| 2018/0070820 A1 | 3/2018 | Fried et al. | |
| 2018/0084245 A1 | 3/2018 | Lapstun | |
| 2018/0136486 A1 | 5/2018 | Macnamara et al. | |
| 2018/0203232 A1 | 7/2018 | Bouchier et al. | |
| 2018/0252935 A1 | 9/2018 | Vertegaal et al. | |
| 2018/0271741 A1 | 9/2018 | Diaz et al. | |
| 2018/0290593 A1 | 10/2018 | Cho | |
| 2018/0329485 A1 | 11/2018 | Carothers et al. | |
| 2018/0330652 A1 | 11/2018 | Perreault et al. | |
| 2019/0094552 A1 | 3/2019 | Shousha | |
| 2019/0125179 A1 | 5/2019 | Xu et al. | |
| 2019/0150729 A1 | 5/2019 | Huang et al. | |
| 2019/0175011 A1 | 6/2019 | Jensen et al. | |
| 2019/0228586 A1 | 7/2019 | Bar-Zeev et al. | |
| 2019/0246095 A1 | 8/2019 | Kishimoto | |
| 2019/0246889 A1 | 8/2019 | Marin et al. | |
| 2019/0293939 A1 | 9/2019 | Sluka | |
| 2019/0310478 A1 | 10/2019 | Marin et al. | |
| 2020/0012090 A1 | 1/2020 | Lapstun | |
| 2020/0126180 A1 | 4/2020 | Gotsch | |

(56) References Cited

U.S. PATENT DOCUMENTS

| | | |
|---|---|---|
| 2020/0272232 A1 | 8/2020 | Lussier et al. |
| 2021/0002557 A1 | 4/2021 | Lussier |
| 2021/0271091 A1 | 9/2021 | Xu et al. |
| 2021/0382307 A1 | 12/2021 | Sluka et al. |
| 2022/0404689 A1 | 12/2022 | Sluka |
| 2022/0408070 A1 | 12/2022 | Hirt |

FOREIGN PATENT DOCUMENTS

| | | |
|---|---|---|
| DE | 102004038822 A1 | 3/2006 |
| DE | 102016212761 | 5/2018 |
| DE | 102018121742 A1 | 3/2020 |
| DE | 102018129600 A1 | 5/2020 |
| DE | 102019102373 A1 | 7/2020 |
| EP | 2127949 A1 | 12/2009 |
| EP | 1509121 B1 | 9/2012 |
| EP | 2589020 A2 | 5/2013 |
| EP | 2678804 A1 | 1/2014 |
| EP | 2760329 A1 | 8/2014 |
| EP | 2999393 A1 | 3/2016 |
| EP | 2547248 B1 | 5/2017 |
| EP | 3262617 A1 | 1/2018 |
| EP | 3339943 A1 | 6/2018 |
| EP | 3367307 A3 | 12/2018 |
| EP | 3542206 A1 | 9/2019 |
| EP | 2828834 B1 | 11/2019 |
| EP | 3620846 A1 | 3/2020 |
| EP | 3631770 A1 | 4/2020 |
| EP | 3657440 A1 | 5/2020 |
| EP | 3659109 A1 | 6/2020 |
| EP | 3689225 A1 | 8/2020 |
| EP | 3479344 B1 | 12/2020 |
| EP | 3313263 A1 | 12/2021 |
| FR | 3059537 B1 | 5/2019 |
| JP | 2003038443 A | 2/2003 |
| WO | 2010116019 A1 | 10/2010 |
| WO | 2011156721 A1 | 12/2011 |
| WO | 2013166570 A1 | 11/2013 |
| WO | 2014174168 A1 | 10/2014 |
| WO | 2014197338 A2 | 12/2014 |
| WO | 2015049402 A1 | 4/2015 |
| WO | 2015162098 A1 | 10/2015 |
| WO | 2017192887 A2 | 11/2017 |
| WO | 2017218539 A1 | 12/2017 |
| WO | 2018022521 A1 | 2/2018 |
| WO | 2018092989 A1 | 5/2018 |
| WO | 2018129310 A1 | 7/2018 |
| WO | 2019002656 A2 | 1/2019 |
| WO | WO2021038421 A1 | 8/2020 |
| WO | WO2021087384 | 10/2020 |
| WO | 2021038430 A1 | 3/2021 |
| WO | 2021122640 A1 | 6/2021 |
| WO | 2021209785 A1 | 10/2021 |
| WO | 2022038400 A1 | 2/2022 |
| WO | 2022112818 A1 | 6/2022 |
| WO | 2022175716 A1 | 8/2022 |
| WO | 2022254243 A1 | 12/2022 |

OTHER PUBLICATIONS

U.S. Appl. No. 17/309,133, filed Apr. 29, 2021, Daniel Gotsch.
U.S. Appl. No. 62/929,639, filed Nov. 1, 2019, Guillaume Lussier.
"A Computational Light Field Display for Correcting Visual Aberrations," Huang, F.C., Technical Report No. UCB/EECS-2013-206, Electrical Engineering and Computer Sciences University of California at Berkeley, http://www.eecs.berkeley.edu/Pubs/TechRpts/2013/EECS-2013-206.html, Dec. 15, 2013.
Agus M. et al., "GPU Accelerated Direct Volume Rendering on an Interactive Light Field Display", EUROGRAPHICS 2008, vol. 27, No. 2, 2008.
Burnett T., "FoVI3D Extreme Multi-view Rendering for Light-field Displays", GTC 2018 (GPU Technology Conference), Silicon Valley, 2018.
Ciuffreda, Kenneth J., et al., Understanding the effects of mild traumatic brain injury on the pupillary light reflex, Concussion (2017) 2(3), CNC36.
Fattal, D. et al., A Multi-Directional Backlight for a Wide-Angle, Glasses-Free Three-Dimensional Display, Nature, Mar. 21, 2013, pp. 348-351, vol. 495.
Fielmann Annual Report 2019 (https://www.fielmann.eu/downloads/fielmann_annual_report_2019.pdf).
Gray, Margot, et al., Female adolescents demonstrate greater oculomotor and vestibular dysfunction than male adolescents following concussion, Physical Therapy in Sport 43 (2020) 68-74.
Halle M., "Autostereoscopic displays and computer graphics", Computer Graphics, ACM SIGGRAPH, 31(2), May 1997, pp. 58-62.
Howell, David R., et al., Near Point of Convergence and Gait Deficits in Adolescents After Sport-Related Concussion, Clin J Sport Med, 2017.
Howell, David R., et al., Receded Near Point of Convergence and Gait Are Associated After Concussion, Br J Sports Med, Jun. 2017; 51:e1, p. 9 (Abstract).
Huang, F.C. et al., "Eyeglasses-Free Display: Towards Correcting Visual Aberrations With Computational Light Field Displays,", ACM Transactions on Graphics (TOG)—Proceedings of ACM SIGGRAPH 2014, vol. 33, Issue 4, Article No. 59, Jul. 2014.
Kawata, K., et al., Effect of Repetitive Sub-concussive Head Impacts on Ocular Near Point of Convergence, In t. J Sports Med 2016; 37; 405-410.
Lewin, Sarah "No Need for Reading Glasses With Vision-Correcting Display", published 2014.
Mainone, Andrew, et al. "Focus 3D: Compressive accommodation display." ACM Trans. Graph. 32.5 (2013): 153-1.
Masia B. et al., "A survey on computational displays: Pushing the boundaries of optics, computation, and perception", Computer & Graphics, vol. 37, 2013, pp. 1012-1038.
Murray, Nicholas G., et al., Smooth Pursuit and Saccades after Sport-Related Concussion, Journal of Neurotrauma 36: 1-7 (2019).
Pamplona V. F. et al., "Tailored Displays to Compensate for Visual Aberrations," ACM Transactions on Graphics (TOG), Jul. 2012 Article No. 81, https://doi.org/10.1145/2185520.2185577.
Pamplona V. F., Thesis (Ph.D.)—Universidade Federal do Rio Grande do Sul. Programa de Pós-Graduação em Computação, Porto Alegre, BR-RS, 2012. Advisor: Manuel Menezes de Oliveira Neto.
Ventura, Rachel E., et al., Diagnostic Tests for Concussion: Is Vision Part of the Puzzle?, Journal of Neuro-Ophthalmology 2015; 35; 73-81.
Wetzstein, G. et al., "Tensor Displays: Compressive Light Field Synthesis using Multilayer Displays with Directional Backlighting", https://web.media.mit.edu/~gordonw/TensorDisplays/TensorDisplays.pdf.
Zahid, Abdullah Bin, et al., Eye Tracking as a Biomarker for Concussion in Children, Clin J Sport Med 2018.

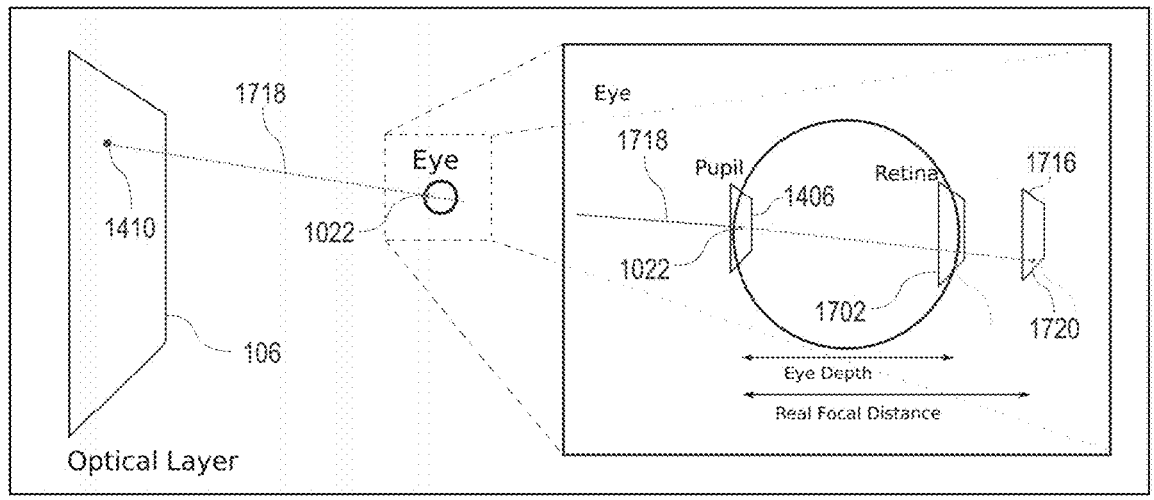
Figure 17A
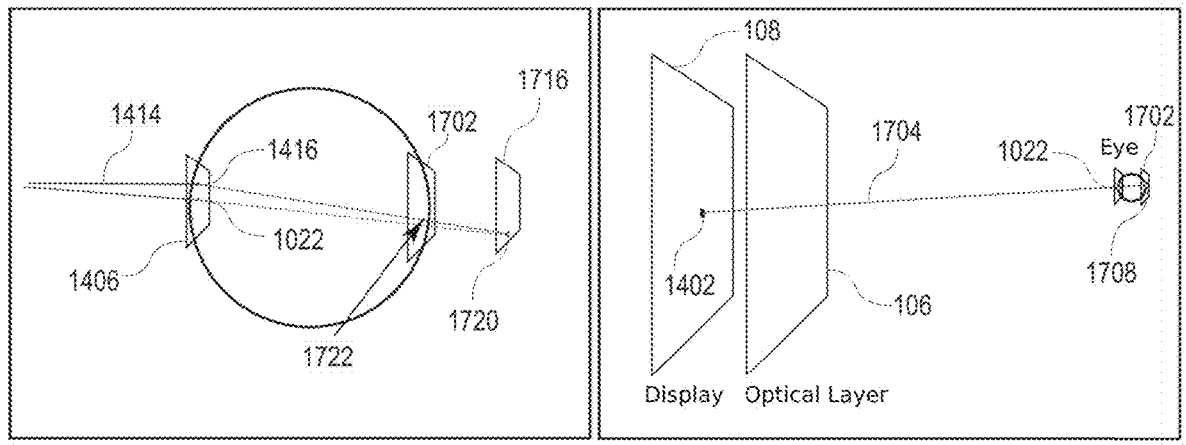
Figure 17B
Figure 17C
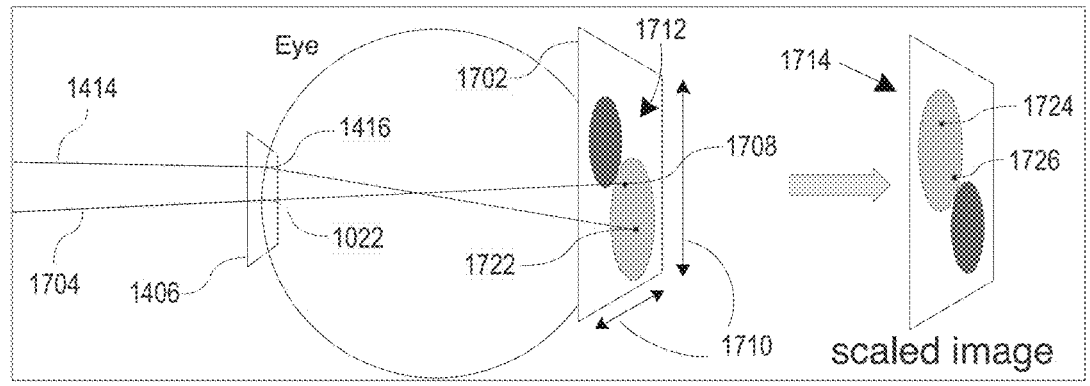
Figure 17D

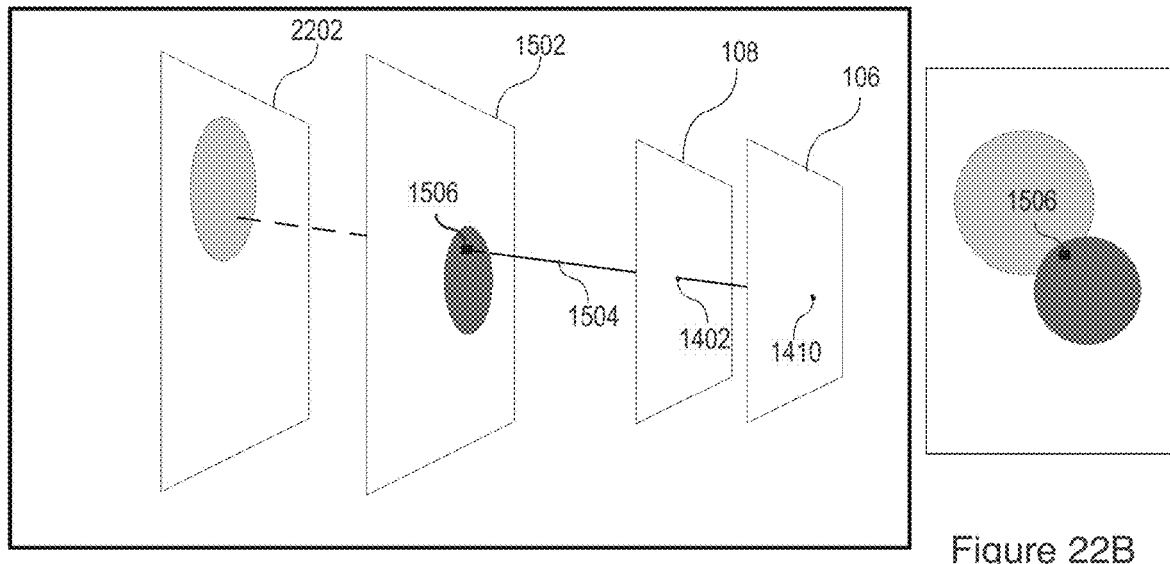
Figure 22A
Figure 22B
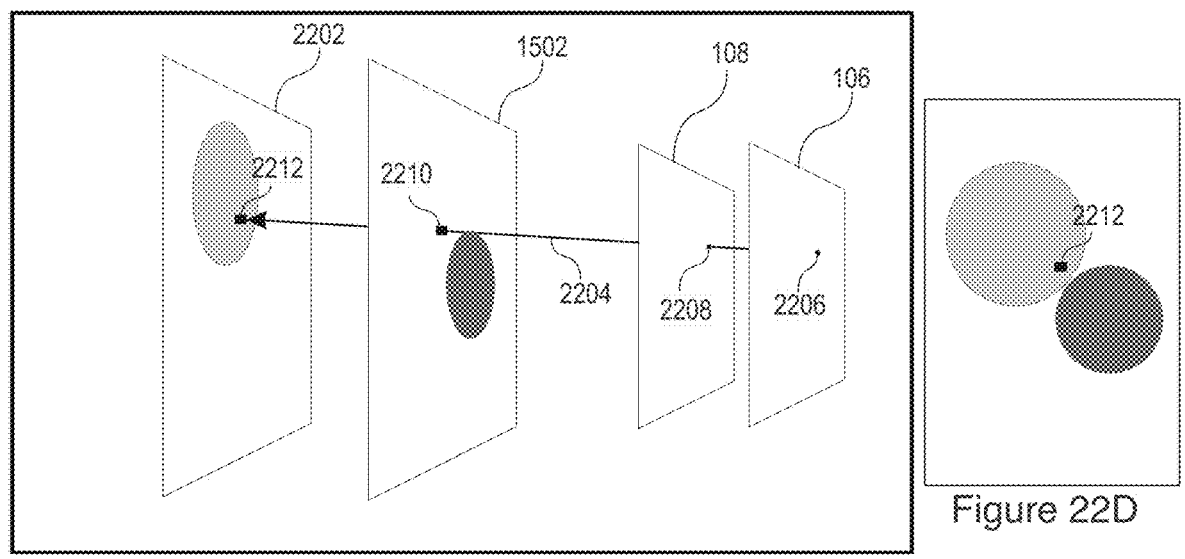
Figure 22C
Figure 22D

LIGHT FIELD DEVICE, VARIABLE PERCEPTION PIXEL RENDERING METHOD THEREFOR, AND VARIABLE PERCEPTION SYSTEM AND METHOD USING SAME

CROSS REFERENCE TO RELATED APPLICATIONS

This application the U.S. National Phase application under 35 U.S.C. § 371 of International Application No. PCT/US2020/058383. PCT/US2020/058383 is a continuation-in-part of U.S. patent application Ser. No. 16/810,143 filed Mar. 5, 2020, now U.S. Pat. No. 10,761,604 issued Sep. 1, 2020, a continuation-in-part of U.S. patent application Ser. No. 16/854,787 filed Apr. 21, 2020, now U.S. Pat. No. 10,860,099 issued Dec. 8, 2020, and claims priority to U.S. Provisional Application No. 62/929,639 filed Nov. 1, 2019. The entire disclosure of each of which is hereby incorporated herein by reference.

FIELD OF THE DISCLOSURE

The present disclosure relates to digital displays, and in particular, to a light field display, and adjusted pixel rendering method and computer-readable medium therefor, and adjusted vision perception system and method using same.

BACKGROUND

Individuals routinely wear corrective lenses to accommodate for reduced vision acuity in consuming images and/or information rendered, for example, on digital displays provided, for example, in day-to-day electronic devices such as smartphones, smart watches, electronic readers, tablets, laptop computers and the like, but also provided as part of vehicular dashboard displays and entertainment systems, to name a few examples. The use of bifocals or progressive corrective lenses is also commonplace for individuals suffering from near and farsightedness.

The operating systems of current electronic devices having graphical displays offer certain "Accessibility" features built into the software of the device to attempt to provide users with reduced vision the ability to read and view content on the electronic device. Specifically, current accessibility options include the ability to invert images, increase the image size, adjust brightness and contrast settings, bold text, view the device display only in grey, and for those with legal blindness, the use of speech technology. These techniques focus on the limited ability of software to manipulate display images through conventional image manipulation, with limited success.

The use of 4D light field displays with lenslet arrays or parallax barriers to correct visual aberrations have since been proposed by Pamplona et al. (PAMPLONA, V., OLIVEIRA, M., ALIAGA, D., AND RASKAR, R. 2012. "Tailored displays to compensate for visual aberrations." ACM Trans. Graph. (SIGGRAPH) 31). Unfortunately, conventional light field displays as used by Pamplona et al. are subject to a spatio-angular resolution trade-off; that is, an increased angular resolution decreases the spatial resolution. Hence, the viewer sees a sharp image but at the expense of a significantly lower resolution than that of the screen. To mitigate this effect, Huang et al. (see, HUANG, F.-C., AND BARSKY, B. 2011. A framework for aberration compensated displays. Tech. Rep. UCB/EECS-2011-162, University of California, Berkeley, December; and HUANG, F.-C., LANMAN, D., BARSKY, B. A., AND RASKAR, R. 2012. Correcting for optical aberrations using multi layer displays. ACM Trans. Graph. (SiGGRAPH Asia) 31, 6, 185:1-185: 12) proposed the use of multilayer display designs together with prefiltering. The combination of prefiltering and these particular optical setups, however, significantly reduces the contrast of the resulting image.

Finally, in U.S. Patent Application Publication No. 2016/0042501 and Fu-Chung Huang, Gordon Wetzstein, Brian A. Barsky, and Ramesh Raskar. "Eyeglasses-free Display: Towards Correcting Visual Aberrations with Computational Light Field Displays". ACM Transaction on Graphics, 33(4), August 2014, the entire contents of each of which are hereby incorporated herein by reference, the combination of viewer-adaptive pre-filtering with off-the-shelf parallax barriers has been proposed to increase contrast and resolution, at the expense however, of computation time and power.

Optical devices, such as refractors and phoropters, are commonly used to test or evaluate the visual acuity of its users, for example, in the prescription of corrective eyewear, contact lenses or intraocular implants.

This background information is provided to reveal information believed by the applicant to be of possible relevance. No admission is necessarily intended, nor should be construed, that any of the preceding information constitutes prior art.

SUMMARY

The following presents a simplified summary of the general inventive concept(s) described herein to provide a basic understanding of some aspects of the disclosure. This summary is not an extensive overview of the disclosure. It is not intended to restrict key or critical elements of the embodiments of the disclosure or to delineate their scope beyond that which is explicitly or implicitly described by the following description and claims.

A need exists for a light field display, adjusted pixel rendering method therefor, and adjusted vision perception system and method using same, that overcome some of the drawbacks of known techniques, or at least, provide a useful alternative thereto. For example, a need exists for solutions that can address or can be operated to test or simulate corrective measures for astigmatism or similar conditions, or again to simulate or test for perceptive adjustments imparted by progressive or bifocal lenses, to name a few examples. Some aspects of disclosure provide embodiments of such systems, methods, and displays.

In accordance with one aspect, there is provided a computer-implemented method, automatically implemented by one or more digital processors, to automatically adjust user perception of an input to be rendered via a set of pixels and a corresponding array of light field shaping elements (LFSE), the method comprising, for each given pixel of at least some of the set of pixels: digitally projecting an adjusted image ray trace between said given pixel and a user pupil location to intersect a boundary plane location on a designated boundary image perception plane given a designated boundary image perception value and given a direction of a light field emanated by said given pixel based on a given LFSE intersected thereby; identifying an adjusted image location on an adjusted image plane corresponding with a designated adjusted image perception value designated for said boundary plane location; associating with said given pixel an adjusted image value designated for said adjusted image location; and rendering for each said given pixel said adjusted image value associated therewith.

In accordance with another aspect, there is provided a non-transitory computer-readable medium comprising digital instructions to be implemented by one or more digital processors to automatically adjust user perception of an input to be rendered via a set of pixels and a corresponding array of light field shaping elements (LFSE), by, for each given pixel of at least some of the set of pixels: digitally projecting an adjusted image ray trace between said given pixel and a user pupil location to intersect a boundary plane location on a designated boundary image perception plane given a designated boundary image perception value and given a direction of a light field emanated by said given pixel based on a given LFSE intersected thereby; identifying an adjusted image location on an adjusted image plane corresponding with a designated adjusted image perception value designated for said boundary plane location; and associating with said given pixel an adjusted image value designated for said adjusted image location to be rendered accordingly.

In one embodiment, the method further comprises or the computer-readable medium further comprises instructions for calculating a vector between said given pixel and said user pupil location; and approximating said direction of said light field emanated by said given pixel based on said given LFSE intersected by said vector.

In one embodiment, each of said designated boundary image perception plane and said adjusted image plane comprise a virtual image plane virtually positioned relative to the pixels as a function of said designated boundary image perception value and said designated adjusted image perception value associated therewith, respectively.

In one embodiment, the designated boundary image perception plane comprises an eye focus plane associated with said designated boundary image perception value.

In one embodiment, the digitally projecting comprises digitally projecting said adjusted image ray trace to intersect respective boundary plane locations on respective designated boundary image perception planes given respective boundary image perception values; and said adjusted image location on said adjusted image plane is interpolated between said respective designated boundary image perception planes as a function of said designated adjusted image perception value.

In one embodiment, the designated adjusted image perception value is designated as a function of a perceptive depth mapping between said respective designated boundary image perception planes.

In one embodiment, the perceptive depth mapping is defined by a greyscale mapping.

In one embodiment, the designated adjusted image perception value is designated as a function of a perceptive depth mapping of said designated boundary image perception plane.

In one embodiment, the depth mapping results in defining distinct visual perception zones associated with respective visual perception parameters.

In one embodiment, the depth mapping results in a progressive perception adjustment of the input image.

In one embodiment, it simulates a multi-focal effect for distinct portions of the input, wherein said adjusted image plane comprises said designated boundary image perception plane when said boundary plane location corresponds with one of said distinct portions, whereas said adjusted image plane comprises a distinct adjusted image plane when said boundary plane location corresponds with another one of said distinct portions.

In one embodiment, it simulates a progressive multi-focal effect, wherein progressively varying adjusted image planes are progressively defined to correspond with intermediary regions between the distinct portions.

In accordance with another aspect, there is provided a digital display device comprising: an array of pixels; an array of light field shaping elements (LFSEs) to shape a light field emanating from said pixels and thereby at least partially govern a projection thereof from said pixels toward a given user pupil location; a computer-readable medium as defined above; and a hardware processor operable to execute said digital instructions of said computer-readable medium to render for each said given pixel said adjusted image value associated therewith.

In accordance with another aspect, there is provided a digital display device comprising: an array of pixels; an array of light field shaping elements (LFSEs) to shape a light field emanating from said pixels and thereby at least partially govern a projection thereof from said pixels toward a given user pupil location; and a hardware processor operable on pixel data for an input image to output adjusted image pixel data to be rendered via said LFSEs to adjust user perception from said given user pupil location in accordance with a variable perception adjustment mapping that varies across the input image thereby rendering a perceptively adjusted version of the input image according to said variable perception adjustment mapping.

In one embodiment, the hardware processor outputs said adjusted pixel data as a function of adjusted image ray traces digitally computed for each given pixel of at least some of the array of pixels that intersect said user pupil location.

In one embodiment, the perceptive adjustment mapping is defined between respective designated boundary image perception planes.

In one embodiment, the perceptive adjustment mapping is defined by a greyscale mapping.

In one embodiment, the perceptive adjustment mapping results in defining distinct visual perception zones associated with respective visual perception parameters.

In one embodiment, the perceptive adjustment mapping results in a progressive perception adjustment of the input image.

In one embodiment, the perceptive adjustment mapping digitally simulates a multi-focal effect for distinct portions of the input image.

In one embodiment, the multi-focal effect comprises a progressive multi-focal effect.

In one embodiment, the device further comprises a pupil tracker or pupil tracking interface operable to dynamically track and automatically accommodate for changes in said given user pupil location.

In one embodiment, the array of LFSEs comprises a lenslet array.

In one embodiment, the variable perception adjustment mapping defines respective perception adjustment zones to be perceptively rendered side-by-side.

In one embodiment, the respective perception adjustment zones are to be perceptively rendered side-by-side in a 2-dimensional grid.

In one embodiment, each of said perception adjustment zones corresponds to an optotype simultaneously rendered in each of said zones side-by-side to subjectively assess a user's reduced visual acuity.

In one embodiment, at least some of said perception adjustment zones are dynamically variable so to subjectively assess the user's reduced visual acuity.

In one embodiment, each of said perception adjustment zones are defined by a respective set of one or more visual acuity parameters.

Other aspects, features and/or advantages will become more apparent upon reading of the following non-restrictive description of specific embodiments thereof, given by way of example only with reference to the accompanying drawings.

BRIEF DESCRIPTION OF THE FIGURES

Several embodiments of the present disclosure will be provided, by way of examples only, with reference to the appended drawings, wherein:

FIGS. 17A to 17D are schematic diagrams illustrating certain process steps of FIGS. 13 and 16, in accordance with one embodiment;

FIGS. 22A to 22D are schematic diagrams illustrating certain process steps of FIGS. 21A and 21B, in accordance with one embodiment;

Figure 1A:
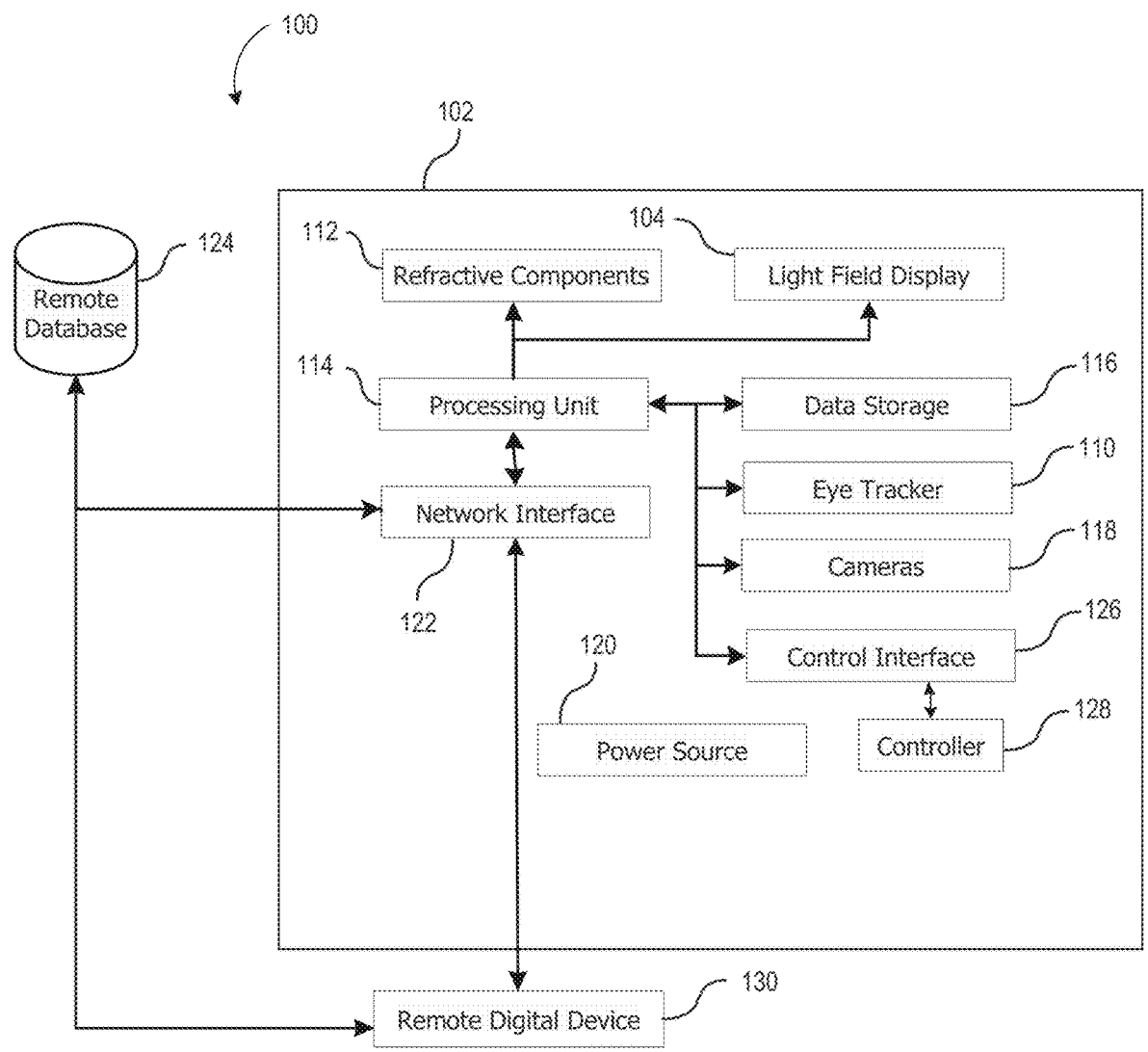
FIGS. 1A and 1B are schematic diagrams of an exemplary light field vision testing or previewing system, in accordance with one embodiment.

Elements in the several figures are illustrated for simplicity and clarity and have not necessarily been drawn to scale. For example, the dimensions of some of the elements in the figures may be emphasized relative to other elements for facilitating understanding of the various presently disclosed embodiments. Also, common, but well-understood elements that are useful or necessary in commercially feasible embodiments are often not depicted in order to facilitate a less obstructed view of these various embodiments of the present disclosure.

DETAILED DESCRIPTION

Various implementations and aspects of the specification will be described with reference to details discussed below. The following description and drawings are illustrative of the specification and are not to be construed as limiting the specification. Numerous specific details are described to provide a thorough understanding of various implementations of the present specification. However, in certain instances, well-known or conventional details are not described in order to provide a concise discussion of implementations of the present specification.

Various apparatuses and processes will be described below to provide examples of implementations of the system disclosed herein. No implementation described below limits any claimed implementation and any claimed implementations may cover processes or apparatuses that differ from those described below. The claimed implementations are not limited to apparatuses or processes having all of the features of any one apparatus or process described below or to features common to multiple or all of the apparatuses or processes described below. It is possible that an apparatus or process described below is not an implementation of any claimed subject matter.

Furthermore, numerous specific details are set forth in order to provide a thorough understanding of the implementations described herein. However, it will be understood by those skilled in the relevant arts that the implementations described herein may be practiced without these specific details. In other instances, well-known methods, procedures and components have not been described in detail so as not to obscure the implementations described herein.

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

It is understood that for the purpose of this specification, language of "at least one of X, Y, and Z" and "one or more of X, Y and Z" may be construed as X only, Y only, Z only, or any combination of two or more items X, Y, and Z (e.g., XYZ, XY, YZ, ZZ, and the like). Similar logic may be applied for two or more items in any occurrence of "at least one . . . " and "one or more . . . " language.

The systems and methods described herein provide, in accordance with different embodiments, different examples of a light field display, adjusted pixel rendering method therefor, and adjusted vision perception system and method using same. For example, some of the herein-described embodiments provide improvements or alternatives to current light field display technologies, for instance, in testing a user's visual acuity and/or need for corrective measures, and/or in simulating or providing previewing capabilities for the effect of corrective lenses or solutions (e.g. eyewear, contact or intraocular lenses, surgery, etc.) such as that commonly provided by progressive or bifocal lenses, and/or other corrective measures to be applied in addressing visual aberrations. For example, in some of the embodiments described below, light field solutions are provided to evaluate, simulate or preview variable refractive corrections or accommodations that combine distinct, variations and/or gradients in applied or perceptively observed corrective or adjusted dioptric powers, for example.

These and other such applications will be described in further detail below. For example, devices, displays and methods described herein may allow a user's perception of one or more input images (or input image portions), where each image or image portion is virtually located or perceived to be at a distinct image plane/depth location, to be adjusted or altered using the described light field display technology, again allowing for corrective assessment and/or previewing capabilities in respect of this viewer's reduced visual acuity or aberrations.

Some of the herein described embodiments provide for digital display devices, or devices encompassing such displays, for use by users having reduced visual acuity, whereby images ultimately rendered by such devices can be dynamically processed to accommodate the user's reduced visual acuity so that they may comfortably consume rendered images without the use of corrective eyewear, contact lenses, or surgical intervention, as would otherwise be required. As noted above, embodiments are not to be limited as such as the notions and solutions described herein may also be applied to other technologies in which a user's perception of an input image to be displayed can be altered or adjusted via the light field display. Again, similar implementation of the herein described embodiments can allow for implementation of digitally adaptive vision tests or corrective or adaptive vision previews or simulations such that individuals with such reduced visual acuity can be exposed to distinct perceptively adjusted versions of an input image(s) to subjectively ascertain a potentially required or preferred vision correction.

Generally, digital displays as considered herein will comprise a set of image rendering pixels and a corresponding set of light field shaping elements that at least partially govern a light field emanated thereby to produce a perceptively adjusted version of the input image, notably distinct perceptively adjusted portions of an input image or input scene, which may include distinct portions of a same image, a same 2.5D/3D scene, or distinct images (portions) associated with different image depths, effects and/or locations and assembled into a combined visual input. For simplicity, the following will generally consider distinctly addressed portions or segments as distinct portions of an input image, whether that input image comprises a singular image having distinctly characterized portions, a digital assembly of distinctly characterized images, overlays, backgrounds, foregrounds or the like, or any other such digital image combinations.

In some examples, light field shaping elements may take the form of a light field shaping layer or like array of optical elements to be disposed relative to the display pixels in at least partially governing the emanated light field. As described in further detail below, such light field shaping layer elements may take the form of a microlens and/or pinhole array, or other like arrays of optical elements, or again take the form of an underlying light field shaping layer, such as an underlying array of optical gratings or like optical elements operable to produce a directional pixelated output.

Within the context of a light field shaping layer, as described in further detail below in accordance with some embodiments, the light field shaping layer can be disposed at a pre-set distance from the pixelated display so to controllably shape or influence a light field emanating therefrom. For instance, each light field shaping layer can be defined by an array of optical elements centered over a corresponding subset of the display's pixel array to optically influence a light field emanating therefrom and thereby govern a projection thereof from the display medium toward the user, for instance, providing some control over how each pixel or pixel group will be viewed by the viewer's eye(s). As will be further detailed below, arrayed optical elements may include, but are not limited to, lenslets, microlenses or other such diffractive optical elements that together form, for example, a lenslet array; pinholes or like apertures or windows that together form, for example, a parallax or like barrier; concentrically patterned barriers, e.g. cut outs and/or windows, such as a to define a Fresnel zone plate or optical sieve, for example, and that together form a diffractive optical barrier (as described, for example, in Applicant's co-pending U.S. application Ser. No. 15/910,908, the entire contents of which are hereby incorporated herein by reference); and/or a combination thereof, such as for example, a lenslet array whose respective lenses or lenslets are partially shadowed or barriered around a periphery thereof so to combine the refractive properties of the lenslet with some of the advantages provided by a pinhole barrier.

In operation, the display device will also generally invoke a hardware processor operable on image pixel (or subpixel) data for an image to be displayed to output corrected or adjusted image pixel data to be rendered as a function of a stored characteristic of the light field shaping elements and/or layer (e.g. layer distance from display screen, distance between optical elements (pitch), absolute relative location of each pixel or subpixel to a corresponding optical element, properties of the optical elements (size, diffractive and/or refractive properties, etc.), or other such properties, and a selected vision correction or adjustment parameter related to the user's reduced visual acuity or intended viewing experience. While light field display characteristics will generally remain static for a given implementation (i.e. a given shaping element and/or layer will be used and set for each device irrespective of the user), image processing can, in some embodiments, be dynamically adjusted as a function of the user's visual acuity or intended application so to actively adjust a distance of a virtual image plane, or perceived image on the user's retinal plane given a quantified user eye focus or like optical aberration(s), induced upon rendering the corrected/adjusted image pixel data via the static optical layer and/or elements, for example, or otherwise actively adjust image processing parameters as may be considered, for example, when implementing a viewer-adaptive pre-filtering algorithm or like approach (e.g. compressive light field optimization), so to at least in part govern an image perceived by the user's eye(s) given pixel or subpixel-specific light visible thereby through the layer.

Figure 1B:
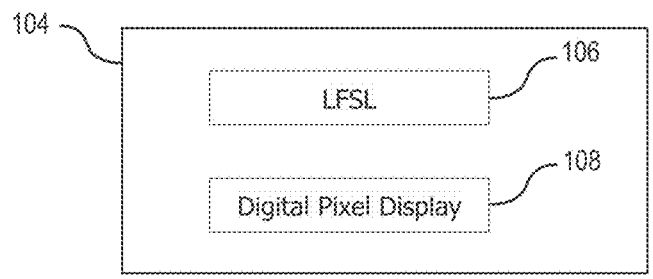

With reference to FIGS. 1A and 1B, and in accordance with different embodiments, an exemplary subjective vision testing device/system (interchangeably referred to as a corrective vision previewing device/system), generally referred to using the numeral 100, will now be described. At the heart of this system is a light field vision testing device such as a light field refractor or phoropter device 102. Generally, light field refractor 102 is a device comprising, as mentioned above, a light field display 104 and which is operable to display or generate one or more images, including optotypes, to a user or patient having his/her vision acuity (e.g. refractive error) tested.

In some embodiments, as illustrated in FIG. 1B, light field display 104 comprises a light field shaping layer (LFSL) 108 overlaid or placed in front of a digital pixel display 110 (i.e. LCD, LED, OLED, etc.). For the sake of illustration, the following embodiments will be described within the context of a LFSL 108 defined, at least in part, by a lenslet array comprising an array of microlenses (also interchangeably referred to herein as lenslets) that are each disposed at a distance from a corresponding subset of image rendering pixels in an underlying digital display. It will be appreciated that while a light field shaping layer may be manufactured and disposed as a digital screen overlay, other integrated concepts may also be considered, for example, where light field shaping elements are integrally formed or manufactured within a digital screen's integral components such as a textured or masked glass plate, beam-shaping light sources (e.g. directional light sources and/or backlit integrated optical grating array) or like component.

Accordingly, each lenslet will predictively shape light emanating from these pixel subsets to at least partially govern light rays being projected toward the user by the display device. As noted above, other light field shaping layers may also be considered herein without departing from the general scope and nature of the present disclosure, whereby light field shaping will be understood by the person of ordinary skill in the art to reference measures by which light, that would otherwise emanate indiscriminately (i.e. isotropically) from each pixel group, is deliberately controlled to define predictable light rays that can be traced between the user and the device's pixels through the shaping layer.

For greater clarity, a light field is generally defined as a vector function that describes the amount of light flowing in every direction through every point in space. In other words, anything that produces or reflects light has an associated light field. The embodiments described herein produce light fields from an object that are not "natural" vector functions one would expect to observe from that object. This gives it the ability to emulate the "natural" light fields of objects that do not physically exist, such as a virtual display located far behind the light field display.

Figure 2A:
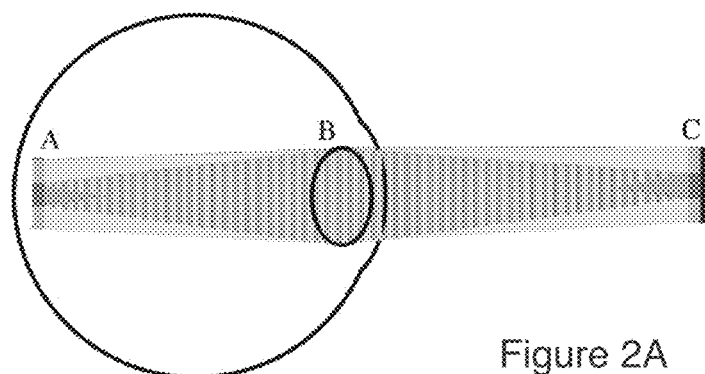
FIGS. 2A to 2C schematically illustrate normal vision, blurred vision, and corrected vision in accordance with one embodiment, respectively.
Figure 2B:
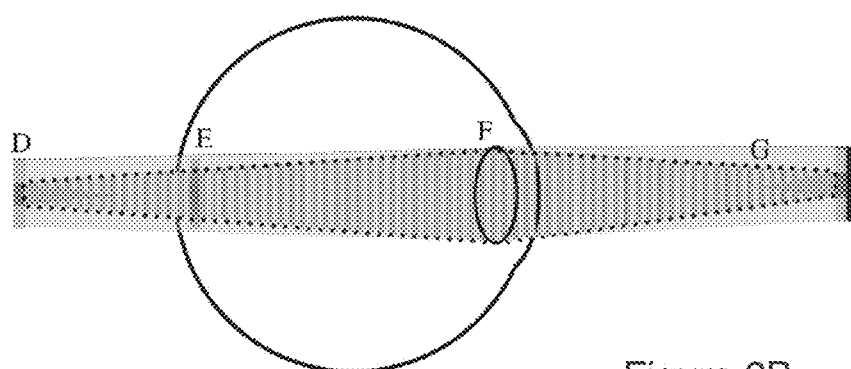

In one example, to apply this technology to vision correction, consider first the normal ability of the lens in an eye, as schematically illustrated in FIG. 2A, where, for normal vision, the image is to the right of the eye (C) and is projected through the lens (B) to the retina at the back of the eye (A). As comparatively shown in FIG. 2B, the poor lens shape and inability to accommodate (F) in presbyopia causes the image to be focused past the retina (D) forming a blurry image on the retina (E). The dotted lines outline the path of a beam of light (G). Naturally, other optical aberrations present in the eye will have different impacts on image formation on the retina. To address these aberrations, a light field display 104, in accordance with some embodiments, projects the correct sharp image (H) on the retina for an eye with a crystalline lens which otherwise could not accommodate sufficiently to produce a sharp image. The other two light field pixels (I) and (J) are drawn lightly, but would otherwise fill out the rest of the image.

Figure 2C:
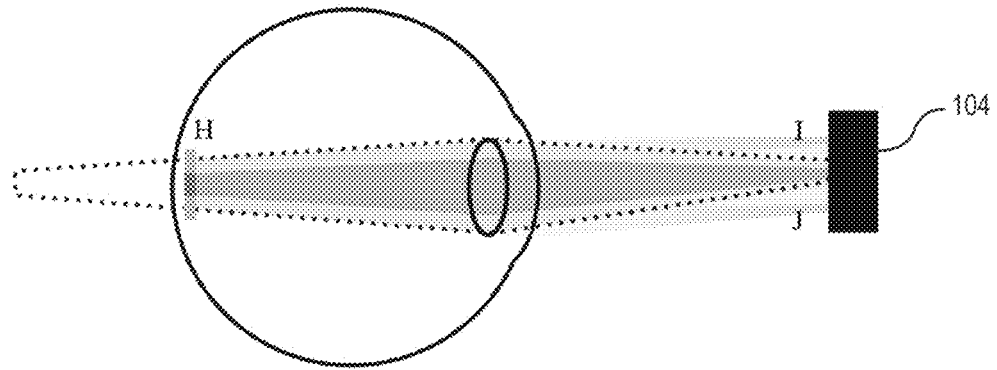
Figure 3A:
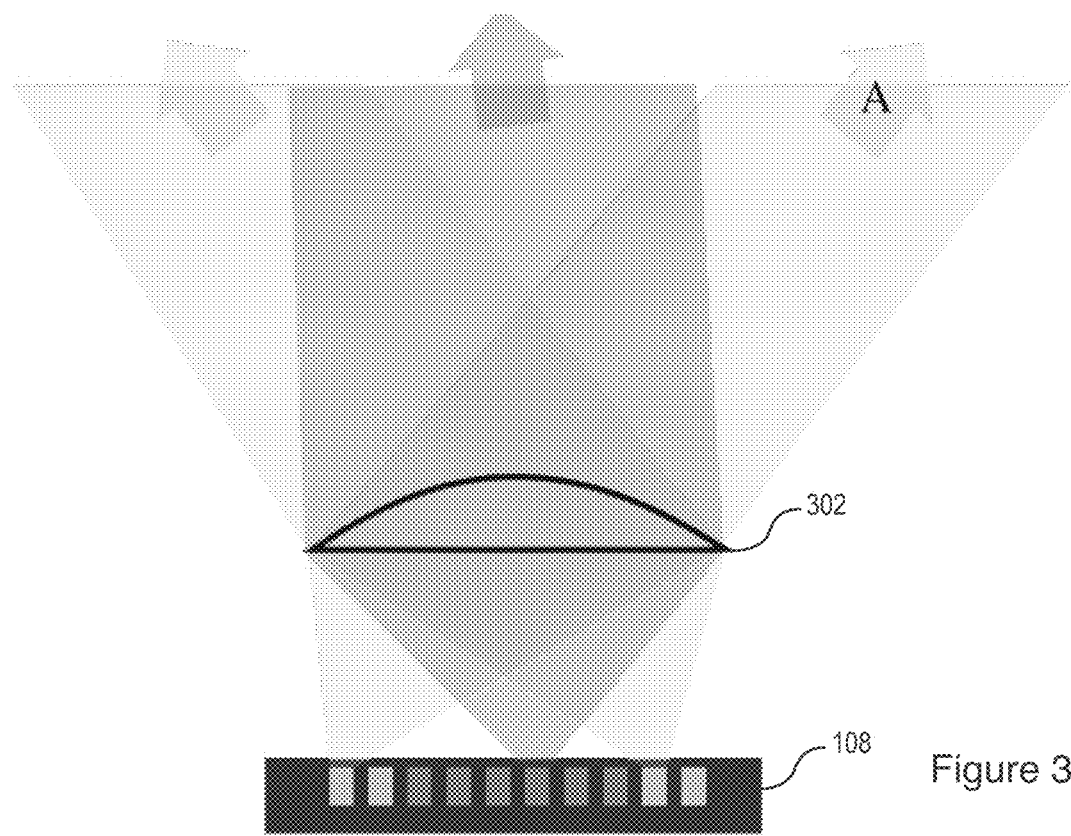
FIGS. 3A and 3B are schematic diagrams of a light field display in which respective pixel subsets are aligned to emit light through a corresponding microlens or lenslet, in accordance with one embodiment.

As will be appreciated by the skilled artisan, a light field as seen in FIG. 2C cannot be produced with a 'normal' two-dimensional display because the pixels' light field emits light isotopically. Instead it is necessary to exercise tight control on the angle and origin of the light emitted, for example, using a microlens array or other light field shaping layer such as a parallax barrier, or combination thereof. Following with the example of a microlens array for LFSL 106, FIG. 3A schematically illustrates a single light field pixel defined by a convex microlens 302 disposed at its focus from a corresponding subset of pixels in a digital pixel display 108 to produce a substantially collimated beam of light emitted by these pixels, whereby the direction of the beam is controlled by the location of the pixel(s) relative to the microlens. The single light field pixel produces a beam similar to that shown in FIG. 2C where the outside rays are lighter and the majority inside rays are darker. The digital pixel display 108 emits light which hits the microlens 302 and it results in a beam of substantially collimated light (A).

Figure 3B:
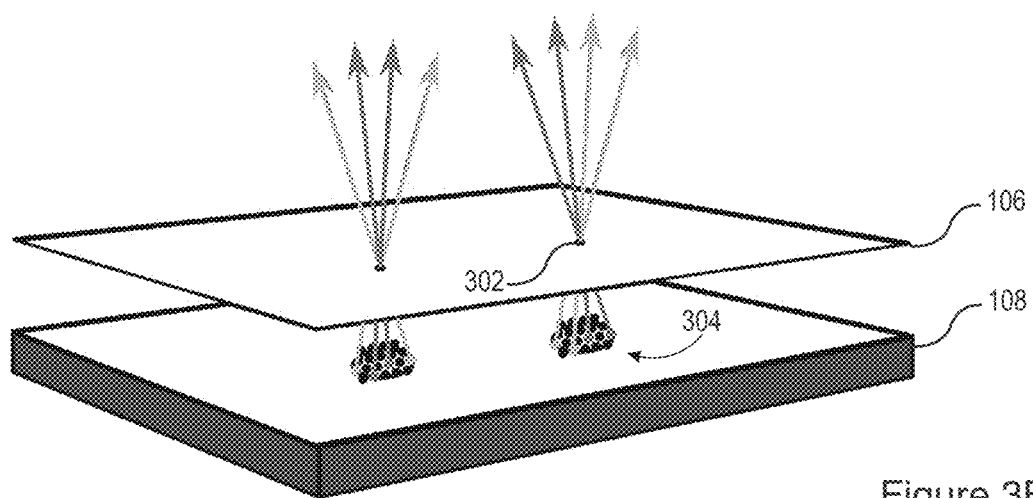

Accordingly, upon predictably aligning a particular microlens array with a pixel array, a designated "circle" of pixels will correspond with each microlens and be responsible for delivering light to the pupil through that lens. FIG. 3B schematically illustrates an example of a light field display assembly in which a LFSL 106 sits above a pixel display 108 to have pixels 304 emit light through the microlens array. A ray-tracing algorithm can thus be used to produce a pattern to be displayed on the pixel array below the microlens in order to create the desired virtual image that will effectively correct for the viewer's reduced visual acuity.

As will be detailed further below, the separation between the LFSL 106 and the pixel array 108 as well as the pitch of the lenses can be selected as a function of various operating characteristics, such as the normal or average operating distance of the display, and/or normal or average operating ambient light levels.

In some embodiments, LFSL 106 may be a microlens array (MLA) defined by a hexagonal array of microlenses or lenslet disposed so to overlay a corresponding square pixel array of digital pixel display 108. In doing so, while each microlens can be aligned with a designated subset of pixels to produce light field pixels as described above, the hexagonal-to-square array mismatch can alleviate certain periodic optical artifacts that may otherwise be manifested given the periodic nature of the optical elements and principles being relied upon to produce the desired optical image corrections. Conversely, a square microlens array may be favoured when operating a digital display comprising a hexagonal pixel array.

In some embodiments, the MLA may further or alternatively be overlaid or disposed at an angle (rotation) relative to the underlying pixel array, which can further or alternatively alleviate period optical artifacts.

In yet some further or alternative embodiments, a pitch ratio between the microlens array and pixel array may be deliberately selected to further or alternatively alleviate periodic optical artifacts. For example, a perfectly matched pitch ratio (i.e. an exact integer number of display pixels per microlens) is most likely to induce periodic optical artifacts, whereas a pitch ratio mismatch can help reduce such occurrences.

Accordingly, in some embodiments, the pitch ratio will be selected to define an irrational number, or at least, an irregular ratio, so to minimize periodic optical artifacts. For instance, a structural periodicity can be defined so to reduce the number of periodic occurrences within the dimensions of the display screen at hand, e.g. ideally selected so to define a structural period that is greater than the size of the display screen being used.

While this example is provided within the context of a microlens array, similar structural design considerations may be applied within the context of a parallax barrier, diffractive barrier or combination thereof. In some embodiments, light field display 104 can render dynamic images at over 30 frames per second on the hardware in a smartphone.

Accordingly, a display device as described above and further exemplified below, can be configured to render a corrected or adjusted image via the light field shaping layer that accommodates, tests or simulates for the user's visual acuity. By adjusting the image correction in accordance with the user's actual predefined, set or selected visual acuity level, different users and visual acuity may be accommodated using a same device configuration, whereas adjusting such parameters for a given user may allow for testing for or simulation of different corrective or visual adjustment solutions. For example, by adjusting corrective image pixel data to dynamically adjust a virtual image distance below/above the display as rendered via the light field shaping layer, different visual acuity levels may be accommodated, and that, for an image input as a whole, for distinctly various portions thereof, or again progressively across a particular input.

As noted in the examples below, in some embodiments, light field rendering may be adjusted to effectively generate a virtual image on a virtual image plane that is set at a designated distance from an input user pupil location, for example, so to effectively push back, or move forward, a perceived image, or portion thereof, relative to the light field refractor device 102. In yet other embodiments, light field rendering may rather or alternatively seek to map the input image on a retinal plane of the user, taking into account visual aberrations, so to adaptively adjust rendering of the input image on the display device to produce the mapped effect. Namely, where the unadjusted input image would otherwise typically come into focus in front of or behind the retinal plane (and/or be subject to other optical aberrations), this approach allows to map the intended image on the retinal plane and work therefrom to address designated optical aberrations accordingly. Using this approach, the device may further computationally interpret and compute virtual image distances tending toward infinity, for example, for extreme cases of presbyopia. This approach may also more readily allow, as will be appreciated by the below description, for adaptability to other visual aberrations that may not be as readily modeled using a virtual image and image plane implementation. In both of these examples, and like embodiments, the input image is digitally mapped to an adjusted image plane (e.g. virtual image plane or retinal plane) designated to provide the user with a designated image perception adjustment that at least partially addresses designated visual aberrations. Naturally, while visual aberrations may be addressed using these approaches, other visual effects may also be implemented using similar techniques.

Figure 5:
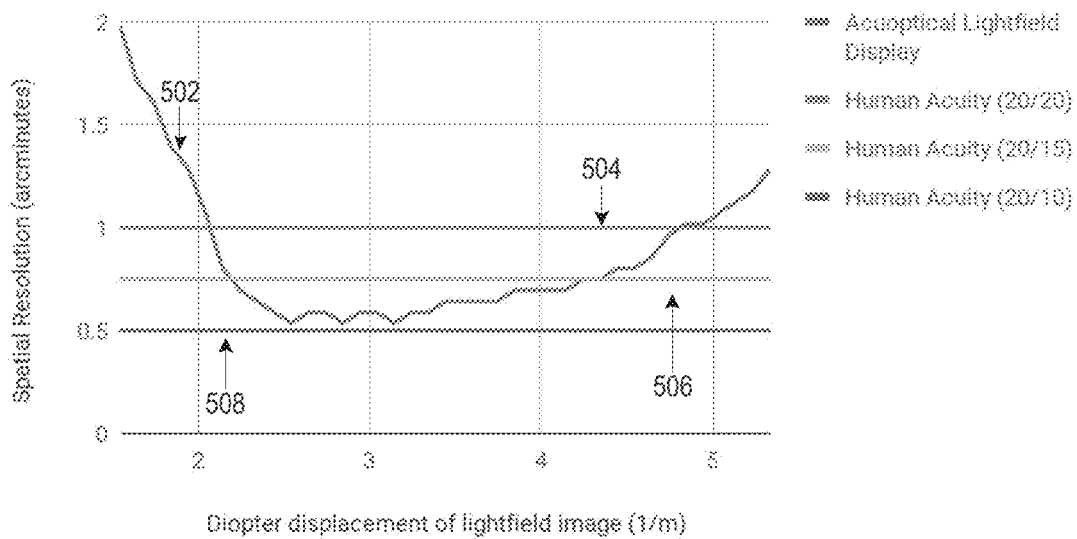
FIG. 5 is a plot of the angular resolution of an exemplary light field display as a function of the dioptric power generated, in accordance with one embodiment.

As an example of the effectiveness of the light field display in generating a diopter displacement (e.g. simulate the effect of looking through an optical component (i.e. a lens) of a given diopter strength or power) is shown in FIG. 5, where a plot is shown of the angular resolution (in arcminutes) of an exemplary light field display comprising a 1500 ppi digital pixel display, as a function of the dioptric power of the light field image (in diopters). From this plot, it is clear that, in this particular example, the light field display is able to generate displacements (line 502) in diopters that have higher resolution corresponding to 20/20 vision (line 504) or better (e.g. 20/15—line 506) and close to (20/10—line 508)), here within a dioptric power range of 2 to 2.5 diopters.

Thus, in the context of a refractor 102, light field display 104 (in conjunction with the light field rendering or ray-tracing methods described below) may, according to different embodiments, be used to replace, at least in part, traditional optical components.

In some embodiments, the light field display can display a virtual image at optical infinity, meaning that any level of accommodation-based presbyopia (e.g. first order) can be corrected for. In some further embodiments, the light field display can both push the image back or forward, thus allowing for selective image corrections for both hyperopia (far-sightedness) and myopia (nearsightedness). In yet further embodiments as described below, variable displacements and/or accommodations may be applied as a function of non-uniform visual aberrations, or again to provide perceptive previewing or simulation of non-uniform or otherwise variable corrective powers/measures across a particular input or field of view.

However, the light field rendering system introduced above and the ray-tracing methods described below may also be used with other devices which may similarly comprise a light field display. For example, this may include a smartphone, tablets, e-readers, watches, televisions, GPS devices, laptops, desktop computer monitors, televisions, smart televisions, handheld video game consoles and controllers, vehicular dashboard and/or entertainment displays, and the like, without limitation.

Accordingly, any of the light field processing or ray-tracing methods described below, any modification thereto also discussed below, and related light field display solutions, can be equally applied to image perception adjustment solutions for visual media consumption, as they can for subjective vision testing solutions, or other technologically related fields of endeavour. As alluded to above, the light field display and rendering/ray-tracing methods discussed above may all be used to implement, according to various embodiments, a subjective vision testing device or system such as a phoropter or refractor. Indeed, a light field display may replace, at least in part, the various refractive optical components usually present in such a device. Thus, the vision correction light field ray tracing methods discussed below may equally be applied to render optotypes at different dioptric power or refractive correction by generating vision correction for hyperopia (far-sightedness) and myopia (nearsightedness), as was described above in the general case of a vision correction display. Light field systems and methods described herein, according to some embodiments, may be applied to create the same capabilities as a traditional instrument and to open a spectrum of new features, all while improving upon many other operating aspects of the device. For example, the digital nature of the light field display enables continuous changes in dioptric power compared to the discrete change caused by switching or changing a lens or similar; displaying two or more different dioptric corrections seamlessly at the same time; and, in some embodiments, the possibility of measuring higher-order aberrations and/or to simulate them for different purposes such as, deciding for free-form lenses, cataract surgery operation protocols, IOL choice, etc.

Going back to FIG. 1A, as producing a light field with angular resolution sufficient for accommodation correction over the full viewing 'zone' of a display would generally require an astronomically high pixel density, instead, a correct light field can be produced, in some embodiments, only at or around the location of the user's pupil(s). To do so, where a location or position of the user's eye is not otherwise rigidly constrained (e.g. within the context of a subject eye testing device or the like) the light field display can be paired with pupil tracking technology, as will be discussed below, to track a location of the user's eyes/pupils relative to the display. The display can then compensate for the user's eye location and produce the correct virtual image, for example, in real-time. Thus, in some embodiments, light field refractor 102 may include, integrated therein or interfacing therewith, a pupil/eye tracking system 110 to improve or enhance corrective image rendering by tracking a location of the user's eye(s)/pupil(s) (e.g. both or one, e.g. dominant, eye(s)) and adjusting light field corrections accordingly one or more eye/pupil tracking light sources, such as one or more infrared (IR) or near-IR (NIR) light source(s) to accommodate operation in limited ambient light conditions, leverage retinal retro-reflections, invoke corneal reflection, and/or other such considerations. For instance, different IR/NIR pupil tracking techniques may employ one or more (e.g. arrayed) directed or broad illumination light sources to stimulate retinal retro-reflection and/or corneal reflection in identifying a tracking a pupil location. Other techniques may employ ambient or IR/NIR light-based machine vision and facial recognition techniques to otherwise locate and track the user's eye(s)/pupil(s). To do so, one or more corresponding (e.g. visible, IR/NIR) cameras may be deployed to capture eye/pupil tracking signals that can be processed, using various image/sensor data processing techniques, to map a 3D location of the user's eye(s)/pupil(s). As mentioned above, in some embodiments, such eye/pupil tracking hardware/software may be integral to device 102, for instance, operating in concert with integrated components such as one or more front facing camera(s), onboard IR/NIR light source(s) (not shown) and the like. In other user environments, such as in a vehicular environment, eye/pupil tracking hardware may be further distributed within the environment, such as dash, console, ceiling, windshield, mirror or similarly-mounted camera(s), light sources, etc.

Figure 4A:
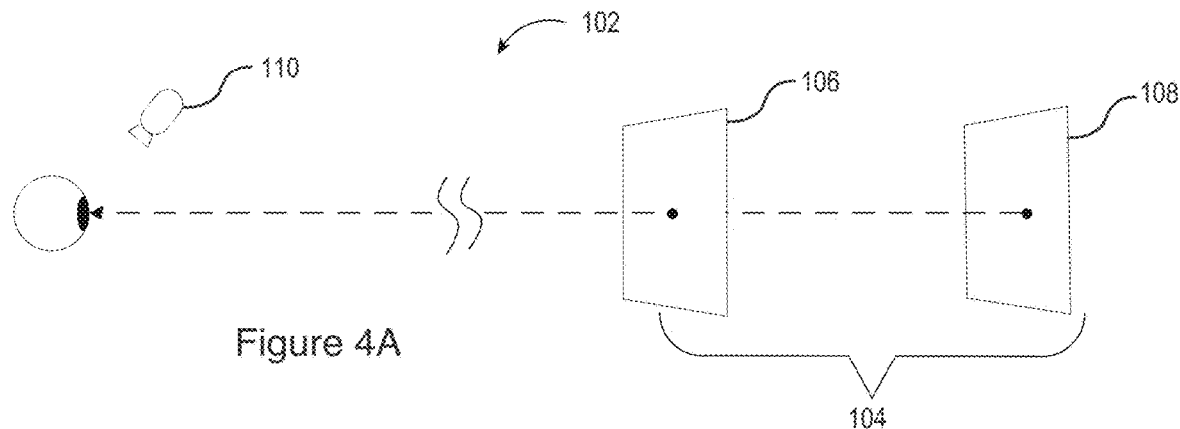
FIGS. 4A to 4C are schematic diagrams of exemplary light field vision testing or previewing systems (e.g. refractors/phoropters), in accordance with different embodiments.
Figure 4B:
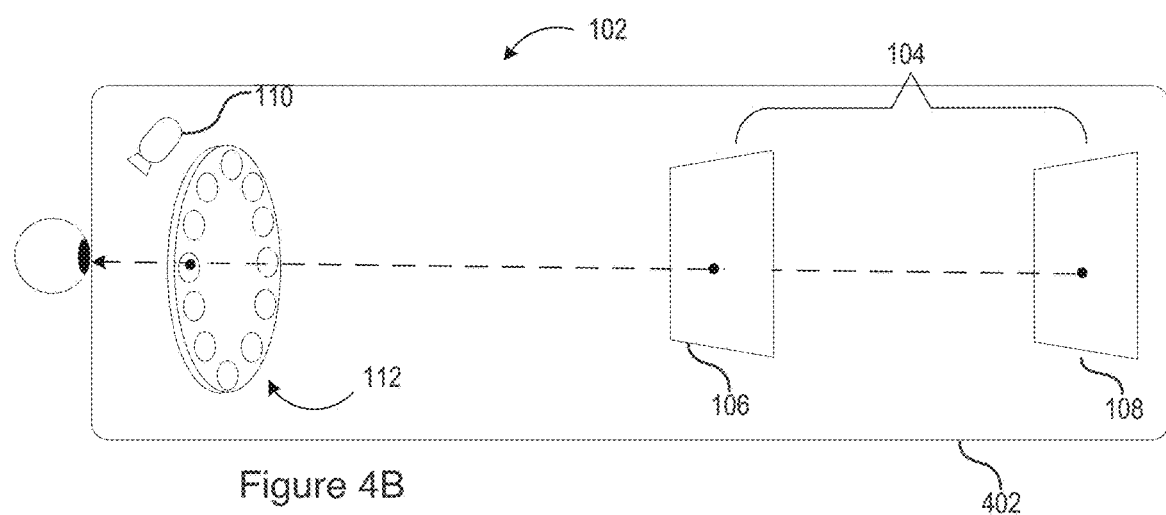
Figure 4C:
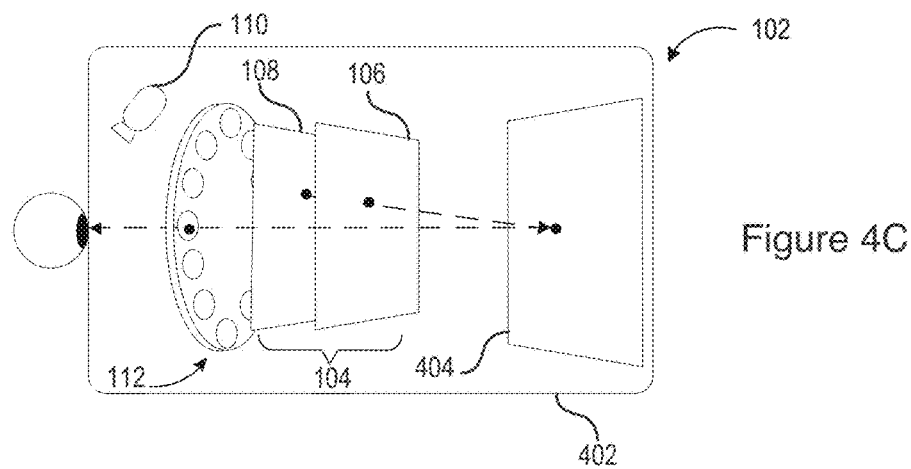

In one embodiment and as illustrated in FIG. 4A, light field refractor 102 may be configured with light field display 104 located relatively far away (e.g. one or more meters) from the user's eye currently being diagnosed. Note that the pointed line in FIGS. 4A to 4C is used to schematically illustrate the direction of the light rays emitted by light field display 104. Also illustrated is eye-tracker 110, which may be provided as a physically separate element, for example, installed in at a given location in a room or similar. In some embodiments, the noted eye/pupil tracker 110 may include the projection of IR markers/patterns to help align the patient's eye with the light field display. In some embodiments, a tolerance window (e.g. "eye box") may be considered to limit the need to refresh the ray-tracing iteration. An exemplary value of the size of the eye box, in some embodiments, is around 6 mm, though smaller (e.g. 4 mm)

or larger eye boxes may alternatively be set to impact image quality, stability or like operational parameters.

Going back to FIG. 1A, light field refractor 102 may also comprise, according to different embodiments and as will be further discussed below, one or more refractive optical components 112, a processing unit 114, a data storage unit or internal memory 116, one or more cameras 118, a power source 120, a network interface 122 for communicating via network to a remote database or server 124.

In some embodiments, power source 120 may comprise, for example, a rechargeable Li-ion battery or similar. In some embodiments, it may comprise an additional external power source, such as, for example, a USB-C external power supply. It may also comprise a visual indicator (screen or display) for communicating the device's power status, for example whether the device is on/off or recharging.

In some embodiments, internal memory 116 may be any form of electronic storage, including a disk drive, optical drive, read-only memory, random-access memory, or flash memory, to name a few examples. In some embodiments, a library of chart patterns (Snellen charts, prescribed optotypes, forms, patterns, or other) may be located in internal memory 116 and/or retrievable from remote server 124 via network interface 122.

Figure 6A:
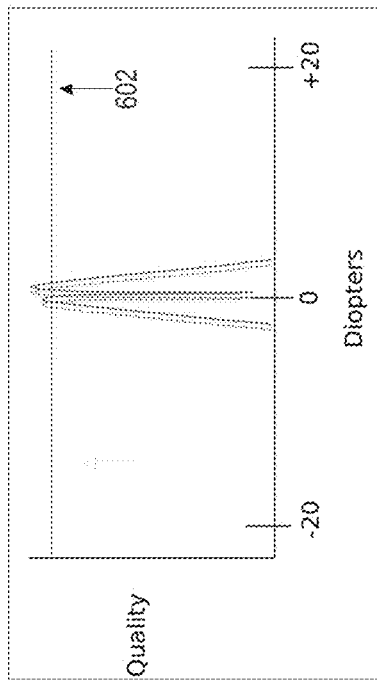
FIGS. 6A to 6D are schematic plots of the image quality generated by a light field refractor/phoropter as a function of the dioptric power generated by using in combination with the light field display (A) no refractive component, (B) one refractive component, (C) and (D) a multiplicity of refractive components.
Figure 6B:
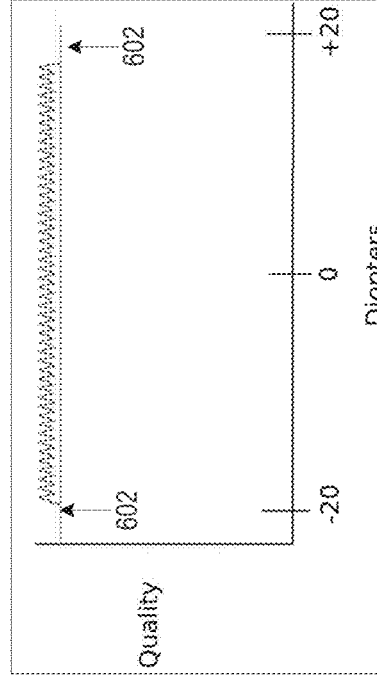

In some embodiments, one or more optical components 112 may be used in combination with the light field display 104, for example to shorten the size of refractor 102 and still offer an acceptable range in dioptric power. The general principle is schematically illustrated in the plots of FIGS. 6A to 6D. In these schematic plots, the image quality (e.g. inverse of the angular resolution, higher is better) at which optotypes are small enough to be useful for vision testing in this plot is above horizontal line 602 which represents typical 20/20 vision. FIG. 6A shows the plot for the light field display only, where we see the characteristic two peaks corresponding to the smallest resolvable point, one of which was plotted in FIG. 5 (here inverted and shown as a peak instead of a basin), and where each region above the line may cover a few diopters of dioptric power, according to some embodiments. While the dioptric range may, in some embodiments, be more limited than needed when relying only on the light field display, it is possible to shift this interval by adding one or more refractive optical components. This is shown in FIG. 6B where the regions above the line 602 is shifted to the left (negative diopters) by adding a single lens in the optical path.

Figure 6C:
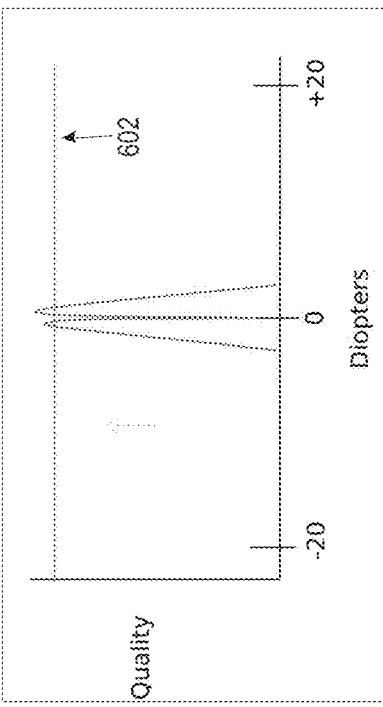
Figure 6D:
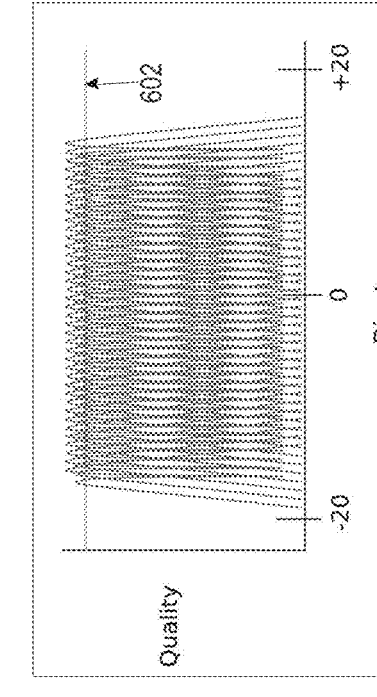

Thus, by using a multiplicity of refractive optical components 112 or by alternating sequentially between different refractive components 112 of increasing or decreasing dioptric power, it is possible to shift the center of the light field diopter range to any required value, as shown in FIG. 6C, and thus the image quality may be kept above line 602 for any required dioptric power as shown in FIG. 6D. In some embodiments, a range of 30 diopters from +10 to −20 may be covered for example. In the case of one or more reels of lenses, the lens may be switched for a given larger dioptric power increment, and the light field display would be used to provide a finer continuous change to accurately pin-point the required total dioptric power required to compensate for the patient's reduced visual acuity. This would still result in light field refractor 102 having a reduced number of refractive optical components compared to the number of components needed in a traditional refractor, while drastically enhancing the overall fine-tuning ability of the device.

One example, according to one embodiment, of such a light field refractor 102 is schematically illustrated in FIG. 4B, wherein the light field display 104 (herein shown comprising LFSL 106 and digital pixel display 108) is combined with a multiplicity of refractive components 112 (herein illustrated as a reel of lenses as an example only). By changing the refractive component used in combination with light field display 104, a larger dioptric range may be covered. This may also provide means to reduce the dimension of device 102 as mentioned above, making it more portable, so that all its internal components may be encompassed into a shell, housing or casing 402. In some embodiments, light field refractor 102 may thus comprise a durable ABS housing that may be shock and harsh-environment resistant. In some embodiments, light field refractor 102 may also comprise a telescopic feel for fixed or portable usage; optional mounting brackets, and/or a carrying case (not shown). In some embodiments, all components may be internally protected and sealed from the elements.

In some embodiments, casing 402 may further comprise a head-rest or similar (not shown) to keep the user's head still and substantially in the same location, thus, in such examples, foregoing the general utility of a pupil tracker or similar techniques by substantially fixing a pupil location relative to this headrest.

In some embodiments, it may also be possible to further reduce the size of device 102 by adding, for example, a mirror or any device which may increase the optical path. This is illustrated in FIG. 4C where the length of the device was reduced by adding a mirror 404. This is shown schematically by the pointed arrow which illustrates the light being emitted from pixel display 108 travelling through LFSL 106 before being reflected back by mirror through refractive components 112 and ultimately hitting the eye.

The skilled technician will understand that different examples of refractive components 112 may be include, without limitation, one or more lenses, sometimes arranged in order of increasing dioptric power in one or more reels of lenses similar to what is typically found in traditional refractors/phoropters; an electrically controlled fluid lens; active Fresnel lens; and/or Spatial Light Modulators (SLM). In some embodiments, additional motors and/or actuators (not shown) may be used to operate refractive components 112. The motors/actuators may be communicatively linked to processing unit 114 and power source 120, and operate seamlessly with light field display 102 to provide the required dioptric power.

Figure 7A:
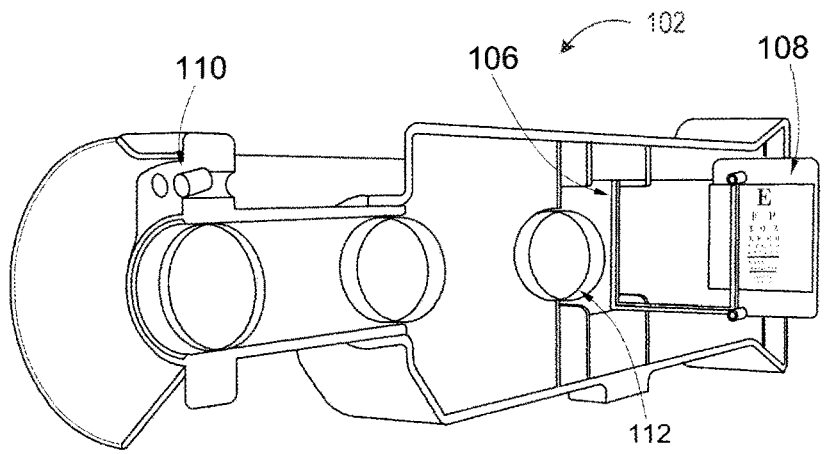
FIGS. 7A, 7B and 7C are perspective views of exemplary light field refractors/phoropters, showing a casing thereof in cross-section (A and B) and a unit combining side-by-side two of the units (C) shown in 7A and 7B, in accordance with one embodiment.
Figure 7B:
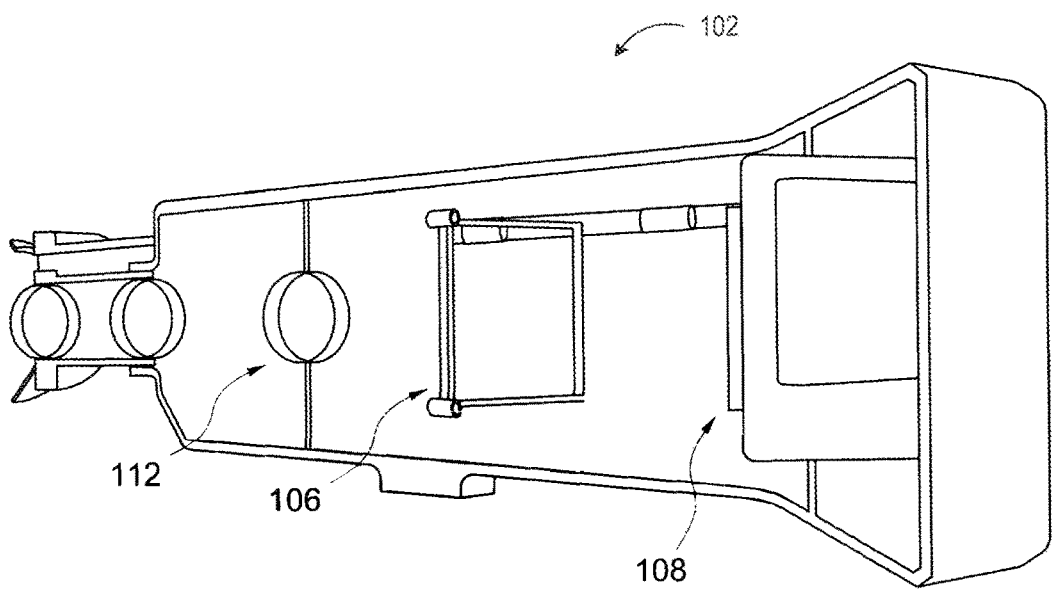

For example, FIGS. 7A and 7B show a perspective view of an exemplary light field phoropter 102 similar to the one schematically shown in FIG. 3B, but wherein the refractive component 112 is an electrically tunable liquid lens. Thus, in this particular embodiment, no mechanical or moving component are used, which may result in the device being more robust. In some embodiments, the electrically tunable lens may have a range of ±13 diopters.

In one illustrative embodiment, a 1000 dpi display is used with a MLA having a 65 mm focal distance and 1000 μm pitch with the user's eye located at a distance of about 26 cm. A similar embodiment uses the same MLA and user distance with a 3000 dpi display.

Other displays having resolutions including 750 dpi, 1000 dpi, 1500 dpi and 3000 dpi were also tested or used, as were MLAs with a focal distance and pitch of 65 mm and 1000 μm, 43 mm and 525 μm, 65 mm and 590 μm, 60 mm and 425 μm, 30 mm and 220 μm, and 60 mm and 425 μm, respectively, and user distances of 26 cm, 45 cm or 65 cm.

Going back to FIG. 1A, in some embodiments, eye-tracker 110 may further comprise a digital camera, in which case it may be used to further acquire images of the user's eye to provide further diagnostics, such as pupillary reflexes and responses during testing for example. In other embodiments, one or more additional cameras 118 may be used to acquire these images instead. In some embodiments, light field refractor 102 may comprise built-in stereoscopic tracking cameras.

In some embodiments, feedback and/or control of the vision test being administered by system 100 may be given via a control interface 126. In some embodiments, the control interface 126 may comprise a dedicated handheld controller-like device 128. This controller 128 may be connected via a cable or wirelessly, and may be used by the patient directly and/or by an operator like an eye professional. In some embodiments, both the patient and operator may have their own dedicated controller 128. In some embodiments, the controller may comprise digital buttons, analog thumbstick, dials, touch screens, and/or triggers.

In some embodiments, control interface 126 may comprise a digital screen or touch screen, either on refractor 102 itself or part of an external module (not shown). In other embodiments, control interface 126 may let on or more external remote devices (i.e. computer, laptop, tablet, smartphone, remote, etc.) control light field refractor 102 via a network interface 122. For example, remote digital device 130 may be connected to light field refractor 102 via a cable (e.g. USB cable, etc.) or wirelessly (e.g. via Wi-Fi, Bluetooth or similar) and interface with light field refractor 102 via a dedicated application, software or website (not shown). Such a dedicated application may comprise a graphical user interface (GUI), and may also be communicatively linked to remote database 124.

In some embodiments, the user or patient may give feedback verbally and the operator may control the vision test as a function of that verbal feedback. In some embodiments, refractor 102 may comprise a microphone (not shown) to record the patient's verbal communications, either to communicate them to a remote operator via network interface 122 or to directly interact with the device (e.g. via speech recognition or similar).

Going back to FIG. 1A, processing unit 114 may be communicatively connected to data storage 116, eye tracker 110, light field display 104 and refractive components 112. Processing unit 114 may be responsible for rendering one or more images or optotypes via light field display 104 and, in some embodiments, jointly control refractive components 112 to achieve a required total change in dioptric power. It may also be operable to send and receive data to internal memory 116 or to/from remote database 124 via network interface 122.

In some embodiments, diagnostic data may be automatically transmitted/communicated to remote database 124 or remote digital device 130 via network interface 122 through the use of a wired or wireless network connection. The skilled artisan will understand that different means of connecting electronic devices may be considered herein, such as, but not limited to, Wi-Fi, Bluetooth, NFC, Cellular, 2G, 3G, 4G, 5G or similar. In some embodiments, the connection may be made via a connector cable (e.g. USB including microUSB, USB-C, Lightning connector, etc.). In some embodiments, remote digital device 130 may be located in a different room, building or city.

Figure 7C:
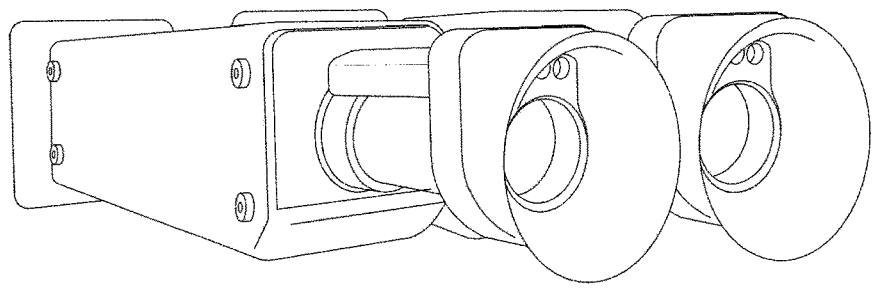

In some embodiments, two light field refractors 102 may be combined side-by-side to independently measure the visual acuity of both left and right eye at the same time. An example is shown in FIG. 7C, where two units corresponding to the embodiment of FIG. 7A or 7B (used as an example only) are placed side-by-side or fused into a single device.

In some embodiments, a dedicated application, software or website may provide integration with third party patient data software. In some embodiments, software required to operate and installed on refractor 102 may be updated on-the-fly via a network connection and/or be integrated with the patient's smartphone app for updates and reminders.

In some embodiments, the dedicated application, software or website may further provide a remote, real-time collaboration platform between an eye professional and user/patient, and/or between different eye professionals. This may include interaction between different participants via video chat, audio chat, text messages, etc.

In some embodiments, light field refractor 102 may be self-operated or operated by an optometrist, ophthalmologist or other certified eye-care professional. For example, in some embodiments, a user/patient may use refractor 102 in the comfort of his/her own home, in a store or a remote location.

Figure 8:
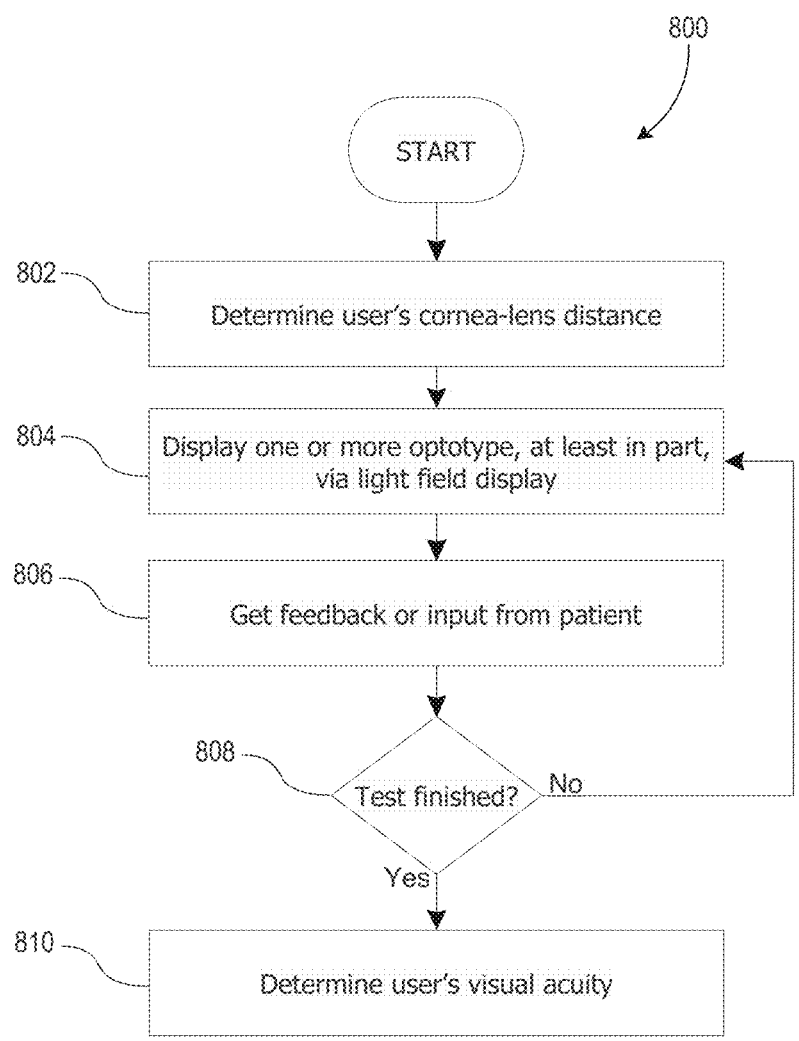
FIG. 8 is a process flow diagram of an exemplary dynamic subjective vision testing method, in accordance with one embodiment.

With reference to FIG. 8 and in accordance with one exemplary embodiment, a dynamic subjective vision testing method using vision testing system 100, generally referred to using the numeral 800, will now be described. As mentioned above, the use of a light field display enables refractor 102 to provide more dynamic and/or more modular vision tests than what is generally possible with traditional refractors/phoropters. Generally, method 800 seeks to diagnose a patient's reduced visual acuity and produce therefrom, in some embodiments, an eye prescription or similar.

In some embodiments, eye prescription information may include, for each eye, one or more of: distant spherical, cylindrical and/or axis values, and/or a near (spherical) addition value.

In some embodiments, the eye prescription information may also include the date of the eye exam and the name of the eye professional that performed the eye exam. In some embodiments, the eye prescription information may also comprise a set of vision correction parameter(s), as will be further discussed below, for operating any vision correction light field displays using the systems and methods described below. In some embodiments, the eye prescription may be tied to a patient profile or similar, which may contain additional patient information such as a name, address or similar. The patient profile may also contain additional medical information about the user. All information or data (i.e. set of vision correction parameter(s), user profile data, etc.) may be kept on external database 124. Similarly, in some embodiments, the user's current vision correction parameter(s) may be actively stored and accessed from external database 124 operated within the context of a server-based vision correction subscription system or the like, and/or unlocked for local access via the client application post user authentication with the server-based system.

Refractor 102 being, in some embodiments, portable, a large range of environments may be chosen to deliver the vision test (home, eye practitioner's office, etc.). At the start, the patient's eye may be placed at the required location. This may be done by placing his/her head on a headrest or by placing the objective (i.e. eyepiece) on the eye to be diagnosed. As mentioned above, the vision test may be self-administered or partially self-administered by the patient. For example, the operator (e.g. eye professional or other) may have control over the type of test being delivered, and/or be the person who generates or helps generate therefrom an eye prescription, while the patient may enter inputs dynamically during the test (e.g. by choosing or selecting an optotype, etc.).

As will be discussed below, light field rendering methods described herein generally requires an accurate location of the patient's pupil center. Thus, at step 802, such a location is acquired. In some embodiments, such a pupil location may be acquired via eye tracker 110, either once, at intervals, or continuously. In other embodiments, the location may be derived from the device or system's dimension. For example, in some embodiments, the use a head-rest and/or an eye-piece or similar provides an indirect means of deriving the pupil location. In some embodiments, refractor 102 may be self-calibrating and not require any additional external configuration or manipulation from the patient or the practitioner before being operable to start a vision test.

At step 804, one or more optotypes is/are displayed to the patient, at one or more dioptric power (e.g. in sequence, side-by-side, or in a grid pattern/layout). The use of light field display 104 offers multiple possibilities regarding how the images/optotypes are presented, and at which dioptric power each may be rendered. The optotypes may be presented sequentially at different dioptric power, via one or more dioptric power increments. In some embodiments, the patient and/or operator may control the speed and size of the dioptric power increments.

Figure 9:
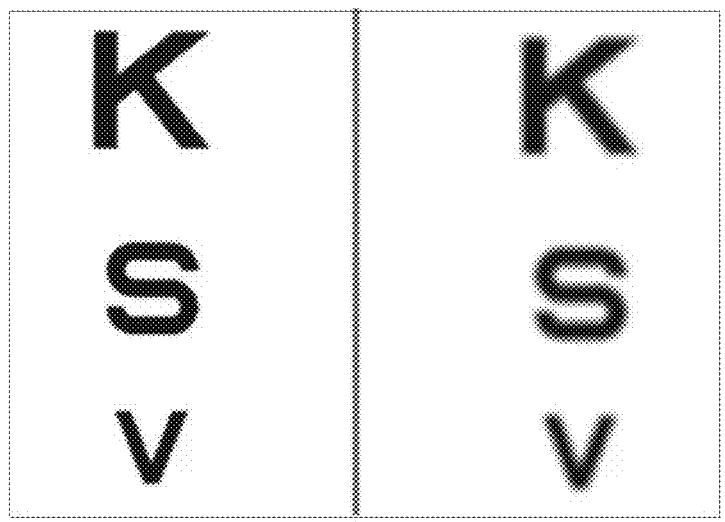
FIG. 9 is a schematic diagram of an exemplary light field image showing two columns of optotypes at different dioptric power for the method of FIG. 8, in accordance with one embodiment.

In some embodiments, optotypes may also be presented, at least in part, simultaneously on the same image but rendered at a different dioptric power. For example, FIG. 9 shows an example of how different optotypes may be displayed to the patient but rendered with different dioptric powers simultaneously. These may be arranged in columns or in a table or similar. In FIG. 9, we see two columns of three optotypes (K, S, V), varying in size, as they are perceived by a patient, each column being rendered at different degrees of refractive correction (e.g. dioptric power). In this specific example, the optotypes on the right are being perceived as blurrier than the optotypes on the left.

Thus, at step 806, the patient would communicate/verbalize this information to the operator or input/select via, for example, control interface 126 the left column as the one being clearer. Thus, in some embodiments, method 800 may be configured to implement dynamic testing functions that dynamically adjust one or more displayed optotype's dioptric power in real-time in response to a designated input, herein shown by the arrow going back from step 808 to step 804 in the case where at step 808, the user or patient communicates that the perceived optotypes are still blurry or similar. In the case of sequentially presented optotypes, the patient may indicate when the optotypes shown are clearer. In some embodiments, the patient may control the sequence of optotypes shown (going back and forth as needed in dioptric power), and the speed and increment at which these are presented, until he/she identifies the clearest optotype. In some embodiments, the patient may indicate which optotype or which group of optotypes is the clearest by moving an indicator icon or similar within the displayed image.

In some embodiments, the optotypes may be presented via a video feed or similar.

In some embodiments, when using a reel of lenses or similar (for refractive components 112), discontinuous changes in dioptric power may be unavoidable. For example, the reel of lenses may be used to provide a larger increment in dioptric power, as discussed above. Thus, step 804 may in this case comprise first displaying larger increments of dioptric power by changing lens as needed, and when the clearest or less blurry optotypes are identified, fine-tuning with continuous or smaller increments in dioptric power using the light field display. In the case of optotypes presented simultaneously, the refractive components 112 may act on all optotypes at the same time, and the change in dioptric power between them may be controlled only by the light display 104. In some embodiments, for example when using an electrically tunable fluid lens or similar, the change in dioptric power may be continuous.

In some embodiments, eye images may be recorded during steps 802 to 806 and analyzed to provide further diagnostics. For example, eye images may be compared to a bank or database of proprietary eye exam images and analyzed, for example via an artificial intelligence (AI) or Machine-learning (ML) system or similar. This analysis may be done by refractor 102 locally or via a remote server or database 124.

Once the correct dioptric power needed to correct for the patient's reduced visual acuity is defined at step 810, an eye prescription or vision correction parameter(s) may be derived from the total dioptric power used to display the best perceived optotypes.

In some embodiments, the patient, an optometrist or other eye-care professional may be able to transfer the patient's eye prescription directly and securely to his/her user profile store on said server or database 124. This may be done via a secure website, for example, so that the new prescription information is automatically uploaded to the secure user profile on remote database 124. In some embodiments, the eye prescription may be sent remotely to a lens specialist or similar to have prescription glasses prepared.

In some embodiments, vision testing system 100 may also or alternatively be used to simulate compensation for higher-order aberrations. Indeed, the light field rendering methods described above may be used to compensation for higher order aberrations (HOA), and thus be used to validate externally measured or tested HOA via method 3600, in that a measured, estimated or predicted HOA can be dynamically compensated for using the system described herein and thus subjectively visually validated by the viewer in confirming whether the applied HOA correction satisfactory addresses otherwise experienced vision deficiencies.

As will be appreciated by the skilled artisan, different light field image processing techniques may be considered, such as those introduced above and taught by Pamplona and/or Huang, for example, which may also influence other light field parameters to achieve appropriate image correction, virtual image resolution, brightness and the like.

With reference to FIGS. 10A to 17D, and in accordance with different embodiments, an exemplary computationally implemented ray-tracing method for rendering an adjusted image via an array of light field shaping elements, in this example provided by a light field shaping layer (LFSL) disposed relative to a set of underlying display pixels, that accommodates or compensates for the user's reduced visual acuity will now be described. In this first example, for illustrative purposes, adjustment of a single image (i.e. the image as whole) is being implemented without consideration for distinct image portions and taking only into account spherical dioptric power changes. Further examples below will specifically address modification of the following example for adaptively adjusting distinct image portions and/or adjustments considering HOA, for example to compensate for astigmatism.

Figure 10A:
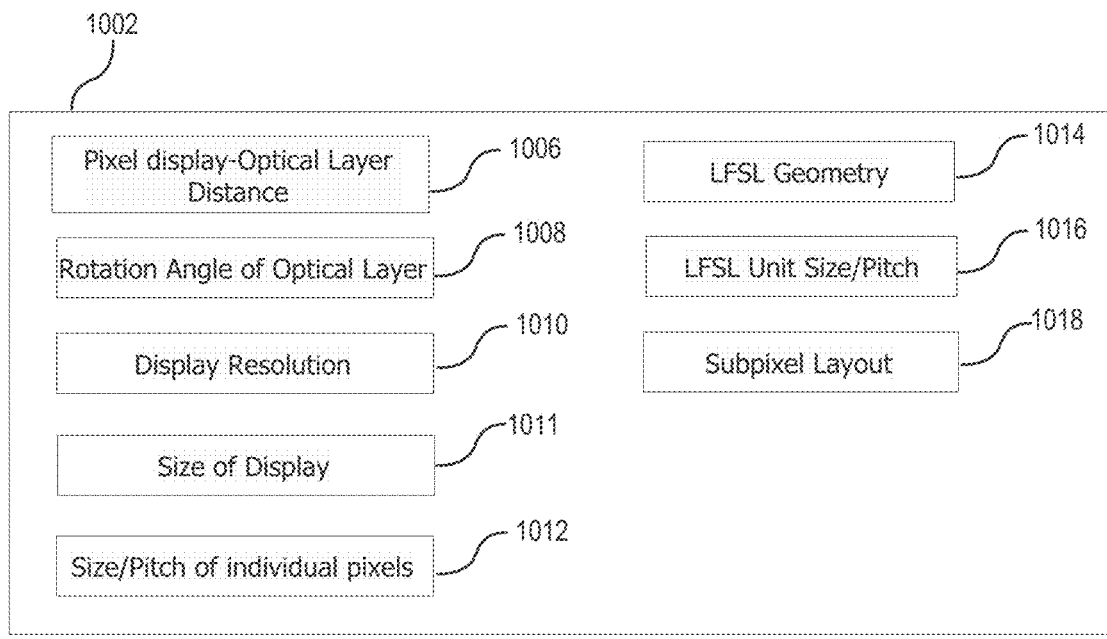
FIGS. 10A and 10B are process flow diagrams of exemplary input constant parameters and variables, respectively, for the ray-tracing rendering process of FIG. 11, in accordance with one embodiment.

In this exemplary embodiment and as shown in FIG. 10A, a set of constant parameters 1002 used for the light field rendering process may be pre-determined. These may include, for example, any data or parameters that are not expected to significantly change during a user's viewing session, between different viewing sessions or even between users, for instance. These may generally be based on the physical and functional characteristics of light field display 104 for which the method is to be implemented, as will be explained below. Similarly, as shown in FIG. 10B, every iteration of the rendering algorithm (i.e. when rendering a full light field image frame) may also use a set of input variables 1004 which are expected to change either at each rendering iteration (i.e. between frames) or at least between each user's viewing session.

As illustrated in FIG. 10A, the list of constant parameters 1002 may include, without limitations, the distance 1006 between pixel display 108 and the LFSL 106, the in-plane rotation angle 1008 between the frames of reference digital pixel display 108 and LFSL 106, the resolution 1010 and/or size 1011 of digital pixel display 108, the size 1012 of each individual pixel, the optical geometry 1014 of LFSL 106, the size or pitch of individual optical elements or units 1016 within LFSL 106 and optionally the subpixel layout 1018 of pixel display 108. Moreover, both the resolution 1010 and the size of each individual pixel 1012 of pixel display 108 may be used to pre-determine both the absolute size of the display in real units (i.e. in mm) and the three-dimensional position/location of each pixel within the display. In some embodiments where the subpixel layout 1018 is available, the position/location within pixel display 108 of each sub-pixel may also be pre-determined. These three-dimensional location/positions are usually calculated using a given frame of reference located somewhere within the plane of pixel display 108, for example a corner or the middle of the display, although other reference points may be chosen. Concerning the optical layer geometry 1014, different geometries may be considered, for example a hexagonal geometry. Finally, by combining the distance 1006, the rotation angle 1008, and the geometry 1014 with the optical element size 1016, it is possible to similarly pre-determine the three-dimensional location/position of each optical element of LFSL 106 with respect to the frame of reference of pixel display 108.

Figure 10B:
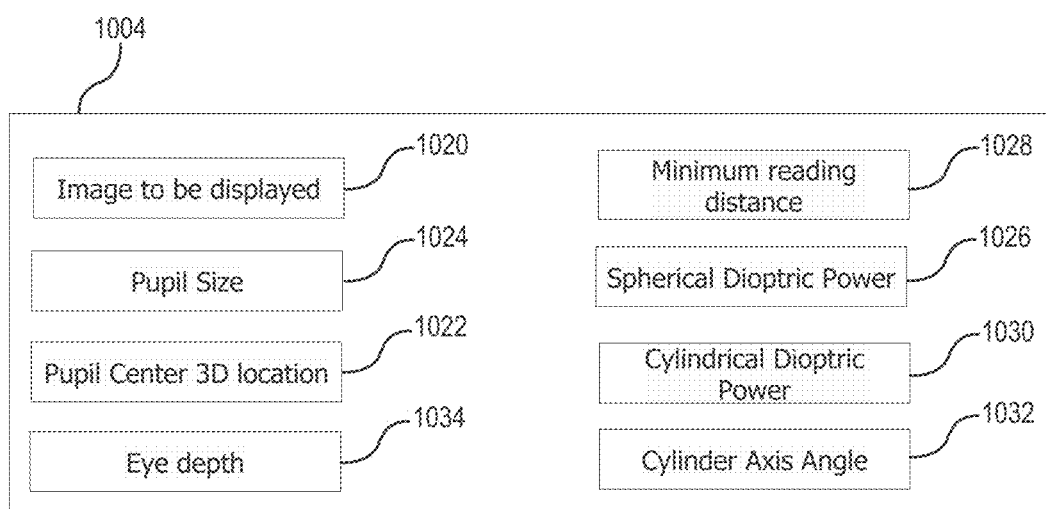

FIG. 10B meanwhile illustratively lists an exemplary set of input variables 1004 that may be used for the light field rendering methods described below, and may include any input data that may reasonably change during a user's single viewing session, for example between each image frame, or between different viewing sessions or even between different users (e.g. not related to the hardware specifications of light field display 104 or refractor 102). These may be automatically acquired by device 102 during normal operation or be inputted (for example by a user or person operating the device for the user) into the device as required. They may thus include without limitation: the image(s)/optotype(s) to be displayed 1020 (e.g. comprising pixel data such as on/off, colour, brightness, etc.), a three-dimensional pupil center location 1022 (e.g. in embodiments implementing active eye/pupil tracking methods) and/or a pupil size 1024.

The methods described below, according to different embodiments, also requires vision correction parameters in the form of dioptric power so as to modulate the strength and nature of the compensation/correction generated by the light field image. These may include a spherical dioptric power 1026 (which may be derived indirectly, for example, from a minimum reading distance value 1028 as will be discussed below), but also, in some embodiments, one or more sets of a cylindrical power 1030 and a corresponding cylindrical axis angle 1032. In some embodiments, these input variables (spherical dioptric power 1026, cylindrical dioptric power 1026 and cylinder axis angle 1030) mirror the SPHERE, CYL and AXIS parameters used in a typical eye examination.

Moreover, in some embodiments, an eye depth value 1034 may also be used, either as an average value or customized for an individual user. In some embodiments, input image 1020, may be representative of one or more digital images to be displayed with digital pixel display 108. In addition, input image 1020 may generally be encoded in any data format used to store digital images known in the art.

Pupil center location 1022, in one embodiment, is the three-dimensional coordinates of at least one the user's pupils' center with respect to a given reference frame, for example a point on device 102 or digital pixel display 108 and may be derived from any eye/pupil tracking method known in the art via eye/pupil tracker 110. In some embodiments, the pupil center location 1022 may be determined prior to any new iteration of the rendering algorithm, or in other cases, at a lower framerate (and thus re-use the same location/position for two or more subsequent image frames). In some embodiments, only the pupil center location of a single user's eye may be determined, for example the user's dominant eye (i.e. the one that is primarily relied upon by the user). In some embodiments, this location/position, and particularly the associated pupil distance to the screen may otherwise or additionally be rather approximated or adjusted based on other contextual or environmental parameters, such as an average or preset user distance to the screen (e.g. typical reading distance for a given user or group of users; stored, set or adjustable driver distance in a vehicular environment; etc.).

In the illustrated embodiment, the minimum reading distance 1028 is defined as the minimal focus distance for reading that the user's eye(s) may be able to accommodate (i.e. able to view without discomfort). In some embodiments, different values of the minimum reading distance 1028 associated with different users may be entered, for example, as can other adaptive vision correction parameters be considered depending on the application at hand and vision correction being addressed. As mentioned above, in some embodiments, minimum reading distance 1028 may be derived from an eye prescription (e.g. glasses prescription or contact prescription) or similar. It may, for example, correspond to the near point distance corresponding to the uncorrected user's eye, which can be calculated from the prescribed corrective lens power assuming that the targeted near point was at 25 cm.

With added reference to FIGS. 11 to 16D, parameters 1002 and variables 1004 may be used in the light field ray-tracing method 1100, herein presented in accordance with different embodiments. While method 1100 and the steps described in FIG. 12 apply equally to both embodiments, steps 1102 and 1112 may be applied using either virtual image planes "virtually" located behind the display or on the retinal plane (via an eye focal plane (i.e. inside the eye)).

Moreover, method 1100 as illustrated in FIGS. 11 to 17D is designed to correct for spherical aberrations. However, other methods expanding on method 1100, for example that may also correct for astigmatism, will be described further below.

Moreover, for illustrative purposes, in this example, adjustment of a single image (i.e. the image as whole) is being implemented without consideration for distinct image portions. Further examples below will specifically address modification of the following example for adaptively adjusting distinct image portions.

Figure 11:
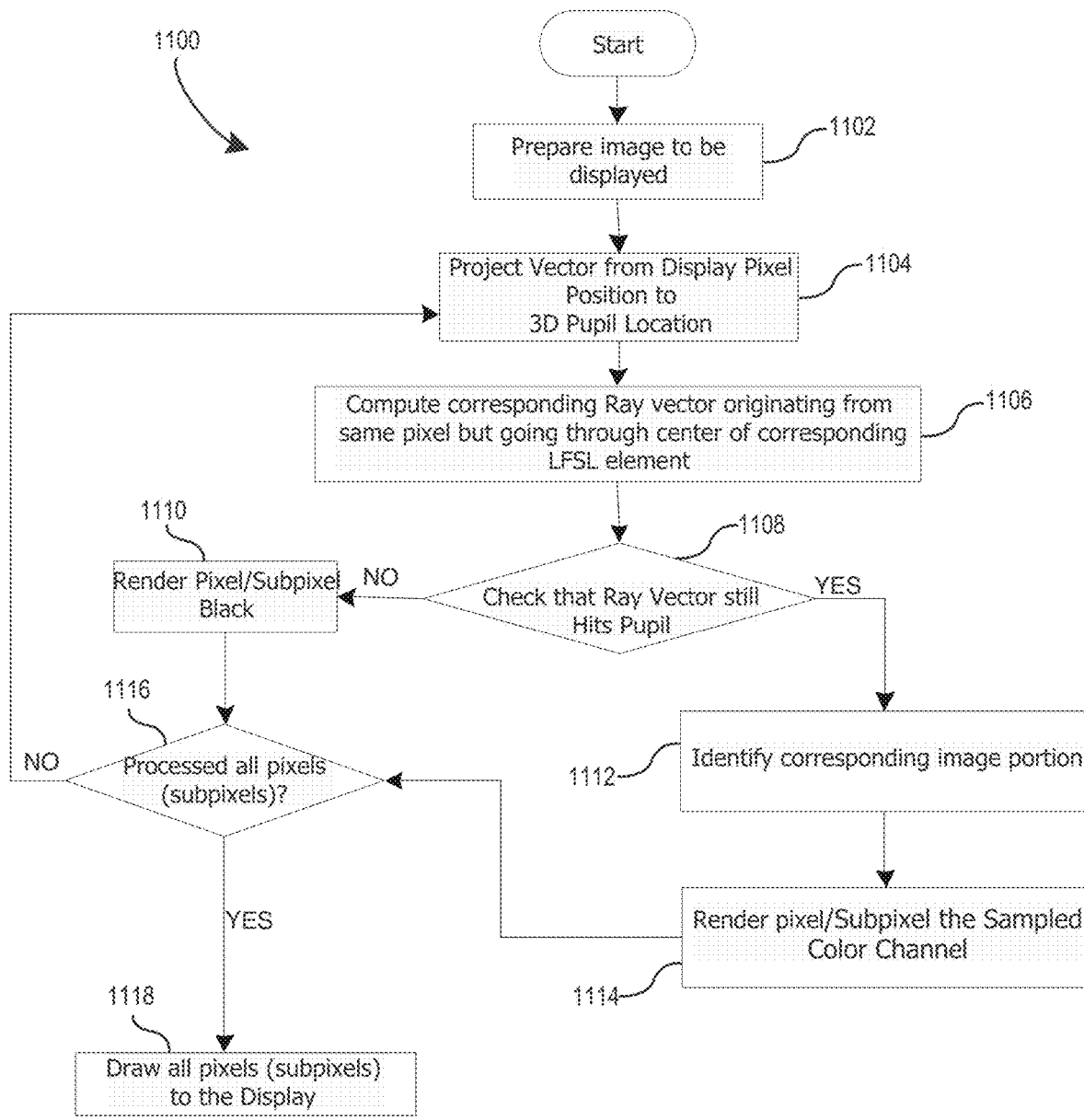
FIG. 11 is a process flow diagram of an illustrative ray-tracing rendering process, in accordance with one embodiment.
Figure 12:
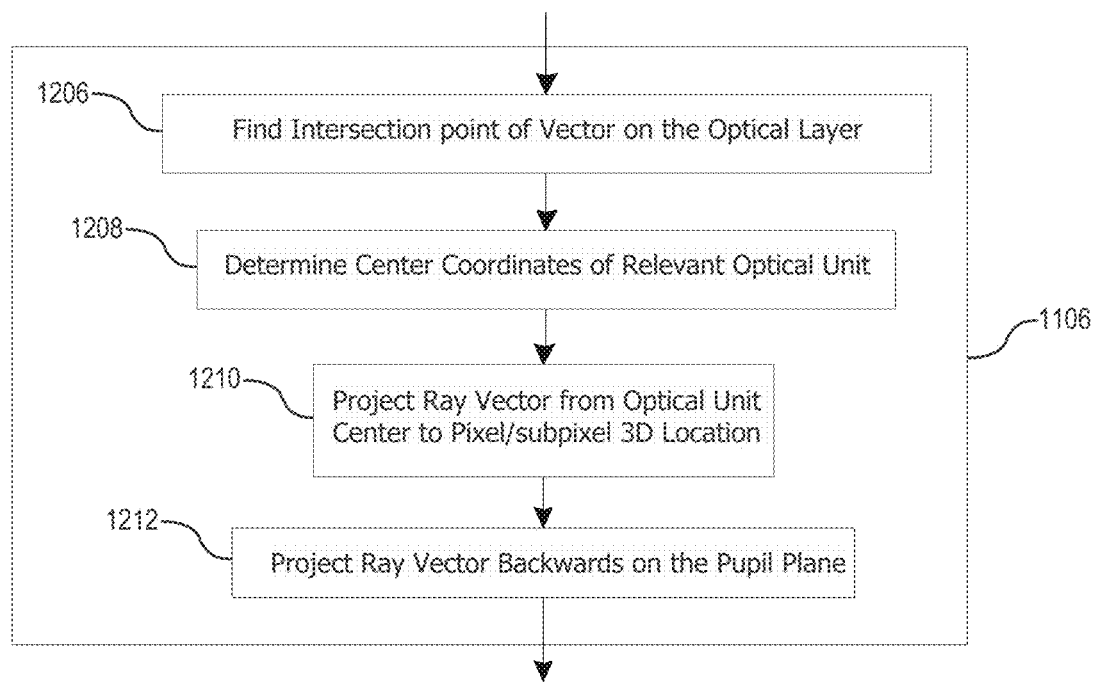
FIG. 12 is a process flow diagram illustrating a process step of FIG. 11, in accordance with one embodiment.

In the illustrated embodiment of FIG. 11, method 1100 begins with step 1102, in which the image to be displayed is pre-processed for subsequent ray-tracing steps. This includes numerically computing a location or position for a corresponding adjusted image surface or plane that corresponds to the required spherical dioptric power 1026 on which the image to be displayed will be mapped.

An exemplary ray-tracing methodology is described in steps 1104 to 1118 of FIG. 11, at the end of which the output color of each pixel of pixel display 108 is known so as to virtually reproduce the light field emanating from an input image 1020 positioned at the adjusted image plane. In FIG. 11, these steps are illustrated as a loop over each pixel in pixel display 108, so that each of steps 1104 to 1116 describes the computations done for each individual pixel. However, in some embodiments, these computations need not be executed sequentially, but rather, steps 1104 to 1116 may be executed in parallel for each pixel or a subset of pixels at the same time. Indeed, as will be discussed below, this exemplary method is well suited to vectorization and implementation on highly parallel processing architectures such as GPUs.

Figure 14A:
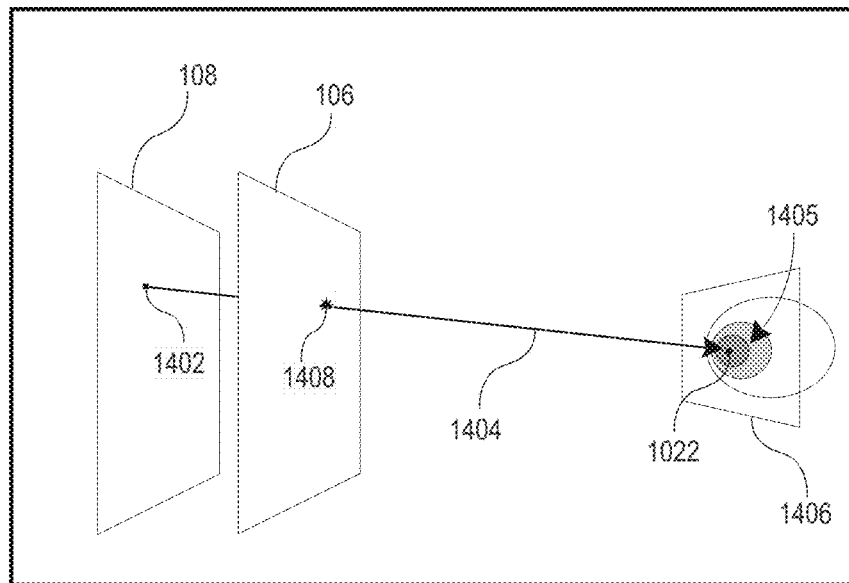
FIGS. 14A and 14B are schematic diagrams illustrating certain process steps of FIG. 11, in accordance with one embodiment.
Figure 14B:
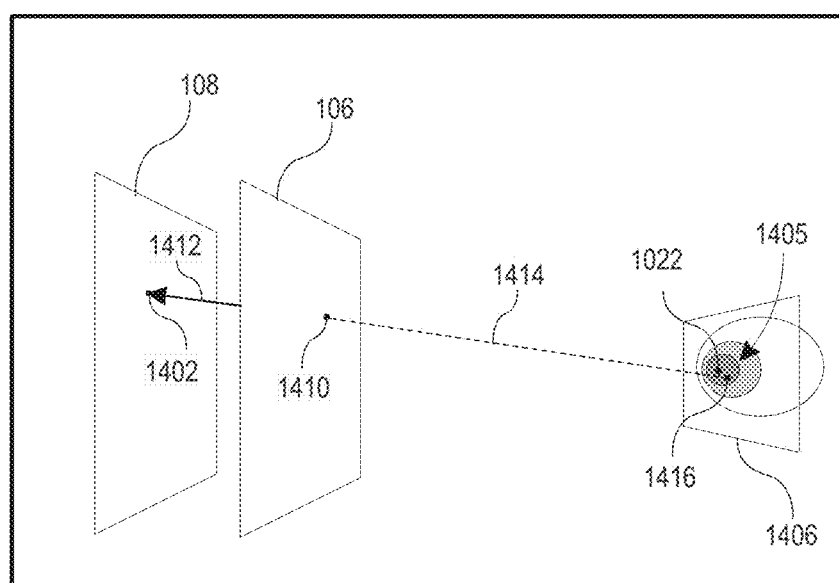

As illustrated in the schematic diagrams of FIG. 14A, in step 1104, for a given pixel 1402 in pixel display 108, a trial vector 1404 is first generated from the pixel's position to the pupil center position 1022 of the user's pupil 1405. As mentioned above, pupil center position 1022 may be acquired via eye/pupil tracker 110. In addition, a corresponding pupil plane 1406, which may be a flat 2D surface or plane in 3D space centered on pupil center position 1022, may be defined here as well. As shown in FIG. 14A, trial vector 1404, by construction, necessarily has to go through a corresponding optical unit of LFSL 106.

Once trial vector 1404 has been computed, in step 1106, a new Ray vector 1412 will be similarly generated from a center location/position 1410 of the corresponding optical unit comprising intersection point 1408 of LFSL 106 and pointing to pixel 1402. In this exemplary embodiment, step 1106 is detailed in the sub-steps 1206 to 1212 shown in FIG. 12.

Thus, in sub-step 1206, the location of intersection point 1408 of vector 1404 with the LFSL 106 is calculated as illustrated in FIG. 14A. In sub-step 1208, the coordinates of the center location 1410 of the optical element or unit of LFSL 106 closest to intersection point 1408 are computed. One way to efficiently compute this location is provided in related U.S. Pat. No. 10,394,322, the contents of which are incorporated herein by reference.

Once the position of the center 1410 of the optical element of LFSL 106 is known, in step 1210, as mentioned above, a normalized unit ray vector is generated from normalizing a ray vector 1412 originating from center position 1410 of LSFL 106 and extending to pixel 1402. This unit ray vector thus approximates the direction of the light field emanating from pixel 1402 through the center 1410 of this particular LFSL element, for instance, when considering a parallax barrier aperture or lenslet array (i.e. where the path of light travelling through the center of a given lenslet is not deviated by this lenslet). Further computation may be required when addressing more complex light shaping elements, as will be appreciated by the skilled artisan.

The orientation of ray vector 1412 will be used to find the portion of input image 1020 on the adjusted image plane, and thus the associated color, represented by pixel 1402. But first, in step 1212, ray vector 1412 is projected backwards (dotted line 1414 on FIG. 14B) to intersect with pupil plane 1406 at location 1416.

Going back to FIG. 11, at step 1108, method 1100 verifies that intersection point 1416 with pupil plane 1406 of projected ray vector 1414 is still located within user pupil entrance 1405 (i.e. that the user can still "see" it). Thus, once intersection point 1416 shown in FIG. 14B of projected ray vector 1414 with the pupil plane 1406 is known, the distance between the pupil center 1022 and intersection point 1416 within pupil plane 1406 may be calculated to determine if the deviation is acceptable, for example by using predetermined pupil size 1424 and verifying how far the projected ray vector intersection 1416 is from pupil center 1022 within pupil plane 1406.

If this deviation is deemed to be too large (i.e. light emanating from pixel 1402 channeled through optical element center 1410 is not perceived by pupil 1405), then in step 1110, method 1100 flags pixel 1402 as unnecessary and to simply be turned off or to render a black color.

In other embodiments, step 1108 may be modified so that instead of having a binary choice between the ray vector hitting the pupil or not, one or more smooth interpolation function (i.e. linear interpolation, Hermite interpolation or similar) may be used to quantify how far or how close intersection point 1416 is to pupil center 1022 within pupil plane 1406 and outputs a corresponding continuous value between 1 or 0. For example, the assigned value is equal to 1 substantially close to pupil center 1022 and gradually change to 0 as intersection point 1416 substantially approaches the pupil edges or beyond. In this case, the branch containing step 1110 may be ignored completely and step 1108 goes directly to step 1112. Then, at the end of step 1114, which will be discussed below, the pixel color value computed therein for pixel 1402 will be modified to be somewhere between the full color value identified therein or black, depending on the value of the interpolation function used at step 1108 (1 or 0).

In yet other embodiments, pixels found to illuminate a designated area around the pupil may still be rendered, for example, to produce a buffer zone to accommodate small movements in pupil location, for example, or again, to address potential inaccuracies, misalignments or to create a better user experience.

In the case where ray vector 1414 is within the pupil entrance (or if an interpolation function is used as discussed above), at step 1112, a corresponding image portion of input image 1020 located on the adjusted image plane and its corresponding color value are identified. As discussed above, two different but equivalent adjusted image planes may be used: a virtual image plane 1502 as shown schematically in FIG. 15 (i.e. positioned behind pixel display 108), or the retinal plane 1702 as shown in FIGS. 17A to 17D (i.e behind user pupil 1405). Correspondingly, each variation of steps 1002 and 1112 are listed in the flow diagrams of FIGS. 13 and 16, respectively.

Figure 13:
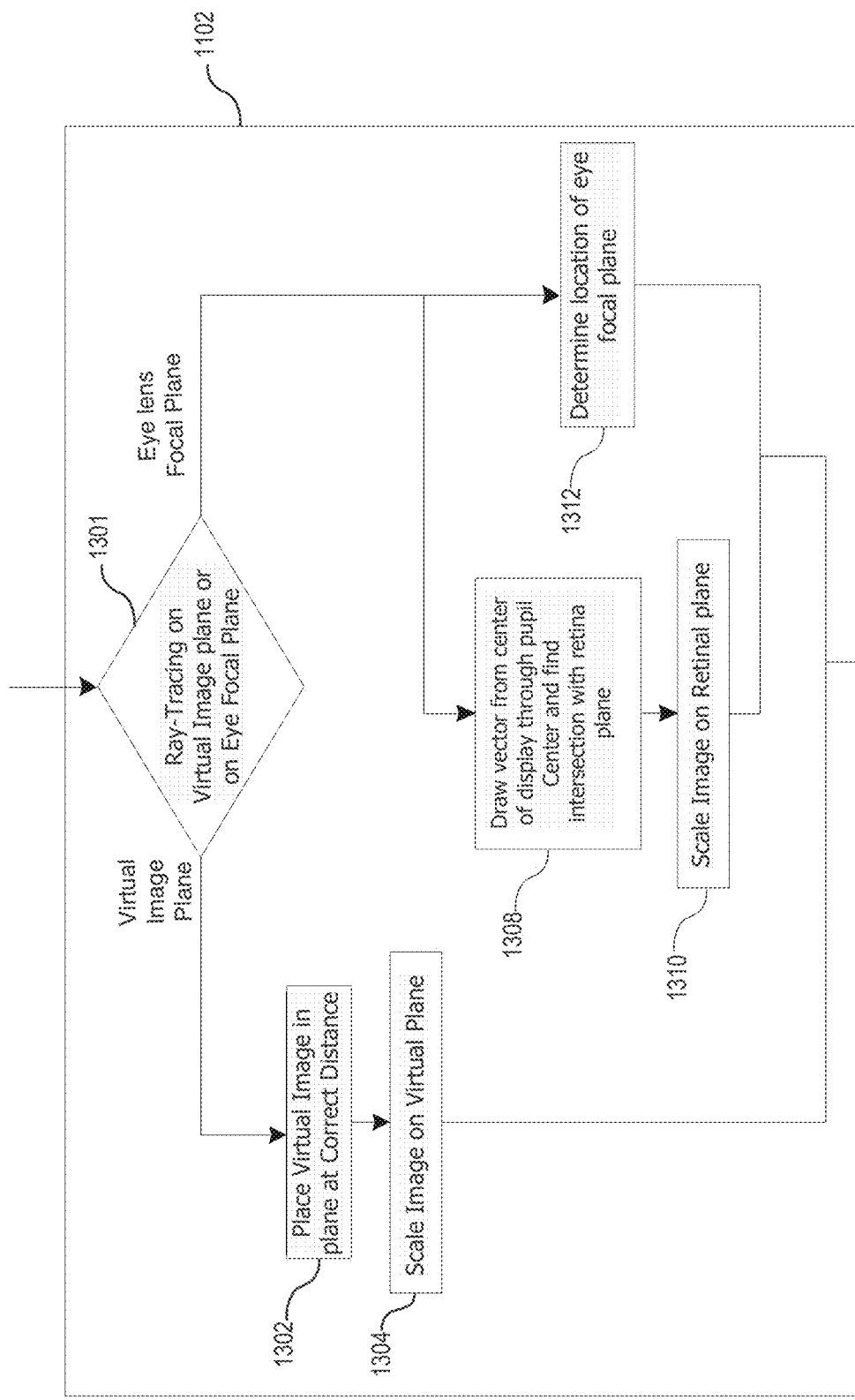
FIG. 13 is a process flow diagram illustrating certain process steps of FIG. 11, in accordance with one embodiment.
Figure 15:
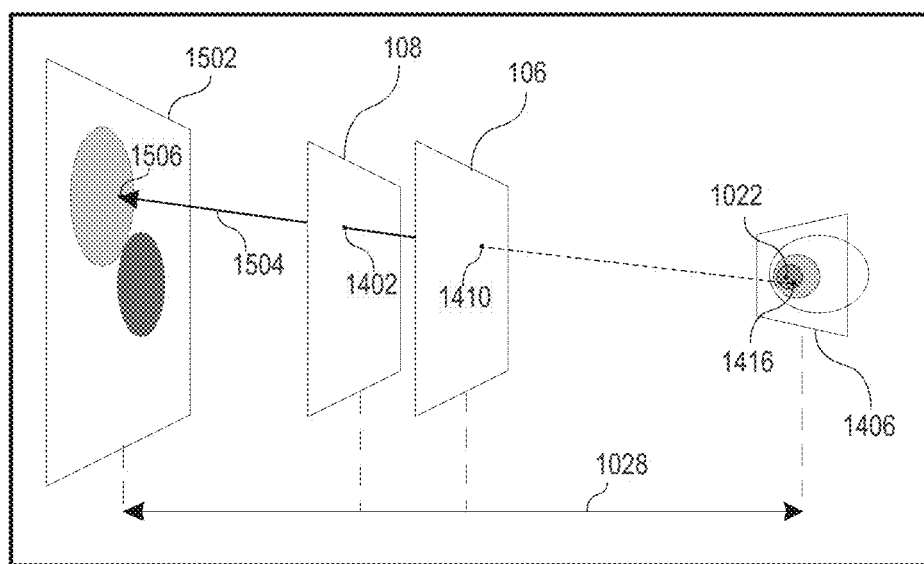
FIG. 15 is a schematic diagram illustrating the process steps of FIGS. 13 and 16, in accordance with one embodiment.

Thus, step 1102 is illustrated in FIG. 13, in accordance with one embodiment. In the case where virtual image planes are selected for ray-tracing in sub-step 1301, then as mentioned above ray-tracing is done using a virtual image plane 1502 as illustrated in FIG. 15. At sub-step 1302, the location or distance of virtual image plane 1502 from pupil plane 1406 may be computed as a function of spherical dioptric power 1026 (i.e. using the thin lens formula or other) and/or minimum reading distance 1028 (and/or related parameters). Then, at step 1304, input image 1020 is mapped onto virtual image plane 1502 so that its size of also scaled so to ensure that the perceived light field image correctly fills pixel display 108 when viewed by the distant user. An example is shown in FIG. 15 wherein virtual image plane 1502 is shown, as an example only, being located at a distance 1028 (in the z direction or depth) from pupil plane 1406, and the size of image 1020 is increased to avoid having the image as perceived by the user appear smaller than the display's size.

Figure 16:
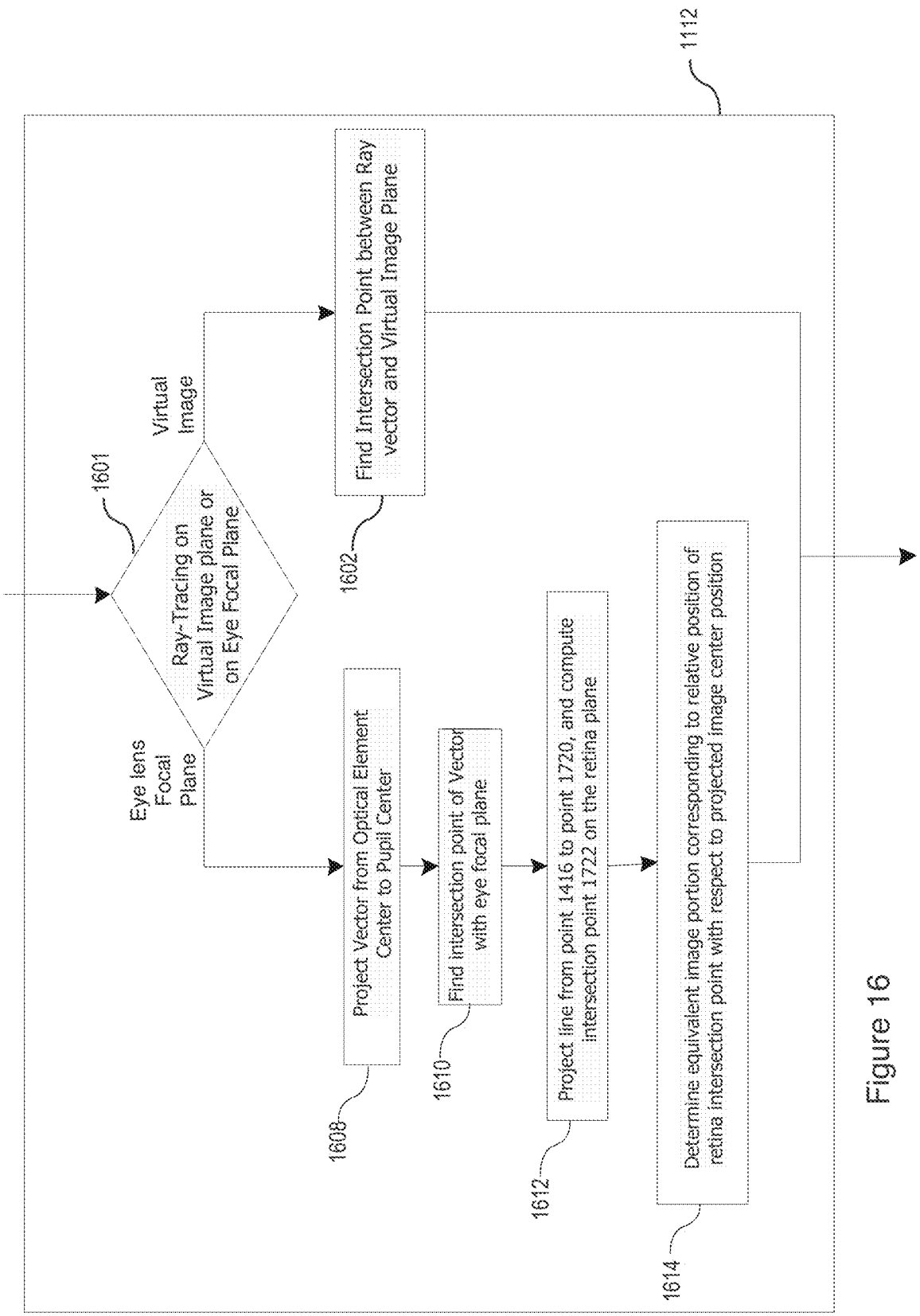
FIG. 16 is a process flow diagram illustrating certain process steps of FIG. 11, in accordance with one embodiment.

Continuing for the case of ray-tracing on virtual image plane 1502, the correct image portion is then identified in step 1112. So, as illustrated in FIG. 16, in this case sub-step 1601 leads to sub-step 1602. As schematically illustrated in FIG. 15, in sub-step 1602, ray vector 1412 is projected towards virtual image plane 1502 (shown as vector 1504 in FIG. 15) to find the position of the intersection point 1506. After this, the portion of image 1020 (and its associated colour channel) corresponding to intersection point 1506 on virtual image plane 1502 is identified.

As mentioned above, it may also be possible to use a retinal plane, herein defined as a 2D plane or surface substantially located at the location of the user's retina, as the adjusted image plane instead of virtual plane 1502.

Thus, in this case, illustrated schematically in FIGS. 17A to 17D, the adjusted image portion associated with a given pixel/subpixel is computed (mapped) on retinal plane 1702 instead of virtual image plane 1502 considered in the above example, again in order to provide the user with a designated image perception adjustment.

The skilled artisan will understand that a retinal plane may be defined in various ways. The exemplary embodiment described herein, the retinal plane 1702 is defined as a 2D plane located at a distance inside the eye equal to eye depth 1034 from the location of pupil center location 1022. It may also be taken to be parallel to pupil plane 1406, as illustrated in FIG. 17A to 17D, although it is not required to be so. It is meant to be an approximate location corresponding to the user's real retina.

Thus, in the case where ray-tracing is done on retina image plane 1702, in step 1102 as shown in FIG. 13, sub-step 1301 leads to sub-step 1308, where a projected image center position on retinal plane 1702 is calculated. To do so, as illustrated in FIG. 17C, a vector 1704 is drawn originating from the center 1706 of pixel display 108 and passing through pupil center 1022. Vector 1704 is further projected beyond pupil plane 1405 onto retinal plane 1702, and the associated intersection point 1708 gives the location of the corresponding image center on retinal plane 1702. Once image center 1708 is known, in sub-step 1310 one can scale image 1020 to the x/y retina image size 1710, as illustrated schematically in FIG. 17D. In some embodiments, the required scaling may be computed by calculating the magnification of an individual pixel on retinal plane 1702, for example, which may be approximately equal to the x or y dimension of an individual pixel multiplied by the eye depth 1034 and divided by the absolute value of the distance to the eye (i.e. thus giving the magnification of the image portion created a pixel once focused by the eye lens on retinal plane 1702). An exemplary scaled inverted image 1712 on retinal plane 1702 is shown in FIG. 17D. Similarly, for comparison purposes, the input image 1020 may also normalized by the image x/y dimensions to produce a corresponding normalized input image 1714 having a width and height between −0.5 to 0.5 units, which may be compared to inverted scaled image 1712 which may also be similarly normalized.

In addition to sub-steps 1308 and 1310, sub-step 1312 is done independently to determine a location of a focal plane as produced by the user's eye for a given input value of spherical dioptric power 1026 (or minimum reading distance 1028). Thus, eye focal plane 1716 shown in FIGS. 17A and 17B is defined as the location where any light ray originating from optical unit center location 1410 would be focused by the user's eye. For a user with perfect vision, focal plane 1716 would be located at the same location as retinal plane 1702, but in the example shown in FIGS. 17A and 17B, as an example only, focal plane 1716 is located behind retinal plane 1702, which would be expected for a user with some form of farsightedness. The position of focal plane 1716 may be derived from the user's minimum reading distance 1028 or spherical dioptric power 1026, for example, by deriving therefrom the corresponding focal length of the user's eye. Other manually input or computationally or dynamically adjustable means may also or alternatively be considered to quantify this parameter.

Going back to FIG. 16, step 1112 in the case of ray-tracing on retinal plane 1702 has sub-step 1601 leading to sub-step 1608, illustrated schematically in FIG. 17A, where a vector 1718 is drawn from optical unit center 1410 to pupil center 1022. Then, in sub-step 1610, vector 1718 is projected further behind pupil plane 1406 onto eye focal plane 1716 where intersection point 1720 is identified.

The skilled artisan will note that any light ray originating from optical unit center 1410, no matter its orientation, will also be focused onto intersection point 1720, to a first approximation. Therefore, in some embodiments, the location 1722 on retinal plane 1702 onto which light entering the pupil at intersection point 1416 will converge may be approximated, at sub-step 1612, by drawing a straight line between intersection point 1416 where projected ray vector 1414 hits pupil plane 1406 and focal point 1720 on focal plane 1716, as illustrated in FIG. 17B. The intersection of this line with retinal plane 1702 (retina image point 1722) is thus the location on the user's retina corresponding to the image portion that will be reproduced by corresponding pixel 1402 as perceived by the user. Therefore, at sub-step 1614, by comparing the relative position of retinal point 1722 with the overall position of the projected image on the retinal plane 1702, the relevant adjusted image portion associated with pixel 1402 may be computed.

For example, the image portion position 1724 relative to retina image center position 1726 in the scaled coordinates (scaled input image 1714) corresponds to the inverse (because the image on the retina is inverted) scaled coordinates of retina image point 1722 with respect to retina image center 1708, as shown in FIG. 17D. Thus, the associated color with image portion position 1724 may be therefrom extracted and associated with pixel 1402.

Once step 1112 is finished, in step 1114, pixel 1409 is flagged as having the color value associated with the portion of image corresponding to intersection point 1506 in the case of ray-tracing on virtual image plane 1502 (as shown in FIG. 15) or in the case of ray-tracing on retinal plane 1702, to the image portion corresponding to intersection 1725 as shown in FIG. 17D.

At step 1116, a check is made to see if every pixel in pixel display 108 has been ray-traced. If not then method 1100 chooses another pixel 1402 and goes back to step 1104; if so, then the output color of all pixels has been determined and these are finally rendered in step 1118 by pixel display 108 to be viewed by the user, therefore presenting a light field corrected image. In the case of a single static image, the method may stop here. In yet other embodiments, pixels found to illuminate a designated area around the pupil may still be rendered, for example, to produce a buffer zone to accommodate small movements in pupil location, for example, or again, to address potential inaccuracies or misalignments.

As will be appreciated by the skilled artisan, selection of the adjusted image plane onto which to map the input image in order to adjust a user perception of this input image allows for different ray tracing approaches to solving a similar challenge, that is of creating an adjusted image using the light field display that can provide an adjusted user perception, such as addressing a user's reduce visual acuity. While mapping the input image to a virtual image plane set at a designated minimum (or maximum) comfortable viewing distance can provide one solution, the alternate solution may allow accommodation of different or possibly more extreme visual aberrations. For example, where a virtual image is ideally pushed to infinity (or effectively so), computation of an infinite distance becomes problematic. However, by designating the adjusted image plane as the retinal plane, the illustrative process steps of FIGS. 16A and 16B can accommodate the formation of a virtual image effectively set at infinity without invoking such computational challenges. Likewise, while first order aberrations are illustratively described with reference to FIG. 11, higher order or other optical anomalies may be considered within the present context, whereby a desired retinal image is mapped out and traced while accounting for the user's optical aberration(s) so to compute adjusted pixel data to be rendered in producing that image. These and other such considerations should be readily apparent to the skilled artisan.

While the computations involved in the above described ray-tracing algorithms (steps 1104 to 1116 of FIG. 11) may be done on general CPUs, it may be advantageous to use highly parallel programming schemes to speed up such computations. While in some embodiments, standard parallel programming libraries such as Message Passing Interface (MPI) or OPENMP may be used to accelerate the light field rendering via a general-purpose CPU, the light field computations described above are especially tailored to take advantage of graphical processing units (GPU), which are specifically tailored for massively parallel computations. Indeed, modern GPU chips are characterized by the very large number of processing cores, and an instruction set that is commonly optimized for graphics. In typical use, each core is dedicated to a small neighborhood of pixel values within an image, e.g., to perform processing that applies a visual effect, such as shading, fog, affine transformation, etc. GPUs are usually also optimized to accelerate exchange of image data between such processing cores and associated memory, such as RGB frame buffers. Furthermore, smartphones are increasingly being equipped with powerful GPUs to speed the rendering of complex screen displays, e.g., for gaming, video, and other image-intensive applications. Several programming frameworks and languages tailored for programming on GPUs include, but are not limited to, CUDA, OpenCL, OpenGL Shader Language (GLSL), High-Level Shader Language (HLSL) or similar. However, using GPUs efficiently may be challenging and thus require creative steps to leverage their capabilities, as will be discussed below.

In some embodiments, additional efficiencies may be leveraged on the GPU by storing the image data, for example image 1020, in the GPU's texture memory. Texture memory is cached on chip and in some situations is operable to provide higher effective bandwidth by reducing memory requests to off-chip DRAM. Specifically, texture caches are designed for graphics applications where memory access patterns exhibit a great deal of spatial locality, which is the case of the steps 1104 to 1116 of FIG. 11. For example, in method 1100, image 1020 may be stored inside the texture memory of the GPU, which then greatly improves the retrieval speed during step 1112 (including either one of the ray-tracing variants presented in FIGS. 13 and 16) where the color channel associated with the portion of input image 1020 is determined.

Moreover, while method 1100 presented above (and its associated variations) was discussed and illustrated as having each plane (i.e. virtual image plane 1502, pixel display 108, LSFL 106, pupil plane 1406, retinal plane 1702 or eye lens focal plane 1716) as being parallel with each other, this was only done as an example for clarity and to better describe the methodology associated therewith. Indeed, method 1100 as discussed may equally be applied to account for changes in the relative orientation between any one of those planes.

Figure 18A:
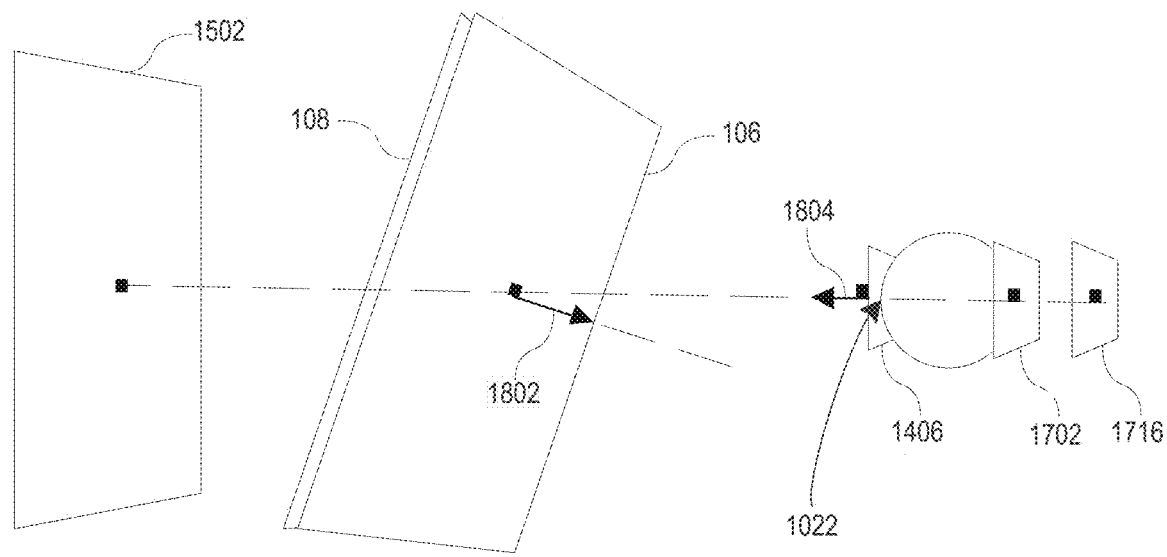
FIGS. 18A and 18B are schematic diagrams illustrating ray-tracing in the context of non-parallel planes, in accordance with one embodiment.
Figure 18B:
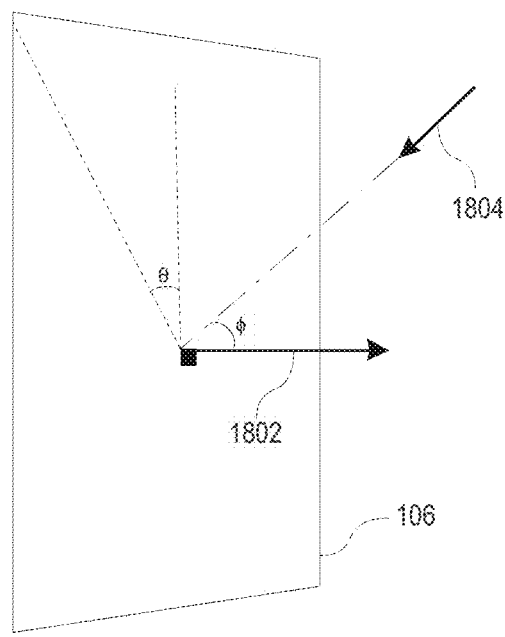

For example, and with reference to FIGS. 18A-B, 19 and 20A-C, and in accordance with one exemplary embodiment, ray-tracing with non-parallel planes will now be discussed. In some embodiments, and as illustrated in FIG. 18A, cases may be considered wherein the user is viewing the light field display at an angle. In this specific example, the ray-tracing method can therefore account for a change in orientation of the pupil plane 1406 with respect to the pixel display 108 and optical layer 106. In this example, other planes such as virtual image plane 1502, and retinal plane 1702 and focal plane 1716 may be taken to be parallel to pupil plane 1406. The relative difference in orientation between the two sets of planes is illustrated by using vector 1802 which is the normal vector to the plane of corresponding optical layer 106, and vector 1804 which is the normal vector to pupil plane 1406. The relative orientation between the two normal vectors is illustrated in FIG. 18B, using polar and azimuthal angles.

The general orientation of pupil plane 1406 may be parametrized, for example, by using the 3D location of pupil center 1022 and a corresponding normal vector 1804. Normal vector 1804 may be taken to be, in some embodiments, equal to the gaze direction as measured by a gaze tracking system or similar, as will be discussed below.

Once the relative position and orientation of pupil plane 1406 is determined, the relative position/orientation of all remaining planes (parallel or non-parallel) may be determined and parametrized accordingly. Planes that are parallel share the same normal vector. From there, the method 1100 and its variants described above may be applied by finding the intersection point between an arbitrary vector and an arbitrarily oriented plane, as is done for example at steps 1206, 1212, 1602, 1610, 1612 for example.

In the illustrated example of FIG. 18A, the position of virtual image plane 1502 may be computed using spherical dioptric power 1026 (and/or minimum reading distance 1028 and/or related parameters) but from the position of pupil plane 1406 and along the direction vector 1804.

To extract normal vector 1804 of pupil plane 1406, the eye tracking methods and systems described above may be used or modified to further provide a measure of the eye's gaze direction (e.g. gaze tracking). As discussed above, there are many known eye tracking methods in the art, some of which may also be used for gaze-tracking. For example, this includes Near-IR glint reflection methods and systems or methods purely based on machine vision methods. Hence, in some embodiments, pupil plane 1406 may be re-parametrized using an updated 3D location of pupil center 1022 and an updated normal vector 1804 at each eye tracking cycle. In other embodiments, a hybrid gaze tracking/pupil tracking system or method may be used wherein gaze direction (e.g. normal vector 1804) is provided at a different interval than pupil center location 1022. For example, in some embodiments, for one or more cycles, only the 3D pupil center location 1022 may be measured and an old gaze direction vector may be re-used or manually updated. In some embodiments, an eye model or similar may be constructed to map a change in measured pupil center location 1022 to a change in the gaze direction vector without relying on the full capabilities of the gaze tracking system or method. Such a map may be based on one or more previous gaze tracking measurements. In any case, by measuring/determining the 3D pupil center location 1022 and normal vector 1804, the pupil plane may be parametrized accordingly.

Note that in FIG. 18A, pixel display 108 and optical layer 106 are shown as being parallel for simplicity, but other embodiments may envision optical layer 106 to be non-parallel to display 108 as well. This doesn't change the general scope of the present discussion, as long as the relative angle between them is known. For example, such an angle may be pre-determined during manufacturing or measured in real-time using one or more sensors (for example in the case where optical layer 106 may be mobile). Similarly, other planes like for example retinal plane 1702 may also be made to be non-parallel to the pupil plane, depending on the user's eye geometry.

Figure 19:
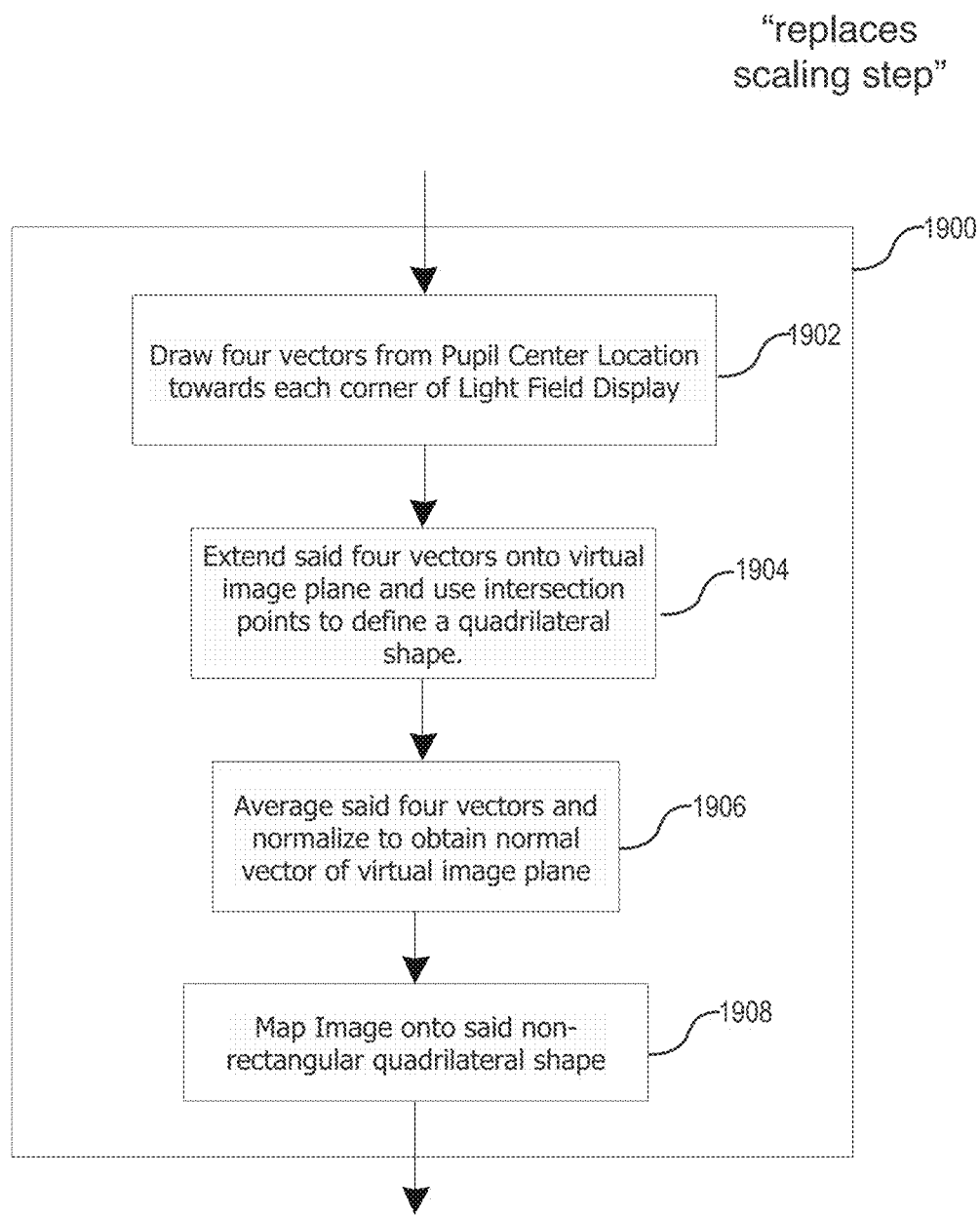
FIG. 19 is a process flow diagram illustrating an exemplary method of ray-tracing in the context of non-parallel planes, in accordance with one embodiment.
Figure 20A:
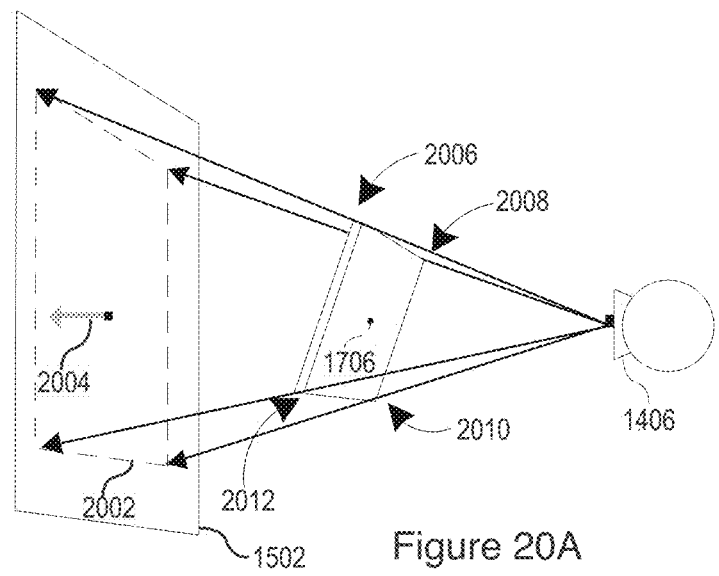
FIGS. 20A to 20C are schematic diagrams illustrating image placement and scaling in the context of non-parallel planes, in accordance with one embodiment.
Figure 20B:
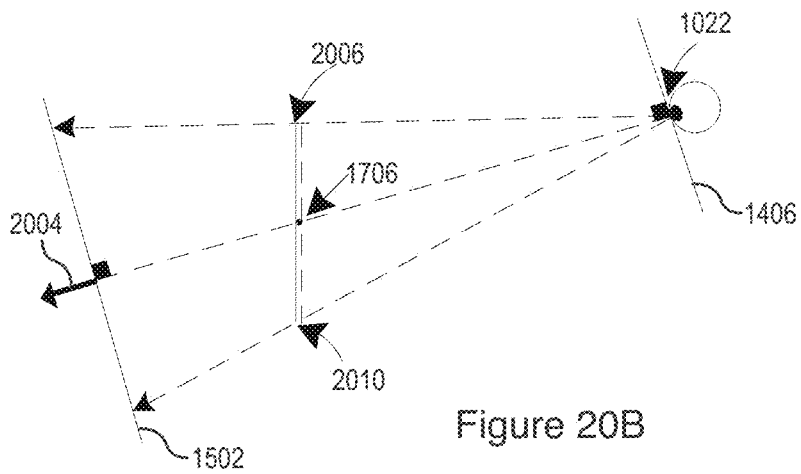
Figure 20C:
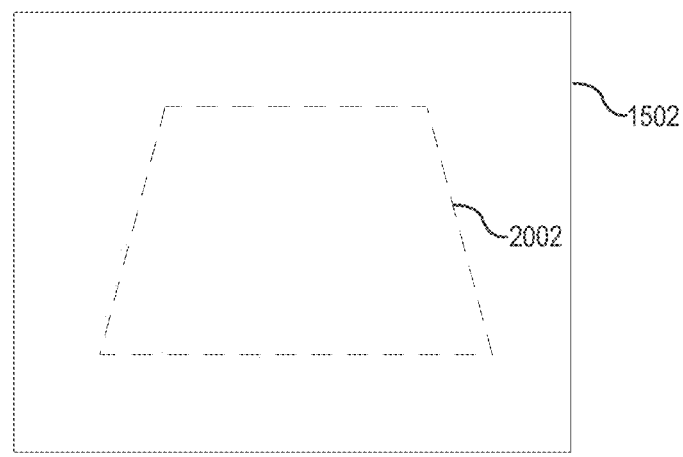

With reference to FIG. 19, and in accordance with one embodiment, step 1900, which is a new sub-step that replaces step 1304 presented above, may be used to scale an image on virtual image plane 1502 in the case of non-parallel planes. When dealing with non-parallel planes, in some embodiments, some modifications to any step which requires to map and scale an image on virtual plane 1502 may be required. As illustrated in FIG. 19, step 1902 may be decomposed into a number of sub-steps 1902 to 1908. At step 1902, the relative orientation of virtual image plane 1502 with respect to the light field display may be computed by drawing vectors from pupil center location 1022 towards the corners of the light field display (for example the corner locations of pixel display 108). For example, as illustrated in FIGS. 20A and 20B, which mirrors in part the schematic diagrams of FIGS. 15 and 17B, the user's pupil is located off-axis and will thus be viewing the display at an angle. By assuming that the pupil is always orientated towards display center location 1706, the position and orientation of virtual image plane 1502 may be derived. For example, by assuming that the user's pupil is always oriented towards display center location 1706, four vectors may be drawn, each originating from pupil center 1022 towards a distinct corner of pixel display 108. At sub-step 1904, the corresponding intersection points of these vectors with virtual image plane 1502 will define a convex quadrilateral area 2002 on plane 1502 which is the area onto which image 1020 must be drawn on or mapped unto (in final sub-step 1908) so to fill the display when viewed by user. Moreover, at sub-step 1906, the four vectors may be averaged and normalized, thus giving a normal vector 2004 which indicates the relative orientation of plane 1502. This is illustrated in FIGS. 20A and 20B where we see four vectors originating from pupil center location 1022, each projected towards a corner of the display (points 2006, 2008, 2010 and 2012), which intersect with virtual image plane 1502 to define quadrilateral area 2002. FIG. 20B shows a side view of the schematic diagram of FIG. 20A while FIG. 20C shows convex quadrilateral area 2002 from FIG. 20A from the front.

As mentioned above, non-parallel configurations, as those illustrated in FIG. 20A, may require additional treatment when scaling the image on virtual image plane 1502 so to fill the entire light field display when viewed by the user. Indeed, non-parallel planes resulting from an off-axis pupil center position 1022 may require that the image be processed or converted to fit onto non-rectangular area 2002. Thus, at step 1908, different texture mapping and interpolation techniques may be used to deform or stretch an image texture onto non-rectangular shape 2002. For example, and without limitation, these may include bilinear interpolation.

With reference to FIGS. 21A to 22D and in accordance with one embodiment, additional variants of steps 1102 and 1112 are described, in this case for rendering multiple images or image portions on multiple adjusted distinct image planes simultaneously via an array of light field shaping elements, or light field shaping layer (LFSL) thereof. The previous above-described embodiments of steps 1102 and 1112 were directed to correcting a single image by directly or indirectly modifying the location of the virtual image plane and/or eye focal plane. In contrast, the below-described embodiments of steps 2102 and 2104 (illustrated in FIGS. 21A and 21B and using virtual image planes) or steps 2300 and 2301 (illustrated in FIGS. 23A and 23B and using the retinal plane) are directed to a light field display which is generally operable to display multiple image planes at different locations/depths simultaneously. Unlike known stereoscopic effects, the methods as herein described may be implemented to generated varying depth perceptions within a same eye, that is, allowing for the monoscopic viewing of an input to exhibit multiple distinct image perception adjustments (i.e. multiple juxtaposed and/or overlapping depths, enhancements or like optical adjustments, compensations, etc.). For example, in some embodiments, distinct image planes may be juxtaposed such that different sides or quadrants of an image, for example, may be perceived at different depths. In such embodiments, a different effective vision correction parameter (e.g. diopter), or depth, may be applied, to each portion or quadrant. While this approach may result in some distortions or artefacts at the edges of the areas or quadrants, depending on the image data to be rendered along these edges, such artefacts may be negligible if at all perceivable. In other embodiments, however, different image portions may be at least partially superimposed such that portions at different depths, when viewed from particular perspectives, may indeed appear to overlap. This enables a user to focus on each plane individually, thus creating a 2.5D effect. Thus, a portion of an image may mask or obscure a portion of another image located behind it depending on the location of the user's pupil (e.g. on an image plane perceived to be located at an increased distance from the display than the one of the first image portion). Other effects may include parallax motion between each image plane when the user moves.

Figure 23A:
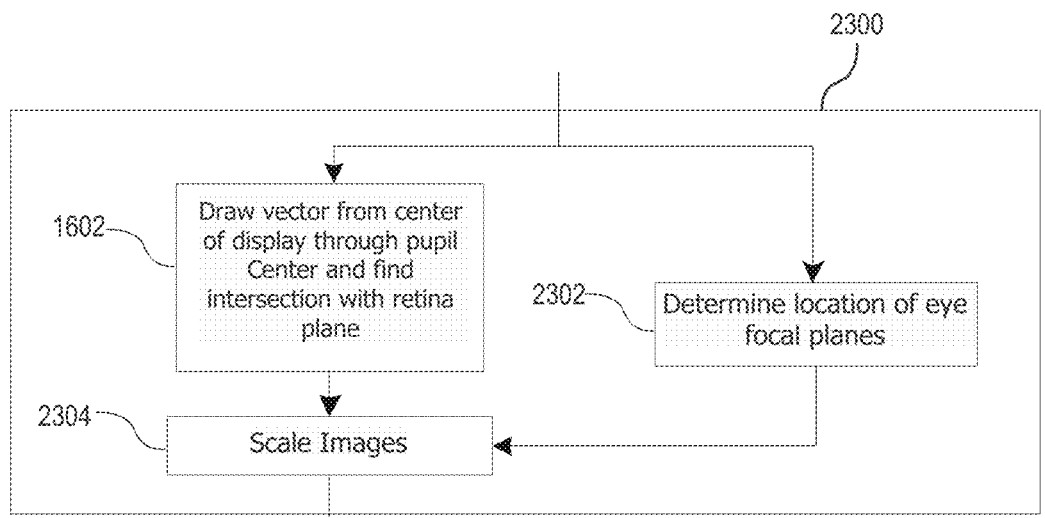
FIGS. 23A and 23B are process flow diagrams of certain process steps of FIG. 11 for rendering a light field originating from multiple distinct focal planes, in accordance with one embodiment.
Figure 23B:
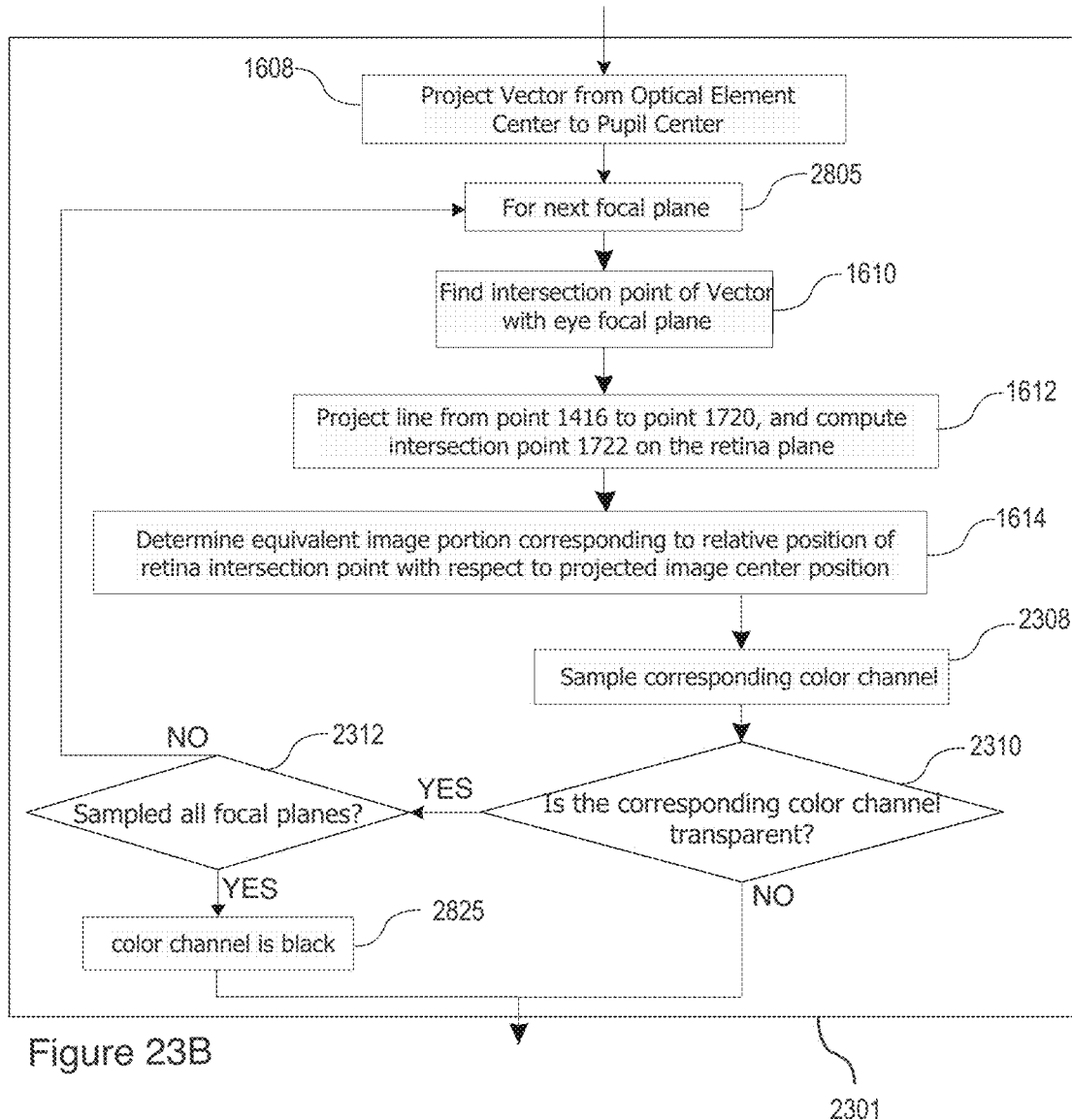

As mentioned above, steps 2102 and 2104 of FIGS. 21A and 21B are directed towards ray-tracing on one or more virtual image plane only (and thus replaces steps the corresponding sub-steps of steps 1102 and 1112 of FIGS. 13 and 16), while steps 2300 and 2301 of FIGS. 23A and 23B are directed towards ray-tracing on the retinal plane (and thus replaces the corresponding sub-steps of steps 1102 and 1112). In contrast to steps 1102 and 1112 of FIGS. 13 and 16, in FIGS. 21A-B and 23A-B we have separated each ray-tracing method (virtual plane vs retinal plane) in different figures so as to more clearly illustrated all the sub-steps comprised therein.

For example, to account for multiple distinct image planes, input image 1020 of input variables 1004 may also include, in addition to pixel data, variable dioptric powers or perceptive "depth" information or parameters. Thus, any image or image portion may have a respective depth indicator. Thus, at sub-step 2106, a set of multiple virtual image planes may be defined, at sub-step 2108, which includes deriving their respective (virtual) location, similarly to sub-step 1302. On these planes, images or image portions may be present. Areas around these images may be defined as transparent or see-through, meaning that a user would be able to view through that virtual image plane and see, for example, images or image portions located behind it. At sub-step 2108, any image or image portion on each of these virtual image planes may be optionally scaled to fit the display, similarly as described for sub-step 1304 for a single image plane.

In the previous example shown in FIG. 15, a single virtual image plane 1502, showing an exemplary input image 1020 comprising two circles, was used. In contrast, FIGS. 22A to 22D show an example wherein each circle is located on its own virtual image plane (e.g. original virtual plane 1502 with new virtual image plane 2202). The skilled technician will understand that two planes are shown here only as an example and that the method steps described herein apply equally well to any number of virtual planes. The only effect of having more planes is a larger computational load.

Going back to 21B, in step 2104, an iteration is done over the set of virtual image planes to compute which image portion from which virtual image plane is seen by the user. Thus, at sub-step 2110 a virtual image plane is selected, starting from the plane located closest to the user. Then step 1306 proceeds as described previously for that selected virtual plane. At sub-step 2112 the corresponding color channel of the intersection point identified at step 1306 is sampled. Then at sub-step 2114, a check is made to see if the color channel is transparent. If this is not the case, then the sampled color channel is sent to step 1114 of FIG. 11, which was already described and where the color channel is rendered by the pixel/subpixel. An example of this is illustrated in FIGS. 22A and 22B, wherein a user is located so that a ray vector 2204 computed passing through optical element center location 1408 and pixel/subpixel 1402 intersects virtual image plane 1502 at location 1506. Since in this example this location is non-transparent, this is the color channel that will be assigned to the pixel/subpixel. However, as this example shows, this masks or hides parts of the image located on virtual image plane 2202. Thus, an example of the image perceived by the user is shown in FIG. 22B.

Figure 21A:
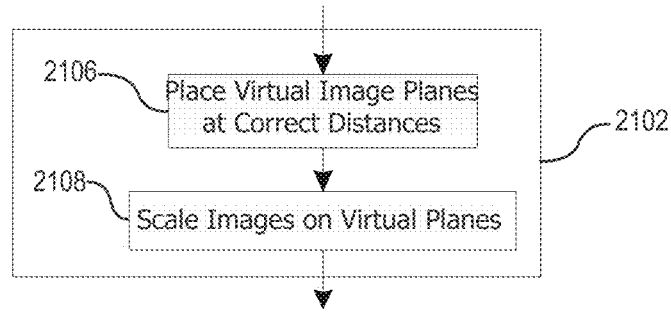
FIGS. 21A and 21B are process flow diagrams of certain process steps of FIG. 11 for rendering a light field originating from multiple distinct virtual image planes, in accordance with one embodiment.
Figure 21B:
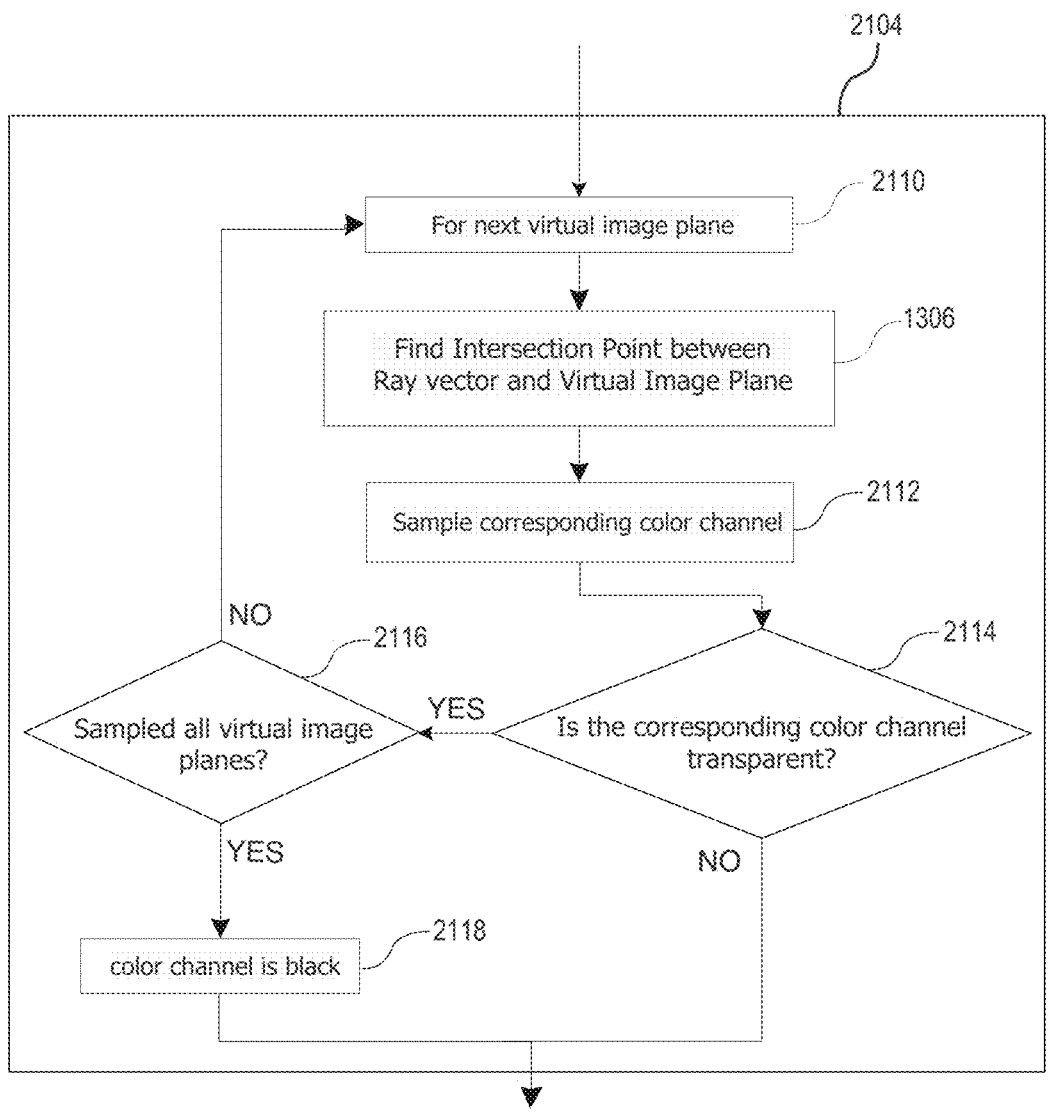

Going back to FIG. 21B, at sub-step 2114 if the color channel is transparent, then another check is made at sub-step 2116 to see if all virtual image planes have been iterated upon. If this is the case, then that means that no image or image portion is seen by the user and at sub-step 2118, for example, the color channel is set to black (or any other background colour), before proceeding to step 1114 of FIG. 11. If however at least one more virtual image plane is present, then the method goes back to step 2110 and selects that next virtual image plane and repeats sub-steps 1306, 2112 and 2114. An example of this is illustrated in FIG. 22C, wherein a user is located so that a distinct ray vector 2204 computed passing through optical element center 2206 of LFSL 106 and pixel/subpixel 2208 of pixel display 108 first intersects at location 2210 of virtual image plane 1502. Since, in this example, this location is defined to be transparent (i.e. not on the circle), the method checks for additional virtual image planes (here plane 2202) and extends vector 2204 so as to compute intersection point 2212, which is now non-transparent (i.e. on the circle), and thus the corresponding color channel is selected. An example of the image perceived by the user is shown in FIG. 22D.

Similarly, steps 2300 and 2301 of FIGS. 23A and 23B substantially mirrors steps 2102 and 2104, respectively, described in FIGS. 21A and 21B, but are herein applied to be used with two or more eye focal planes (e.g. for ray-tracing the image on retinal image plane 1702). Thus, we see that the method iterates, after sub-step 1608, over all designated image planes, each corresponding to a different eye focal plane, starting from the plane corresponding to an image located closest to the user. Thus, a new eye focal plane is selected at sub-step 2306, which is used for sub-steps 1610 to 1614 already described above. Once the corresponding image portion is determined at sub-step 1614, at sub-step 2308, the corresponding pixel/subpixel color channel is sampled. Then at sub-step 2310, if the color channel is non-transparent, then the method continues to step 1114 of FIG. 11, wherein the pixel/subpixel is assigned that color channel. However, if the image portion is transparent, then the method iterates to the eye focal plane corresponding to the next designated image plane. Before this is done, the method checks at sub-step 2312 if all the eye focal planes have been iterated upon. If this is the case, then no image portion will be selected and at sub-step 2314 the color channel is set to black, for example, before exiting to step 1114. If other eye focal planes are still available, then the method goes back to sub-step 2306 to select the next eye focal plane and the method iterates once more.

Figure 24A:
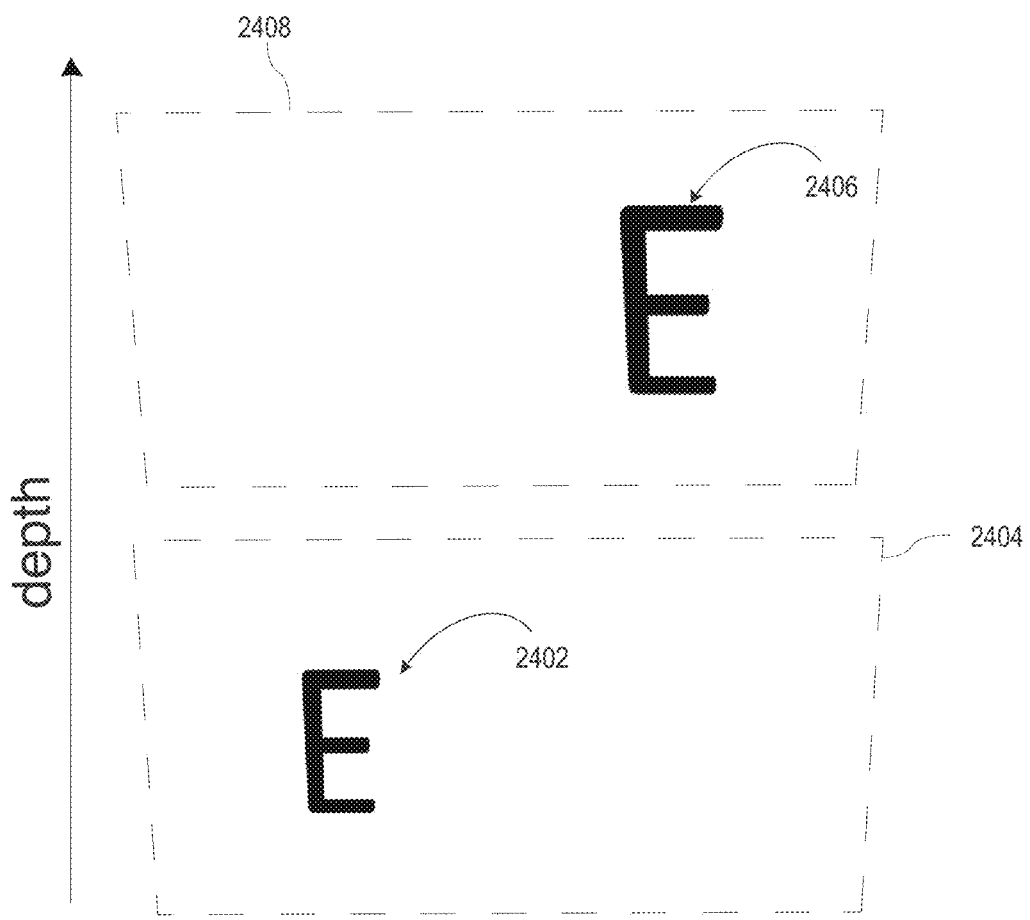
FIGS. 24A and 24B are schematic diagrams illustrating an example of a subjective visual acuity test using the ray-tracing rendering process of FIG. 25 or FIG. 27, in accordance with one embodiment.
Figure 24B:
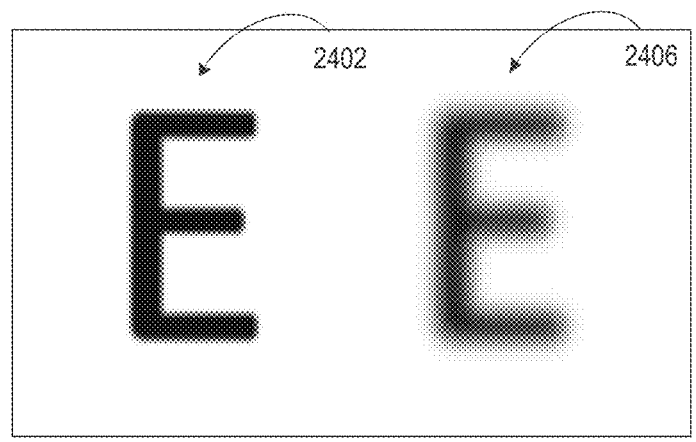

In some embodiments, as mentioned above, steps 2102, 2104 or 2300 and 2301 for multiple designated image planes of FIGS. 21A-B (on virtual planes) or FIGS. 23A-B (retinal plane) may be used to implement a phoropter/refractor device to do subjective visual acuity evaluations. For example, as illustrated in FIGS. 24A and 24B, and similarly to FIG. 9, different optotypes (e.g. letters, symbols, etc.) may be displayed simultaneously but at different perceived depths, to simulate the effect of adding a refractive optical component (e.g. change in focus/optical power). In FIG. 24A, two images of the same optotype (e.g. letter E) are displayed, each on their own designated image plane (e.g. here illustrated as virtual image planes as an example only). In this example, image 2402 is located on designated image plane 2404 while image 2406 is located on designated image plane 2408, which is located further away. Optionally, as illustrated herein, the size of the image may be increased with increased depth so that all images displayed are perceived to be of a similar relative size by the user. In FIG. 24B, we see an example of the perception of both images as perceived by a user with reduced visual acuity (e.g. myopia), for example, wherein the image closest to the user is seen to be clearer. Thus, a user could be presented with multiple images (e.g. 2 side-by-side, 4, 6 or 9 in a square array, etc.) and indicate which image is clearer and/or and most comfortable to view. An eye prescription may then be derived from this information. Moreover, in general, both spherical and cylindrical power may be induced by the light field display, as will be discussed further below.

Figure 25:
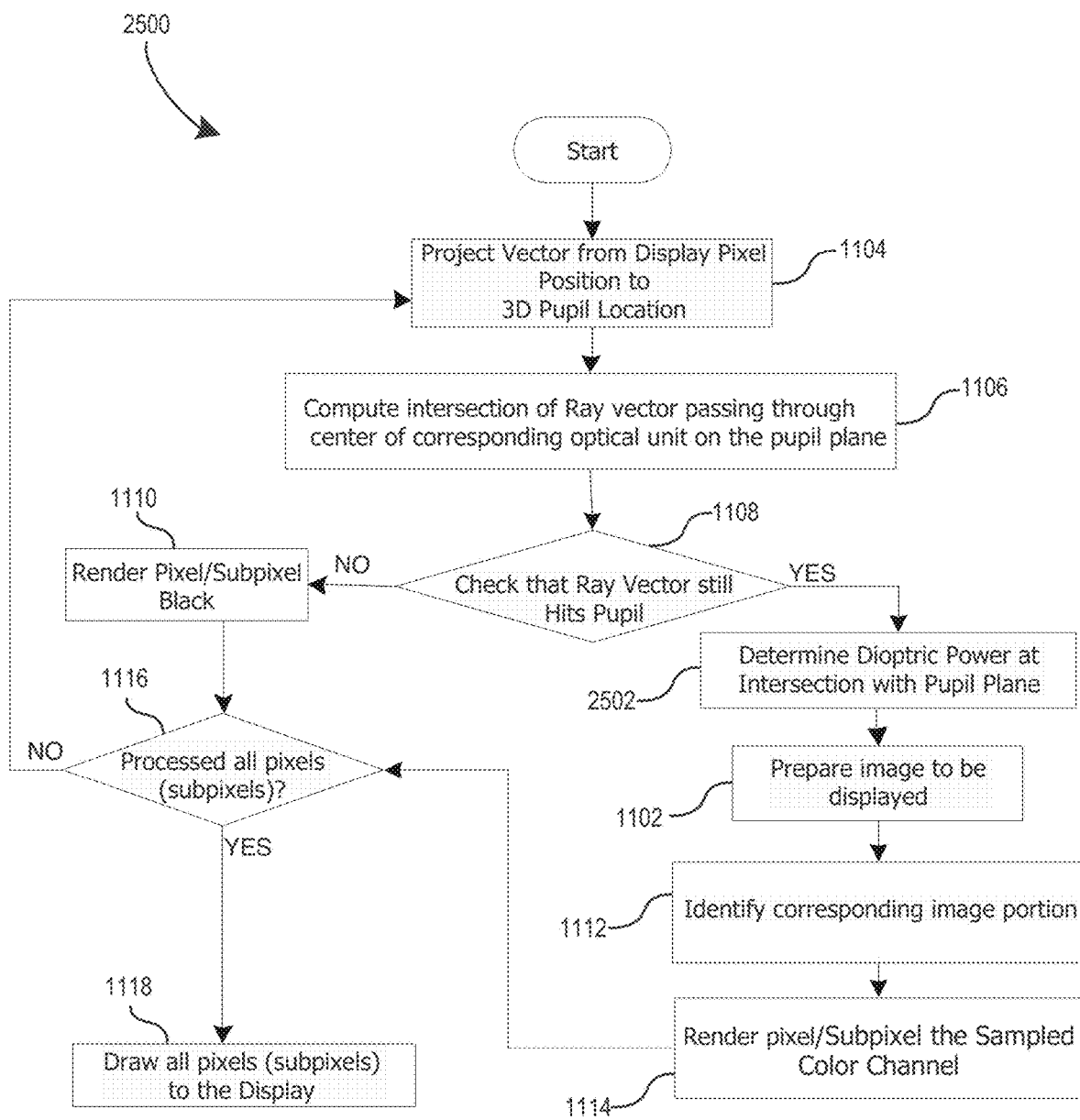
FIG. 25 is a process flow diagram of an illustrative ray-tracing rendering process for astigmatism compensation, in accordance with one embodiment.
Figure 26:
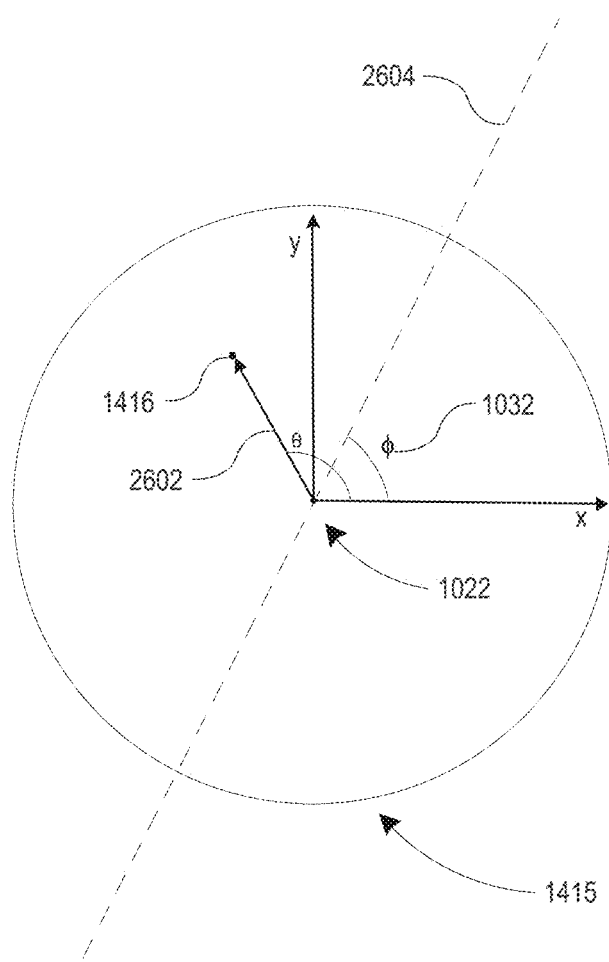
FIG. 26 is a schematic diagram illustrating how the total dioptric power is computed in FIG. 25, in accordance with one embodiment.

With reference to FIGS. 25 to 27B and in accordance with one exemplary embodiment, a ray-tracing rendering process for astigmatism compensation, generally referred to using the numeral 2500, will now be described. Method 2500, illustrated in the flow process diagram of FIG. 25, is a modified ray-tracing method similar to method 1100 of FIG. 11 discussed above, but is expanded to compensate for higher-order aberrations such as astigmatism by including cylindrical power 1030 and cylinder axis 1032 parameters mentioned above in the ray-tracing process.

Method 2500 mirrors for the most part the method 1100, but with step 1102 moved after newly introduced step 2502.

In this exemplary embodiment, in contrast with method 1100, instead of using an initial fixed depth value for the location of the designated image plane, for example derived from spherical dioptric power 1026 or input minimum reading distance 1028 (which implicitly implied spherical deficiency only), and use that value to place or compute the designated image plane at the correct location and scale the image thereon, method 2500 instead proceeds directly with step 1104 through 1108, until intersection point 1416 on pupil plane 1406 is computed. Then, it is from the location of intersection point 1416 relative to an input cylinder axis angle 1032 that a combined spherical/cylindrical dioptric power or total dioptric power value may be derived. This total dioptric power may then be converted into a corresponding designated virtual image plane location for this iteration of intersection point 1416. Thus, image scaling on the virtual plane is not done once, but done on a per-pixel basis at each iteration. Hence, the total dioptric power is computed per-pixel.

Thus, steps 1104 to 1108 of method 2500 proceed as previously described for method 1100, as dos steps 1110, 1114, 1116 and 1118. However, once the location of a new pupil intersection point 1416 is known (for the current pixel iteration started at step 1104) a new step 2502 is introduced after step 1108. In step 2502, a total dioptric power comprising spherical and cylindrical contributions is computed as a function of the intersection point location 1416 on pupil plane 1406 relative to pupil center location 1022.

In some embodiments, astigmatism may be modelled by considering that the eye is a sphero-cylindrical lens having a total refractive power along a given meridian angle θ given by:

$$P(\theta) = S + C \sin^2(\phi - \theta)$$

wherein P is the (total dioptric power), S is the spherical power 1026 (which may also be derived from minimum reading distance 1028 for example), C is the cylindrical power 1030, φ the cylinder axis angle 1032 and θ is the angle made by a position vector 2602 originating from pupil center location 1022 and pointing to point 1416 on pupil plane 1406 with respect to the x axis in a local pupil frame of reference. This is illustrated schematically in FIG. 26, wherein we see an exemplary user pupil 1405 on pupil plane 1406, and where the dotted line represents an exemplary orientation of the cylinder axis 2604. In some embodiments, it may also be possible to simulate the presence of two or more cylindrical lenses by summing the corresponding value of $C \sin^2(\phi - \theta)$ computed using each distinct set of cylindrical power 1030 and cylindrical axis angle 1032 values before adding the resulting sum to the spherical power 1026.

In some embodiments, the determination of the cylinder axis angle 1032 with respect to the pupil center location 1022 and intersection point 1416 may require a change of coordinates onto a local pupil frame of reference, for example if the head of the user is tilted or at an angle with respect to the display. When this is not the case, either by approximation or because the user's head is constrained by a head rest or similar (e.g. within the context of an eye testing device), it may be taken that the local pupil frame of reference for which cylindrical axis angle 1032 is defined is the same as the display frame of reference (used for all vector computations) thus no special treatment is needed. However, in some embodiments, coordinates on pupil plane 1406 may first be converted to a local pupil frame of reference before calculating the θ and φ angles and computing the corresponding total dioptric power. Indeed, in this case, cylinder axis angle 1032 may not be well-defined relative to the horizontal direction as defined by the display. The required local pupil frame of reference may be acquired from the pupil tracker or similar. For example, in one embodiment, a local pupil frame of reference may be computed by a vector going from a pupil center of one eye to the pupil center of the second eye, the vector going from the pupil center to the screen center, both provided for example by the pupil tracker, and an "up" vector (i.e. oriented from pupil center location 1022 towards the top center of the pupil) may be determined by doing the cross product between the two vectors. This conversion of coordinates into a local pupil frame of reference may also be applied without restriction to the methods of 1100, 2500 or for any ray-tracing or light field rendering method described below.

Figure 27A:
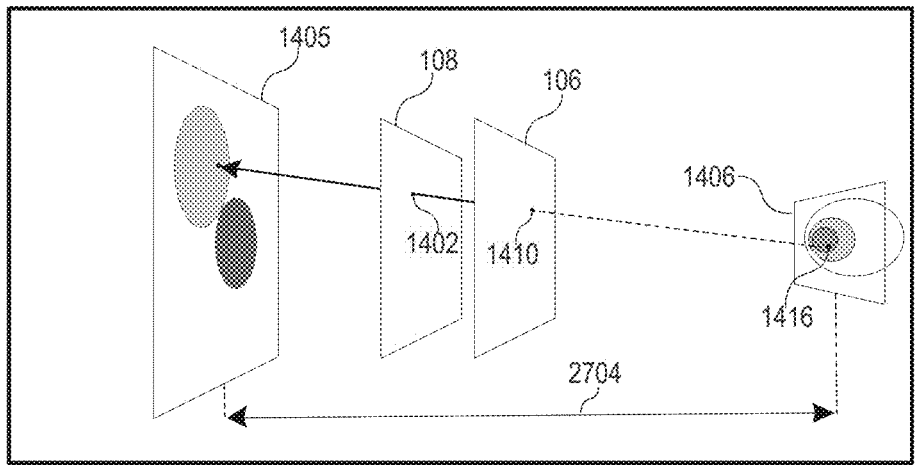
FIGS. 27A and 27B are schematic diagrams illustrating certain process steps of FIG. 25, in accordance with one embodiment.
Figure 27B:
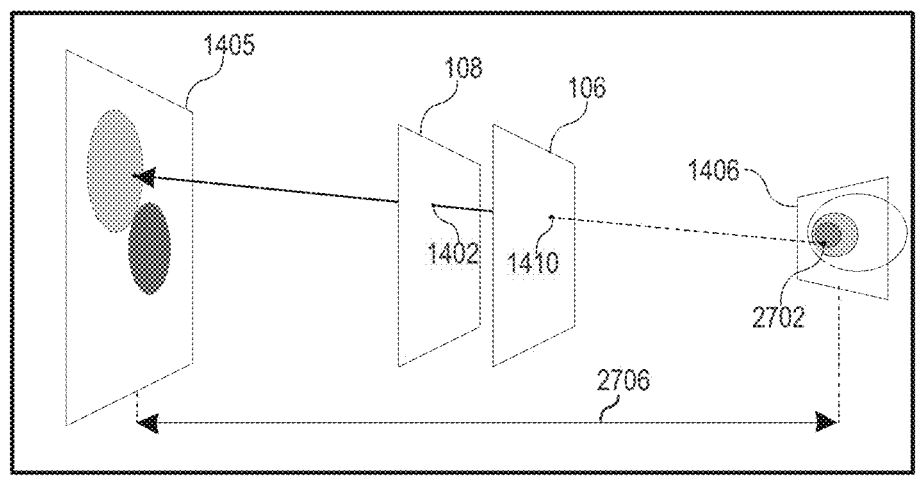

Once the total dioptric power has been computed at step 2502, it may be converted into a corresponding designated image plane location/depth for the current pixel chosen at step 1110. Therefore, each ray-tracing iteration, starting from step 1104, will have its "own" corresponding designated image plane at a potentially different location, depending on the value of the total dioptric power computed above in step 2502. This is schematically illustrated in FIGS. 27A and 27B for the case of virtual image planes (i.e. using the steps of FIGS. 13A and 13B), wherein two different intersection points on retinal plane 1406 are shown, the previously illustrated intersection point 1416 in FIG. 27A and a different but equivalent intersection point 2702 (resulting from ray-tracing from a different pixel than pixel 1402) is shown in FIG. 27B, each giving a corresponding different designated image plane depth or location due to different values of total dioptric power computed for each one (distances or depths 2704 vs 2706 respectively).

In the case where the designated image plane is a virtual image plane (steps 1102 and 1112 of FIGS. 13A and 13B), the corresponding virtual plane location may be derived in the same way as described above, for example for step 1302 of FIG. 13A. In some embodiments, one may use the thin lens equation to derive this virtual plane location (i.e. find object distance that produces image on retinal plane for the eye's focal length):

$$\frac{1}{\text{virt\_dist}} = P - \frac{1}{\text{eye\_depth}}$$

wherein virt_dist is the virtual image plane location (for example depth 2704 or 2706, etc.), P is the total dioptric power discussed above which includes contributions from the spherical power 1028, cylindrical power 1030 and cylinder axis angle 1032 and wherein eye_depth is the eye depth variable 1034.

As mentioned above, step 1102 in method 2500 has been moved after step 2502, since a location or position for the designated image plane is required before mapping and scaling the input image. Thus, in the case of ray-tracing on the virtual image plane (i.e. step 1102 of FIG. 13A), sub-step 1302 and sub-step 1304 in are applied to place virtual image plane 1502 at the distance computed above and to scale input image 1020 onto this plane just as described above for FIG. 13A. In some embodiments, pupil plane 1406 may be off-axis and thus scaling the image may require additional treatment, such as described above with regard to FIG. 19.

In the case where ray-tracing is done on retinal plane 1702 once the total dioptric power has been calculated in step 2502, at sub-step 1312 of step 1102, the location of eye focal plane 1716 corresponding to this total dioptric power value is also determined as described above.

For example, the location of eye focal plane 1716 derived from the total dioptric power computed at step 2502 may be done using the thin lens formula:

$$\text{focal\_dist} = 1 \Big/ \left( P - \frac{1}{\|\text{pupil\_pos} - \text{lens\_pos}\|} \right)$$

wherein focal_dist is the location of eye focal plane 1716 corresponding to P, the total dioptric power computed at step 2502, pupil_pos is the location of the pupil plane 1406 and lens_pos is the location of the of the optical layer 106.

In some embodiments, in the case of retinal plane ray-tracing, sub-steps 1602 and 1604 may be moved outside step 1102 and used only once at the beginning of method 2500, before step 1104, since computing the center position of the image on retinal plane 1702 (sub-step 1602) and scaling the image thereon (sub-step 1604) does not depend on the location of eye focal plane 1716 and is thus the same for all pixels.

In some embodiments, light field rendering or ray-tracing methods described above may also be adapted for projecting or displaying multiple images or optotypes simultaneously at different values of spherical dioptric power 1026, and/or cylindrical dioptric power 1030 and cylinder axis angle 1032.

For example, a small modification to the methods described above which would allow for multiple simultaneous optotypes would be to define regions or portions of pixels within pixel display 108 and assign to them a single optotype or image having a corresponding assigned different set of input parameters (e.g. spherical dioptric power 1026, cylindrical dioptric power 1030 and cylinder axis angle 1032). Therefore, the set of parameters to be used for this portion of pixels would be known upon each iteration of step 1104 where a new pixel is chosen for ray-tracing. The method would fetch the corresponding set of vision correction parameters assigned to the pixel display portion comprising the chosen pixel and used them when upon reaching step 2502. Moreover, this portioning of pixel display 108 may equally be used for spherical dioptric power 1026 corrections only or other methods described below.

Figure 28A:
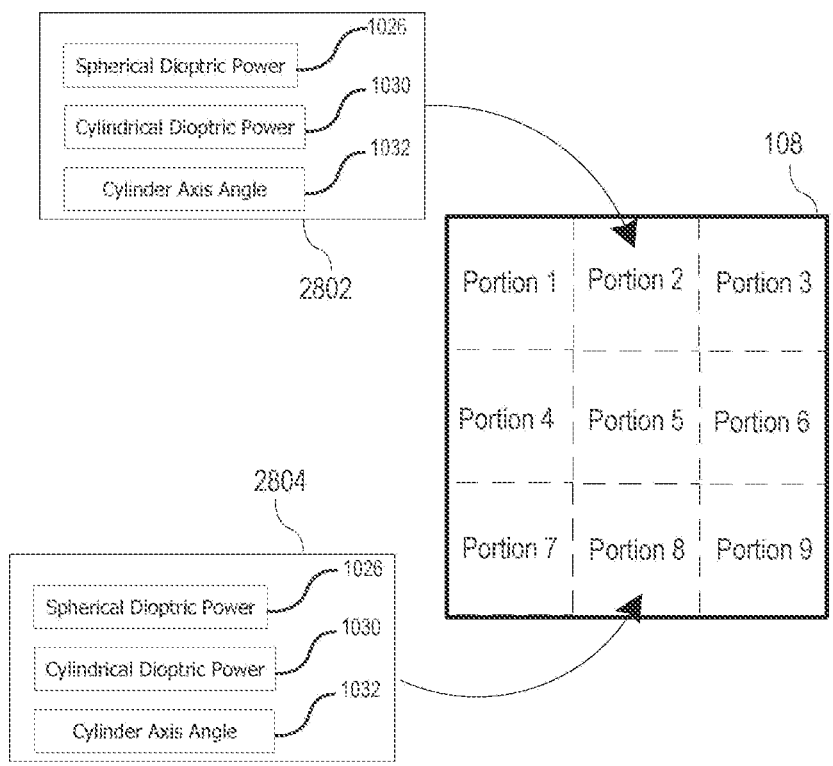
FIGS. 28A and 28B are schematic diagrams illustrating some modifications to the method of FIGS. 11 and 25 that allows for multiple optotypes to be displayed with different vision correction parameters, in accordance with one embodiment.
Figure 28B:
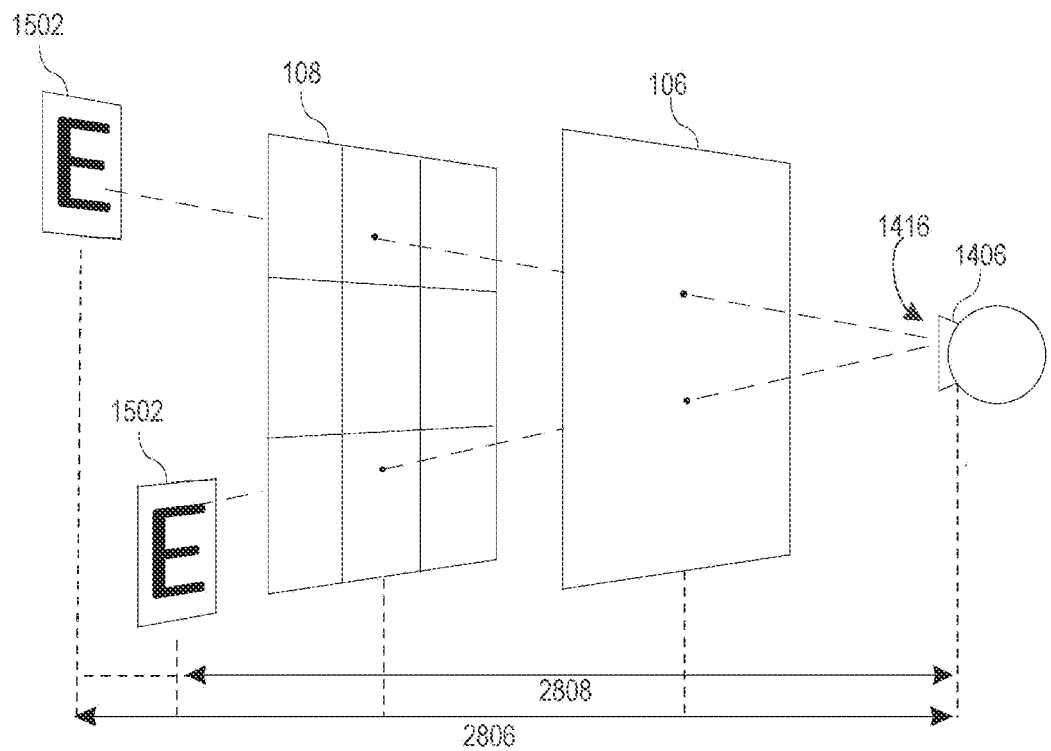

In an example using either method 1100, 2500 or other methods described below, and herein illustrated schematically in FIG. 28A, pixel display 108 is shown being divided into 9 cells/regions/portions, wherein every pixel contained within a given portion is reserved for displaying a single image or optotype with a corresponding set of vision correction parameters (i.e. spherical dioptric power 1026, cylindrical dioptric power 1030 and cylinder axis angle 1032). The skilled technician will understand that the division shown in FIG. 28A is an example only and that any divisional configuration of pixel display 108 may be used without limitation (for example in two side-by-side portions as illustrated in FIG. 9 or 24B). Moreover, in the example of FIG. 28A, portions 2 and 8 are shown each having been assigned a distinct set of vision correction parameters 2802 and 2804, respectively. FIG. 28B shows schematically the result when ray-tracing on virtual image planes (steps from FIGS. 13A and 13B) where two exemplary light rays are shown originating from portions 2 and 8, respectively, having the same intersection point 1416 on pupil plane 1406, but wherein the distinct sets 2802 and 2804 used for each pixel result in each virtual image plane 1502 being located at a different distance or depth 2806 and 2808, respectively.

In some embodiments, the image or optotype assigned to a given pixel array portion may be made small enough and/or centered within said portion so to avoid any overlapping/cross-talk/occlusion between the light field generated from this pixel array portion with a light field emitted from a neighboring pixel array portion. For example, in the case of optotypes such as letters, these may be small and surrounded by transparent pixels or the like.

While the schematic diagram of FIG. 28B shows virtual image planes, the same technique illustrated in FIG. 28A of assigning pixel display portions or regions to pixel display 108 may equally be used when ray-tracing on retinal plane 1702 as well. The only difference being that the assigned set of vision correction parameters for the current portion of pixel display 108 in that case is used to derive the corresponding location of eye focal plane 1716 instead of virtual image plane 1502.

Figure 29:
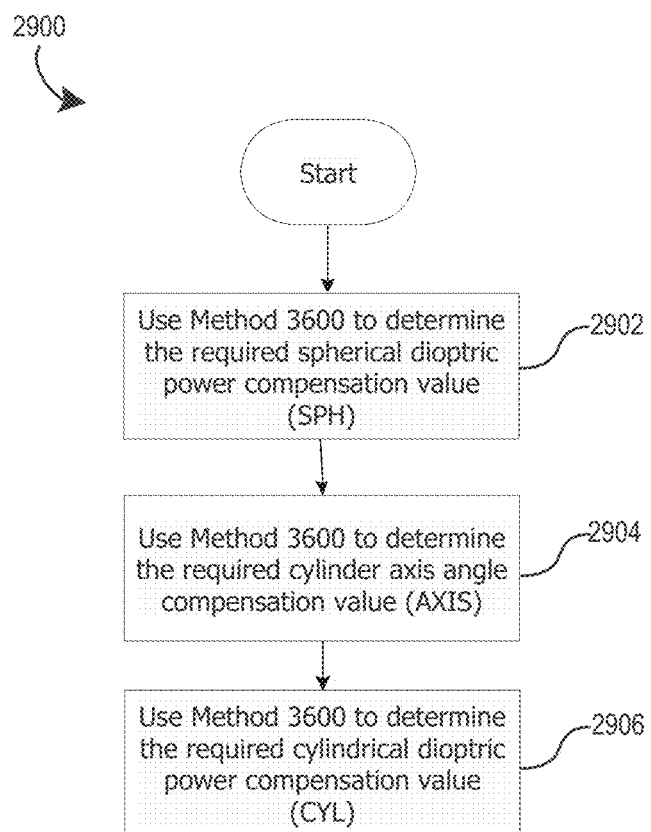
FIG. 29 is a process flow diagram illustrating an exemplary method for providing an eye examination in the context astigmatism or similar conditions, in accordance with one embodiment.

In one embodiment, astigmatism may be tested using refractor device 102 of system 100 by repeating the steps of method 800 described above sequentially to determine the required spherical dioptric power 1026, cylindrical dioptric power 1030 and cylinder axis angle 1032 (e.g. SPH, CYL, and AXIS parameters). This is shown in the exemplary process flow diagram of FIG. 29. For this example, the light field rendering method 2500 may be used to render light fields images with different combinations of spherical dioptric power 1026, cylindrical dioptric power 1030 and cylinder axis angle 1032, as explained above. Thus, in some embodiments, at step 2902, a first iteration of method 800 may be executed to determine the necessary spherical dioptric power 1026 adjustment, followed by a second iteration for determining the cylinder axis angle 1032 and finally a third iteration for determining the necessary cylindrical dioptric power 1030 adjustment.

At step 2902, in one embodiment, a series of optotypes may be shown sequentially or simultaneously, each optotype generated at a different spherical dioptric power 1026 as discussed above. Once the user has identified which optotype is the clearest at a good enough diopter resolution, that value of the corresponding spherical dioptric power 1026 that best compensates for the user's reduced visual acuity is identified (e.g. SPH parameter).

Figure 30:
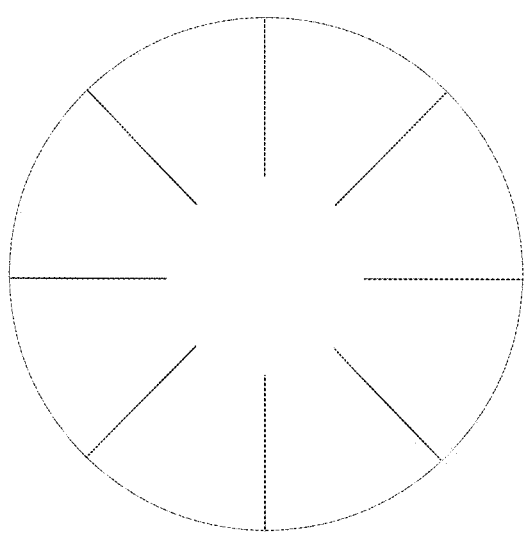
FIG. 30 is a schematic figure of an exemplary diagram or optotype that may be presented to a user to diagnose astigmatism or similar conditions, in accordance with one embodiment.

Then at step 2904, a second iteration of method 800 may then be executed for determining the cylinder axis angle 1032. In some embodiments, the optotypes displayed or generated by phoropter 102 may be akin to what would be seen by the user when using a Jackson cross-cylinder device or similar (at step 804 of method 800). For example, light field display 104 may be operable to display images comprising lines or dots located at specific angles for marking the principal meridians. In some embodiments, to find an initial starting value for the cylinder axis angle 1032, a series of lines arranged like on a dial of an analog clock (an example of which is shown in FIG. 30) may be first displayed without any cylindrical dioptric power being generated. The user may then be asked which line looks different from the others (e.g. not quite straight), which will define the starting value of the cylinder axis angle 1032. Then, a small cylindrical dioptric power 1030 may be generated at the required cylinder axis angle 1032 (for example 0.5 D for normal users or 1D for low vision users), and the process is iterated by generating new dial-like images and refining the value of the cylinder axis angle 1032 until a good value is determined (e.g. AXIS parameter).

Finally, at step 2906, once the required cylinder axis angle 1032 is known (i.e. the required meridian), method 2900 may be repeated a final time by varying the cylindrical dioptric power 1030 generated for each image using the spherical dioptric power 1026 and cylinder axis angle 1032 values identified in steps 2902 and 2904, respectively, until the user communicates which image is the clearest or most comfortable to view, thus giving the final cylindrical dioptric power value 1030 required. At the end of this exemplary process 2900, the best values of SPH, CYL and AXIS required to compensate for the user's astigmatism will have been determined.

In one such embodiment, a HOA correction preview can be rendered, for example, in enabling users to appreciate the impact HOA correction (e.g. HOA compensating eyewear or contact lenses, intraocular lenses (IOL), surgical procedures, etc.), or different levels or precisions thereof, could have on their visual acuity. Alternatively, HOA corrections once validated can be applied on demand to provide enhanced vision correction capabilities to consumer displays.

Higher-order aberrations can be defined in terms of Zernike polynomials, and their associated coefficients. In some embodiments, the light field phoropter may be operable to help validate or confirm measured higher-order aberrations, or again to provide a preview of how certain HOA corrections may lead to different degrees of improved vision. To do so, in some embodiments, the ray-tracing methods discussed above may be modified to account for the wavefront distortion causing the HOA which are characterized by a given set of values of the Zernike coefficients. Such an approach may include, in some embodiments, extracting or deriving a set of light rays corresponding to a given wavefront geometry. Thus, the light field display may be operable to compensate for the distortion by generating an image corresponding to an "opposite" wavefront aberration. In some embodiments, the corresponding total aberration values may be normalized for a given pupil size of circular shape. Moreover, in some embodiments, the wavefront may be scaled, rotated and transformed to account for the size and shape of the view zones. This may include concentric scaling, translation of pupil center, and rotation of the pupil, for example.

Figure 31:
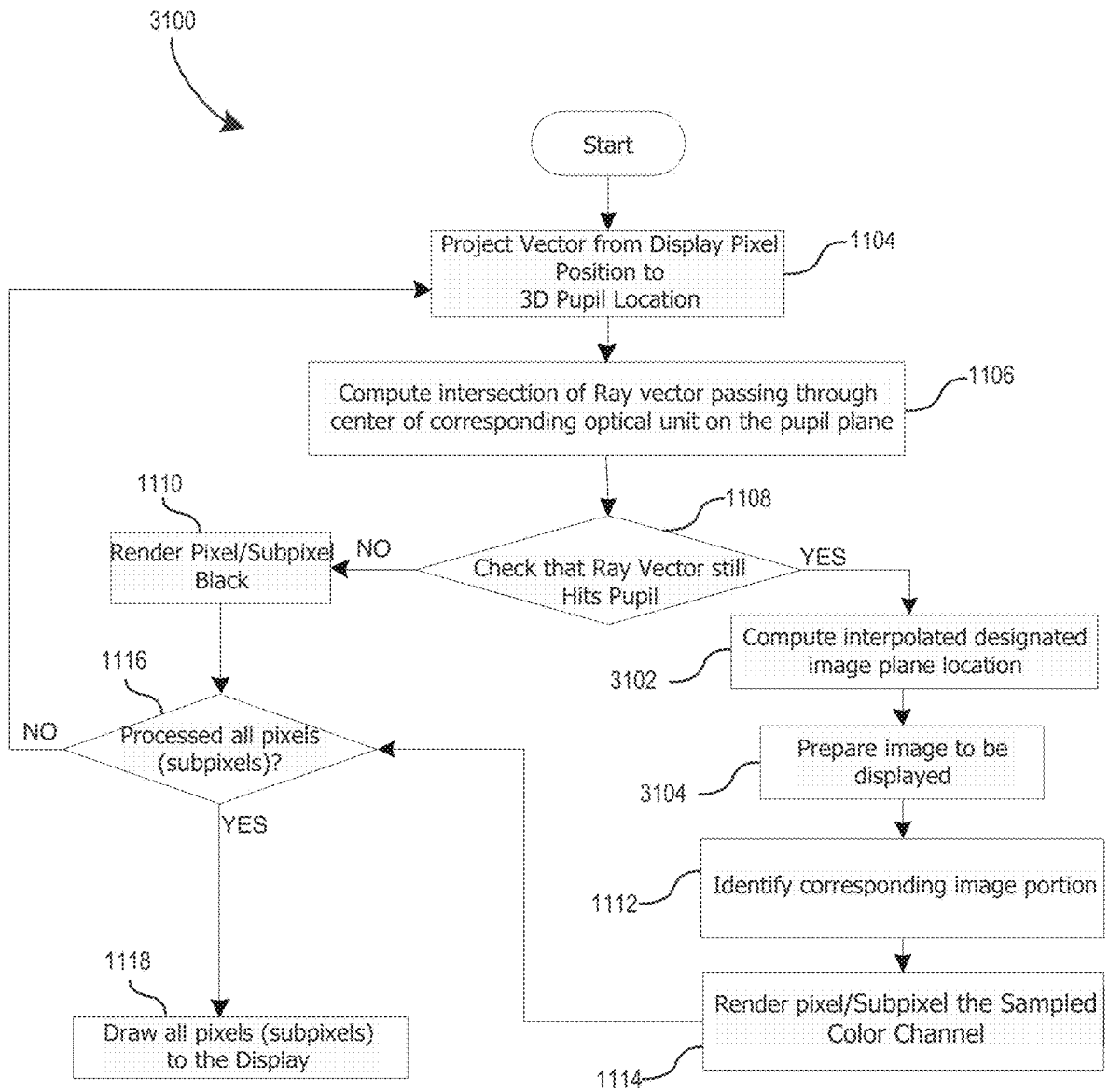
FIG. 31 is a process flow diagram of an illustrative ray-tracing rendering process for progressive light field compensation, in accordance with one embodiment.

With reference to FIGS. 31 to 39C, and in accordance with one embodiment, a ray-tracing rendering process for rendering a light field image that can continuously transition between two different sets of vision correction parameters, generally referred to using the numeral 3100, will now be described. FIG. 31 illustrates via a flow process diagram method 3100 as described herein in accordance with one embodiment. Method 3100 expands upon method 2500 described above (and thus comprises the possibility of compensating for spherical aberrations in addition to other aberrations like astigmatism or HOA) in a way that the displayed light field image may be modulated so as to smoothly or continuously vary the strength of the vision correction generated at different locations or portions of the same image between pre-defined sets of vision correction parameters.

Thus, in most part, as illustrated in FIG. 31, method 3100 proceeds just like method 2500, with the exception of steps 2502 and 1102 which are integrated, at least in part, into new steps 3102 and 3104, respectively. The general principle underlying these new steps is the use of a means of encoding a depth information as a function of image location. This depth information is then used, for each ray-tracing iteration, to interpolate a designated focal plane location between two boundary planes or layers, each boundary plane corresponding to a different pre-defined set of vision correction parameters (i.e. spherical dioptric power 1028, cylindrical power 1030 and cylinder axis angle 1032).

Figure 36A:
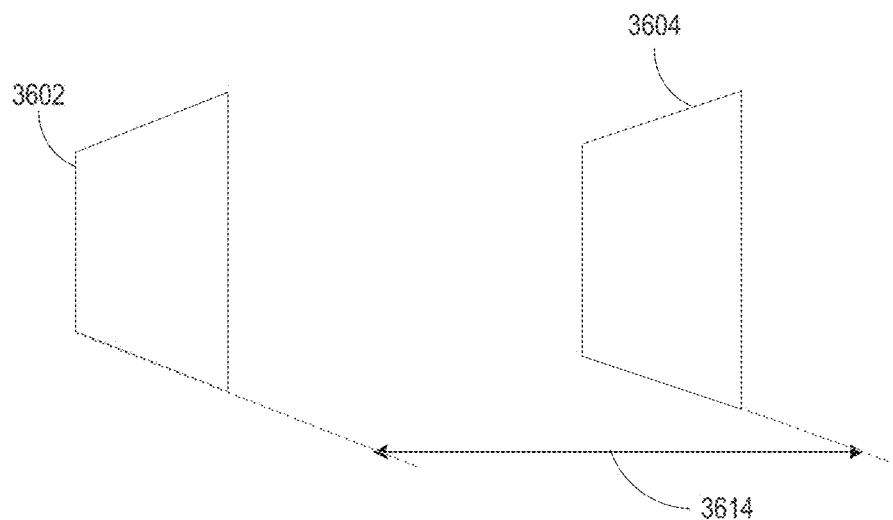
FIGS. 36A to 36C are schematic diagrams illustrating the use of a depth map to define an interpolated designated image plane location from two boundary planes, in accordance with one embodiment.

For example, FIG. 36A shows two such exemplary boundary planes or layers, boundary plane 3602 and boundary plane 3604. In this example, boundary planes 3602 and 3604 may at this junction equally be virtual image planes (e.g. equivalent to virtual plane 1502 of FIG. 15) or eye focal planes (e.g. equivalent to eye focal plane 1716 of FIGS. 17A and 17B) and the skilled technician will understand that the use of a depth map or similar described below may equally apply to both situations. As stated above, each boundary plane corresponds to a different set of vision correction parameters, and will thus be located at a different location during the ray-tracing process, herein shown as a distance 3614. From these two boundary planes, it is possible to define any relative position or location therebetween via a depth function, matrix or map. For example, in the embodiment illustrated in FIG. 36B, a depth map 3606 is used, which consists of a grayscale image having relative depth information encoded via grayscale pixel values. In the examples given herein, the associated values for black and white are 0 and 1 (if normalized, which is usually done), respectively, and any grayscale value in-between gives a corresponding pixel value between [0,1], which may be used as an input to interpolated via linear interpolation or other techniques between the location of plane 3602 and plane 3604. The grayscale pixel value thus gives the relative location of the designated image plane at this location, as a function of which boundary plane depth map 3606 is mapped onto.

Figure 36B:
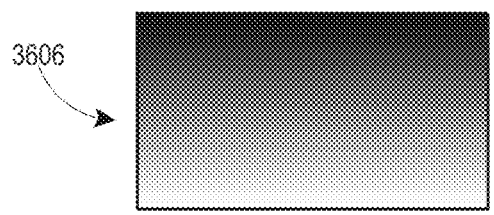

The exemplary grayscale image for depth map 3606 shown in FIG. 36B comprises a linear top-down gradation or variation from black to white (pixel values in y thus vary linearly from 0 to 1, top to bottom). This exemplary grayscale image would thus reproduce an effect similar to looking through a progressive lens, wherein the dioptric power gradually varies from top to bottom. The skilled technician will understand that any type or variation of grayscale images may be used for depth map 3606. For example, another example of a grayscale image that may be used to define different regions or portions of dioptric power similar to the configuration of a bi-focal lens will be shown in FIG. 39A.

Figure 36C:
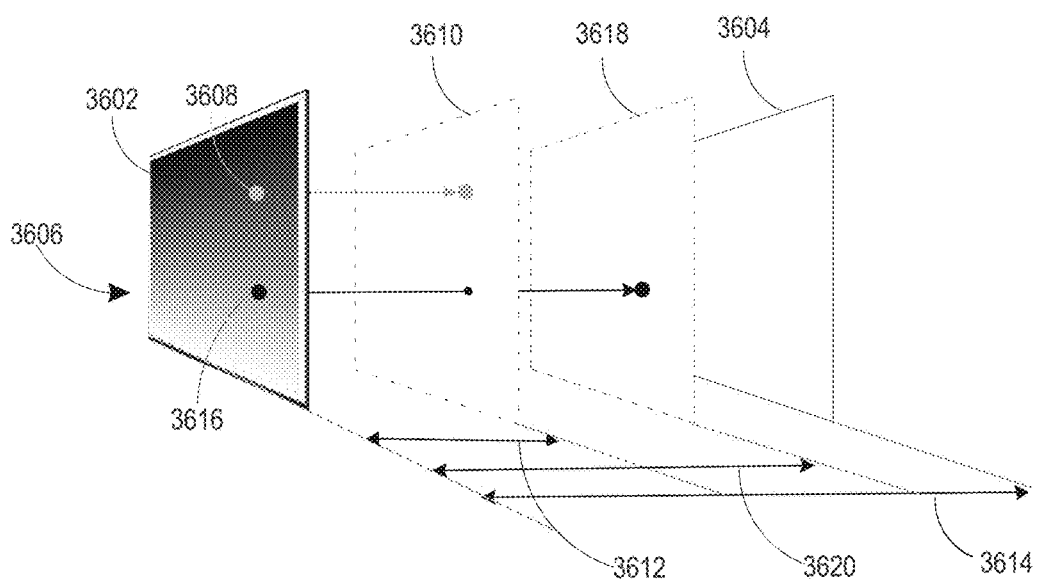

Depth map 3606 can be mapped onto either one of planes 3602 or 3604, and its grayscale pixel values used to define a relative position or location somewhere between each plane. In the example of FIG. 36C, depth map 3606 was mapped onto plane 3602. Thus, as shown in FIG. 36C, an exemplary depth map pixel location 3608 (i.e. darker so closer to a value of 0) on boundary plane 3602 then corresponds to an interpolated designated plane 3610 located at position or location 3612 relative to the distance 3614 between boundary planes 3602 and 3604, while another pixel location 3616 (i.e. having lighter pixel value so closer to 1) corresponds instead to an interpolated designated plane 3618 located at position 3620 that is correspondingly closer to boundary plane 3604.

As will be discussed below, the exact relative location between planes 3602 and 3604 may depend, in addition to whether ray-tracing is done on virtual image planes or eye focal planes, on whether astigmatism is considered (i.e. non-zero values for cylindrical power 1030 and cylinder axis angle 1032). This amounts to requiring of the intersection point 1416 on pupil plane 1406 as discussed above for method 2500, and thus may change at every iteration.

Figure 32:
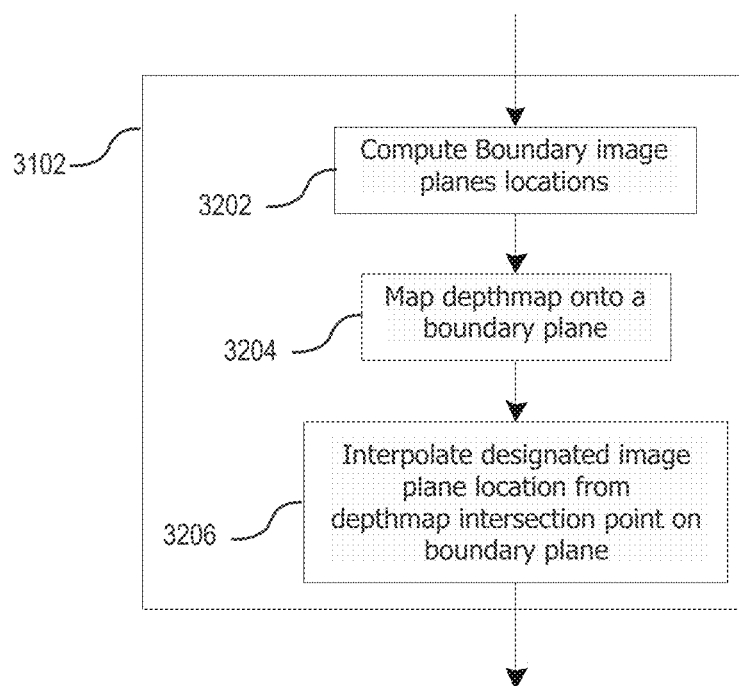
FIG. 32 is a process flow diagram illustrating a process step from FIG. 31, in accordance with one embodiment.
Figure 33:
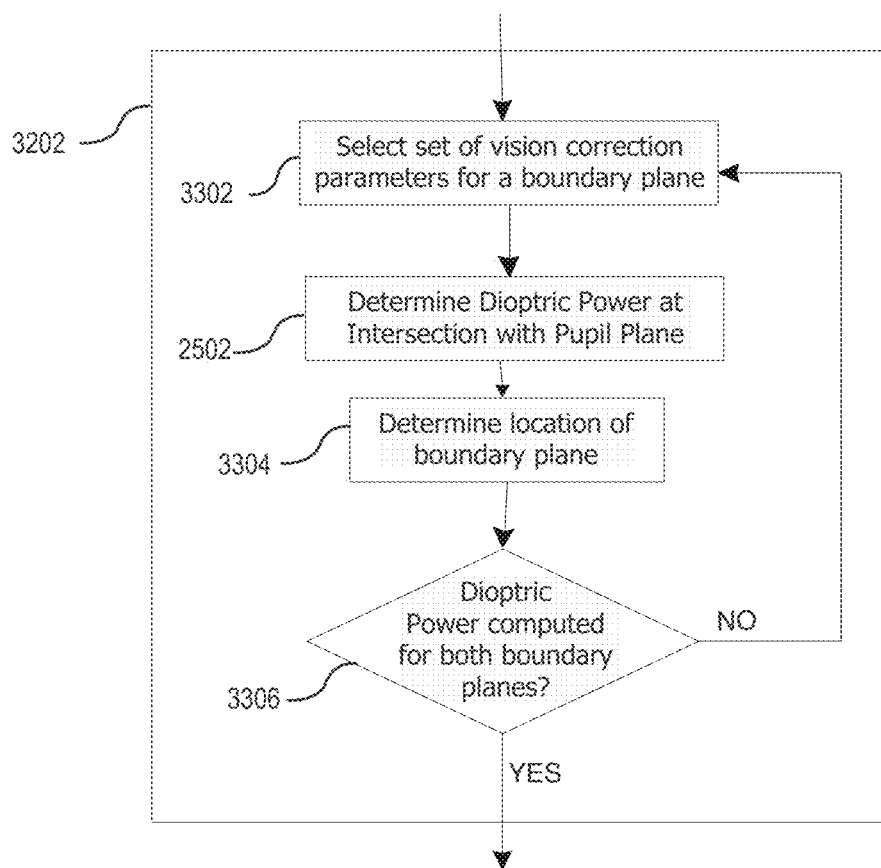
FIG. 33 is a process flow diagram illustrating a process step from FIG. 32, in accordance with one embodiment.
Figure 34:
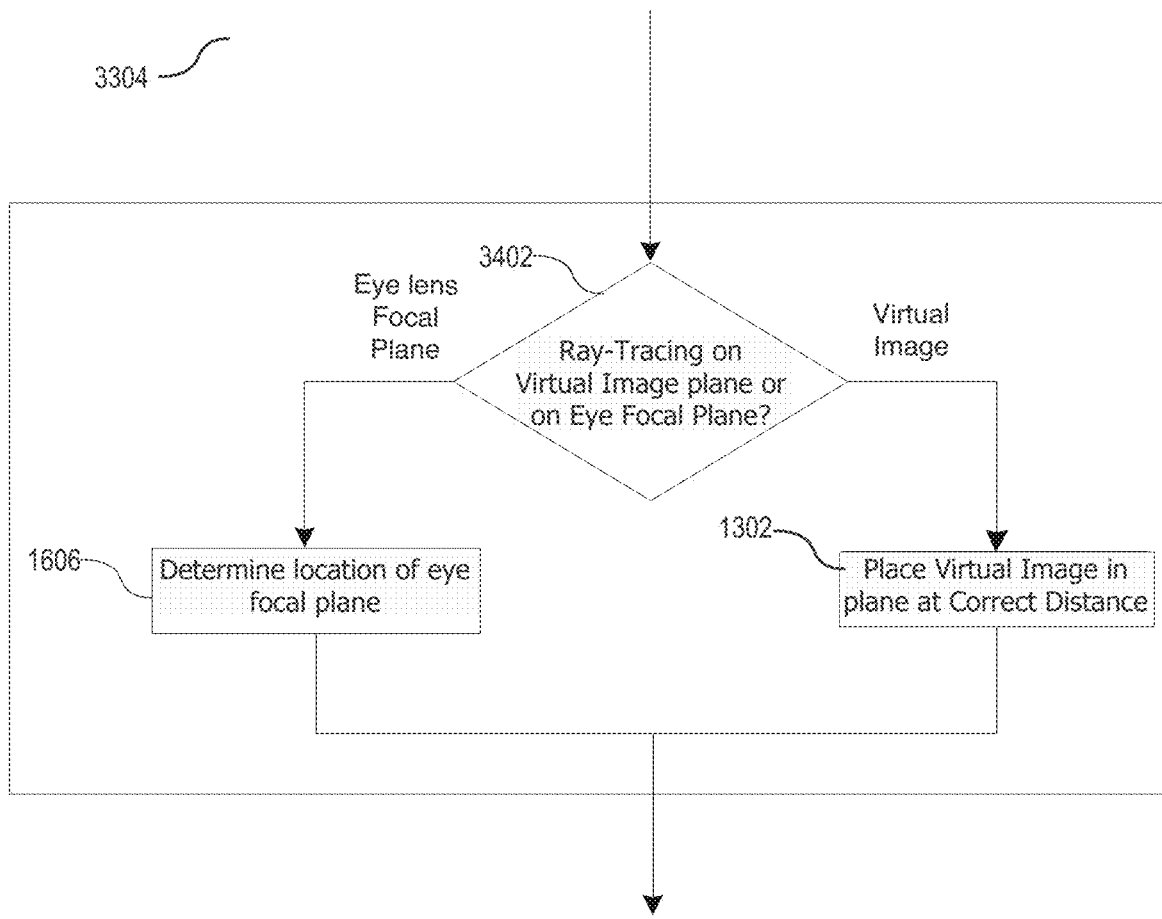
FIG. 34 is a process flow diagram illustrating a process step from FIG. 33, in accordance with one embodiment.

FIG. 32 is a process flowchart illustrating the sub-steps of step 3102. As stated above, in step 3102, using depth map 3606, the location of the interpolated designated image plane is computed. Thus, at sub-step 3202, the location of each boundary plane is first computed. As explained above, each boundary plane corresponds to a different set of vision correction parameters. In the case where astigmatism is being compensated (as in method 2500), then the location of each boundary plane will depend, as explained above, on the total dioptric power associated with the pupil intersection point 1416. Thus, FIG. 33 shows an exemplary embodiment of step 3202, wherein at sub-step 3302 a first set of vision correction parameters is selected, which is then used to apply step 2502 as described above for method 2500, and compute therefrom the value of total dioptric power. Notably, if no cylindrical compensation is required, step 3202 may be done only once, for example before step 1104 of method 3100 is first executed (i.e. before starting the iteration over all pixels in pixel display 108) and step 2502 therein would not be necessary at all. Once the total dioptric power is known, after step 2502, step 3304 is used to determine the associated location of the first boundary plane. As described above, ray-tracing may be done using either virtual image planes or eye lens focal planes. Thus, FIG. 34 shows an embodiment of step 3304 wherein at step 3402, if virtual image planes are used, then the first boundary plane is a virtual image plane, and its location of the corresponding to the total dioptric power computed previously is computed at step 1302 as described for method 2500. In contrast, if eye lens focal planes are used for ray-tracing, then at step 1606 the corresponding eye lens focal plane location corresponding to this boundary plane is computed as described above.

Going back to FIG. 33, once the location of the first boundary plane is known, at step 3306 is sent back to repeat steps 3302, 2502 and 3304 the compute the location of the second boundary plane corresponding to the second set of vision correction parameters.

Once both boundary plane locations have been computed at sub-step 3302, at sub-step 3204, depth map 3606 is mapped onto one boundary plane before ray-tracing is done thereon at step 3206 to interpolate the location of the interpolated designated image plane location for this pixel iteration.

Figure 37A:
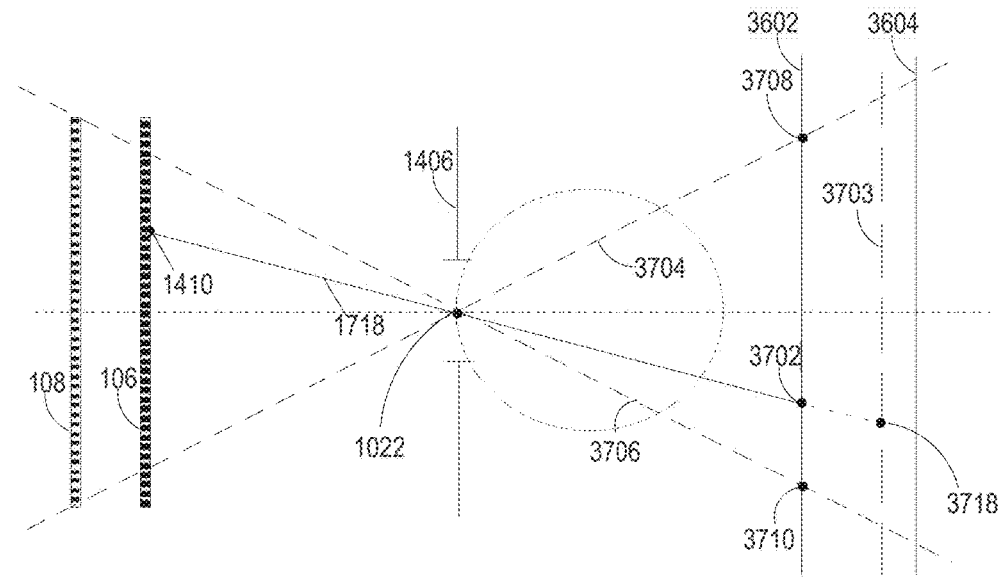
FIGS. 37A to 37C are schematic diagrams illustrating certain process steps of FIGS. 31 to 34, in accordance with one embodiment.
Figure 37B:
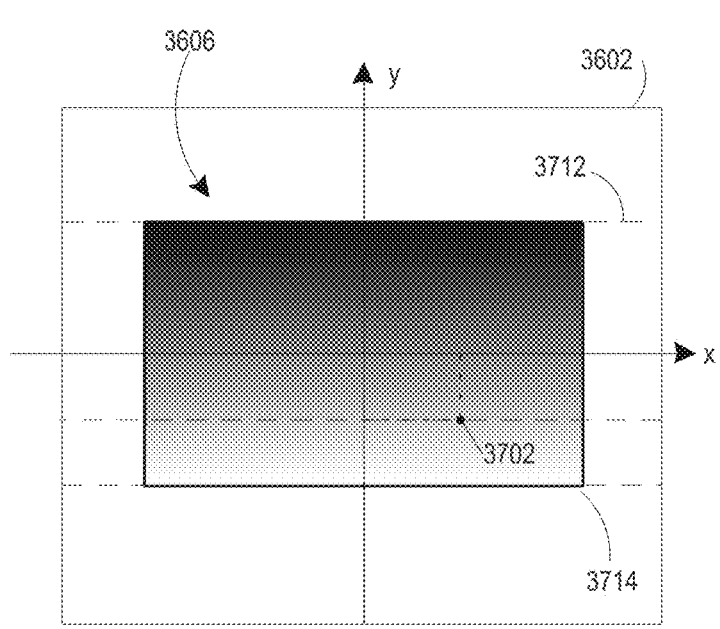
Figure 37C:
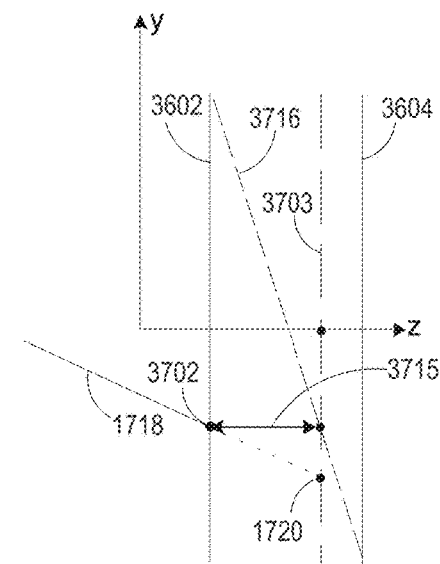

This is illustrated schematically in FIGS. 37A to 37C, wherein as an example only, ray-tracing is done using eye lens focal planes. Thus, in FIG. 37A, which mirrors in part FIG. 17A, is a side-view of LFSL 106, pixel display 108, and pupil plane 1406. Like in FIG. 17A, a vector 1718 originating from center location 1410 of the optical unit to pupil center location 1022 is shown being projected behind the eye. However, instead of having a single eye lens focal plane 1716, both exemplary boundary planes 3602 and 3604 are used instead. In this example, again exemplary depth map 3606 of FIG. 36B will be used and mapped onto boundary plane 3602. A front-view of depth map 3606 mapped onto boundary plane 3602 is shown in FIG. 37B. As mentioned above, at sub-step 3204, depth map 3606 is mapped onto boundary plane 3602. This may be done by tracing the scope or width of pixel display 108 as projected behind the eye, for example via lines 3704 and 3706, which intersect at locations 3708 and 3710 (which corresponds to y-axis limiting values for lines 3712 and 3714 in FIG. 37B). The same may be done in the x-axis limiting values (not shown) and used to define the size and location of depth map 3606 onto boundary plane 3602.

Once depth map 3606 is mapped and scaled properly, at sub-step 3204, the interpolated designated image plane location is computed for this iteration at sub-step 3206. Again, this step may be done equally to both virtual image planes or eye focal planes, without changes, but is discussed herein in the context of ray-tracing via eye lens focal plane as illustrated in FIGS. 37A to 37C as an example only. Thus, in the case of ray-tracing on eye focal planes, as shown in FIG. 37A, vector 1718 may be projected behind the pupil towards boundary plane 3602 to define intersection point 3702 therewith, which will correspond to a gray scale pixel value of depth map 3606, as shown in FIG. 37B. As illustrated in FIG. 37C, the value of the grayscale pixel corresponding to intersection point 3702 is used to define a location interpolated plane 3703 with respect to boundary planes 3602 and 3604 (i.e. distance 3715). As a guide, line 3716 shows the equivalent interpolated locations along the y-axis corresponding to exemplary image of depth map 3606 shown in FIG. 37B (i.e. linearly changing from the location of boundary plane 3602 to the location of boundary plane 3604 from top. to bottom).

In this example, since eye focal planes were used, once step 3102 is done, interpolated plane 3703 becomes equivalent to eye lens focal plane 1716, and corresponding intersection point 3718 of vector 1718 (shown in FIG. 37A) thereon is equivalent to intersection point 1720 of FIG. 17A. If instead ray-tracing is done using virtual image planes, then vector 1504 shown in FIG. 15 would be used instead of vector 1718, interpolated plane 3703 would become virtual image plane 1502, and the intersection point thereon would be intersection point 1506 instead.

Figure 35:
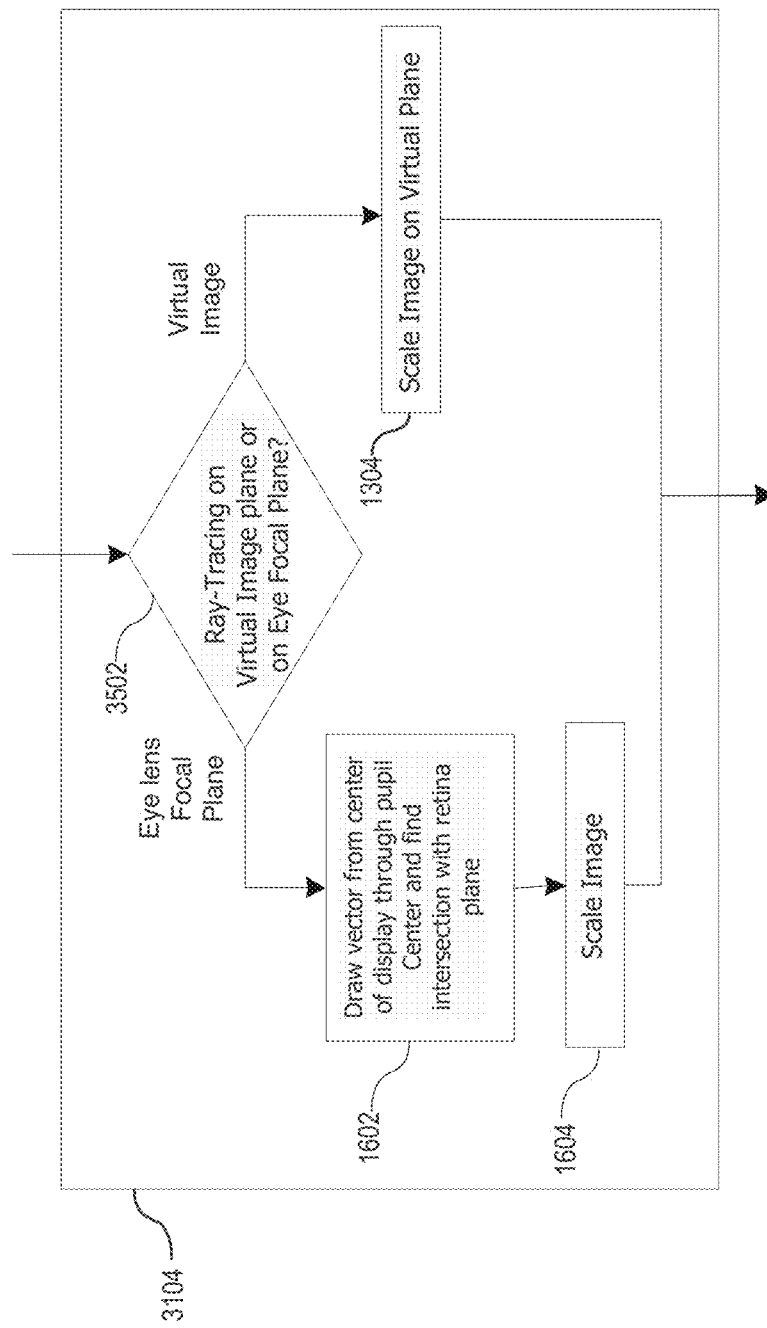
FIG. 35 is a process flow diagram illustrating a process step from FIG. 31, in accordance with one embodiment.

However, before step 1112 may be used, step 3104 follows step 3102 to prepare the input image to be displayed, similarly to step 1102 of methods 1100 and 2500. Thus, in step 3104 as illustrated in FIG. 35, at sub-step 3502, the method depends whether ray-tracing was done using eye lens focal planes, in which case steps 1602 and 1604 as described above follow, while in the case of ray-tracing on virtual image planes, step 1304 is done, again as described above. Notably, in the case of eye lens focal planes, steps 1602 and 1604 may optionally be done at any point before step 1112, for example only once before step 1104. In the case of step 1304, input image 1020 is scaled onto interpolated plane 3703 as described above for virtual image plane 1502.

Figure 38A:
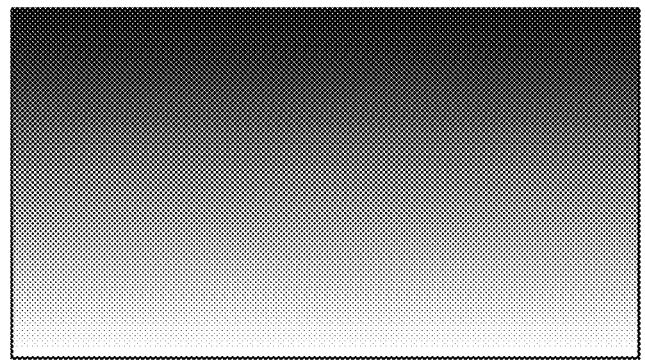
FIGS. 38A to 38C are simulated views (B-C) of a light field image using a depth map (A) configured so as to simulate the effects of a progressive lens, in accordance with one embodiment.
Figure 38B:
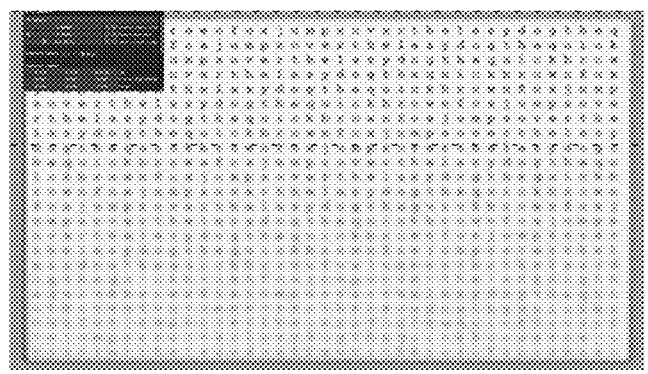
Figure 38C:
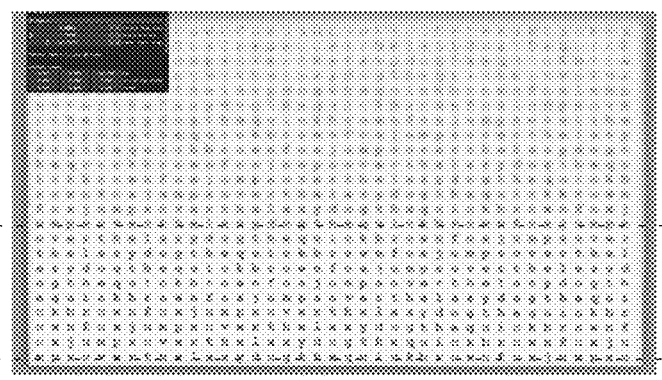

An example of the perceived image by a user, for example via refractor 102 using method 3100 is illustrated in FIGS. 38A to 38C. FIG. 38A shows the exemplary grayscale image of FIGS. 36B and 37B for depth map 3606, which defines light field image having varying strength from top to bottom, thereby reproducing the effect of a progressive lens, for example. In this example, boundary planes 3602 and 3604 correspond to vision correction parameters having no cylindrical components and a spherical dioptric power 1026 defined so as to focus an image on retinal plane 1702 originating from infinity or 1 m, respectively. Thus, FIGS. 38B and 38C shows a simulation of the perceived image by a user when the user focuses at infinity (38B), showing the text within region or portion 3802 being in focus, while the text contained within region or portion 3804 is out of focus. Inversely, in FIG. 38C, the user is focusing at 1 m and thus region 3802 is now out of focus while region 3804 is in focus.

Figure 39A:
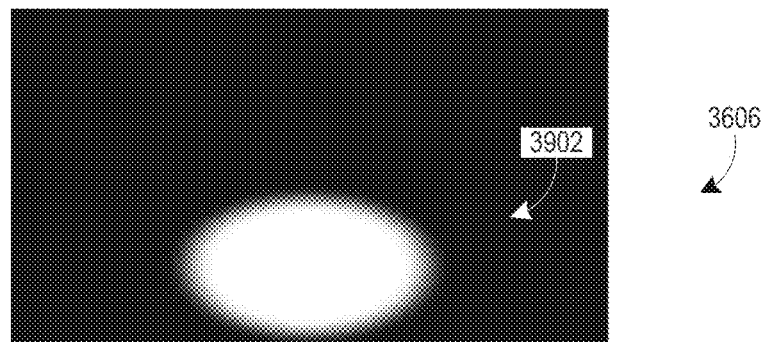
FIGS. 39A to 39C are simulated views (B-C) of a light field image using a depth map (A) configured so as to simulate the effects of a bifocal lens, in accordance with one embodiment.
Figure 39B:
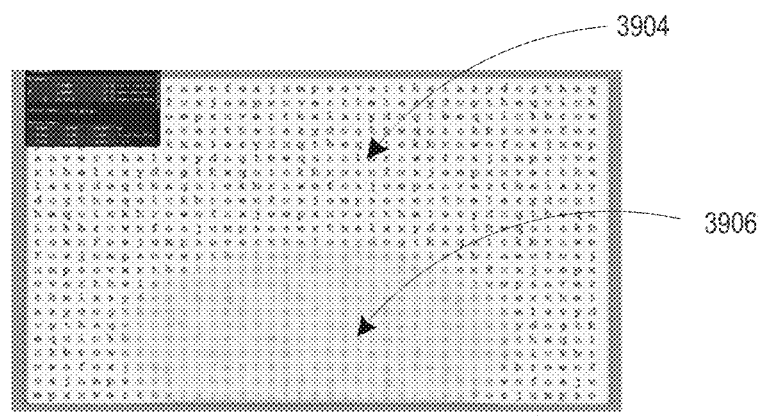
Figure 39C:
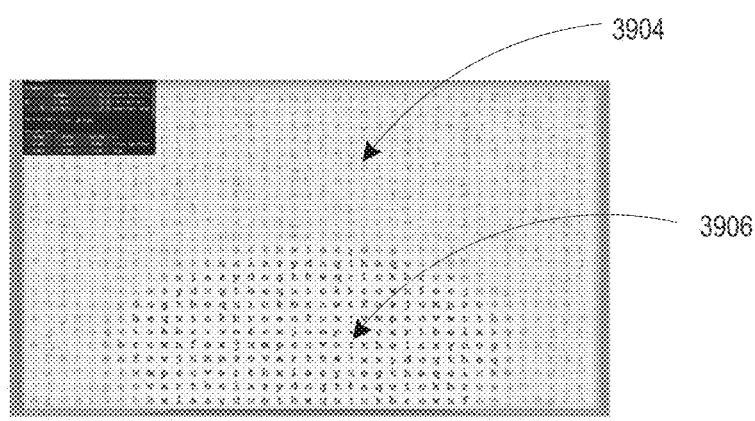

As mentioned above, any grayscale image may be used for depth map 3606, so as to define any variation in dioptric power as required. Another example is shown in FIGS. 39A to 39C, wherein a grayscale image 3902 is used as depth map 3606 to define a substantially spherical region at the center bottom having a different dioptric power, thus reproducing the effect of a bifocal lens or similar. The vision correction parameters are the same as in the example of FIGS. 38A to 38C. Thus, in FIG. 39B, a simulated perceived image when a user is focusing at infinity shows the surrounding region or portion 3904 being in focus, while the region or portion 3904 is blurred. In contrast, FIG. 39C shows the simulated perceived image of a user focusing a 1 m, wherein the reverse is true.

While the present disclosure describes various embodiments for illustrative purposes, such description is not intended to be limited to such embodiments. On the contrary, the applicant's teachings described and illustrated herein encompass various alternatives, modifications, and equivalents, without departing from the embodiments, the general scope of which is defined in the appended claims. Except to the extent necessary or inherent in the processes themselves, no particular order to steps or stages of methods or processes described in this disclosure is intended or implied. In many cases the order of process steps may be varied without changing the purpose, effect, or import of the methods described.

Information as herein shown and described in detail is fully capable of attaining the above-described object of the present disclosure, the presently preferred embodiment of the present disclosure, and is, thus, representative of the subject matter which is broadly contemplated by the present disclosure. The scope of the present disclosure fully encompasses other embodiments which may become apparent to those skilled in the art, and is to be limited, accordingly, by nothing other than the appended claims, wherein any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims. Moreover, no requirement exists for a system or method to address each and every problem sought to be resolved by the present disclosure, for such to be encompassed by the present claims. Furthermore, no element, component, or method step in the present disclosure is intended to be dedicated to the public regardless of whether the element, component, or method step is explicitly recited in the claims. However, that various changes and modifications in form, material, work-piece, and fabrication material detail may be made, without departing from the spirit and scope of the present disclosure, as set forth in the appended claims, as may be apparent to those of ordinary skill in the art, are also encompassed by the disclosure.

While the present disclosure describes various exemplary embodiments, the disclosure is not so limited. To the contrary, the disclosure is intended to cover various modifications and equivalent arrangements included within the general scope of the present disclosure.

What is claimed is:

1. A computer-implemented method, automatically implemented by one or more digital processors, to automatically adjust user perception of an input to be rendered via a set of pixels and a corresponding array of light field shaping elements (LFSE), the method comprising, for each given pixel of at least some of the set of pixels:
   digitally projecting an adjusted image ray trace between said given pixel and a user pupil location to intersect a boundary plane location on a designated boundary image perception plane given a designated boundary image perception value and given a direction of a light field emanated by said given pixel based on a given LFSE intersected thereby;
   identifying an adjusted image location on an adjusted image plane corresponding with a designated adjusted image perception value designated for said boundary plane location;
   associating with said given pixel an adjusted image value designated for said adjusted image location; and
   rendering for each said given pixel said adjusted image value associated therewith;
   wherein each of said designated boundary image perception plane and said adjusted image plane comprise a virtual image plane virtually positioned relative to the pixels as a function of said designated boundary image perception value and said designated adjusted image perception value associated therewith, respectively.

2. The computer-implemented method of claim 1, wherein:
   said digitally projecting comprises digitally projecting said adjusted image ray trace to intersect respective boundary plane locations on respective designated boundary image perception planes given respective boundary image perception values; and
   said adjusted image location on said adjusted image plane is interpolated between said respective designated boundary image perception planes as a function of said designated adjusted image perception value, wherein said designated adjusted image perception value is designated as a function of a perceptive depth mapping between said respective designated boundary image perception planes.

3. The computer-implemented method of claim 1, wherein said designated adjusted image perception value is designated as a function of a perceptive depth mapping of said designated boundary image perception plane, wherein said depth mapping results in defining distinct visual perception zones associated with respective visual perception parameters, or in a progressive perception adjustment of the input image.

4. The computer-implemented method of claim 1, wherein the method simulates a multi-focal effect for distinct portions of the input, wherein said adjusted image plane comprises said designated boundary image perception plane when said boundary plane location corresponds with one of said distinct portions, whereas said adjusted image plane comprises a distinct adjusted image plane when said boundary plane location corresponds with another one of said distinct portions.

5. The computer-implemented method of claim 4, wherein the method simulates a progressive multi-focal effect, wherein progressively varying adjusted image planes are progressively defined to correspond with intermediary regions between the distinct portions.

6. A non-transitory computer-readable medium comprising digital instructions to be implemented by one or more digital processors to automatically adjust user perception of an input to be rendered via a set of pixels and a corresponding array of light field shaping elements (LFSE), by, for each given pixel of at least some of the set of pixels:
   digitally projecting an adjusted image ray trace between said given pixel and a user pupil location to intersect a boundary plane location on a designated boundary image perception plane given a designated boundary image perception value and given a direction of a light field emanated by said given pixel based on a given LFSE intersected thereby;

identifying an adjusted image location on an adjusted image plane corresponding with a designated adjusted image perception value designated for said boundary plane location; and associating with said given pixel an adjusted image value designated for said adjusted image location to be rendered accordingly; and rendering for each said given pixel said adjusted image value associated therewith;

wherein each of said designated boundary image perception plane and said adjusted image plane comprise a virtual image plane virtually positioned relative to the pixels as a function of said designated boundary image perception value and said designated adjusted image perception value associated therewith, respectively.

7. The computer-readable medium of claim 6, wherein:

said digitally projecting comprises digitally projecting said adjusted image ray trace to intersect respective boundary plane locations on respective designated boundary image perception planes given respective boundary image perception values; and said adjusted image location on said adjusted image plane is interpolated between said respective designated boundary image perception planes as a function of said designated adjusted image perception value, wherein said designated adjusted image perception value is designated as a function of a perceptive depth mapping between said respective designated boundary image perception planes.

8. The computer-readable medium of claim 6, wherein said designated adjusted image perception value is designated as a function of a perceptive depth mapping of said designated boundary image perception plane, wherein said depth mapping results in defining distinct visual perception zones associated with respective visual perception parameters, or in a progressive perception adjustment of the input image.

* * * * *